(12) United States Patent
Bradwell et al.

(10) Patent No.: US 11,677,100 B2
(45) Date of Patent: Jun. 13, 2023

(54) ELECTROCHEMICAL ENERGY STORAGE DEVICES

(71) Applicant: Ambri Inc., Marlborough, MA (US)

(72) Inventors: David J. Bradwell, Arlington, MA (US); Hari P. Nayar, Woburn, MA (US); Zachary T. Modest, Jamaica Plain, MA (US); Stephanie L. Golmon, Arlington, MA (US)

(73) Assignee: Ambri Inc., Marlborough, MA (US)

( * ) Notice: Subject to any disclaimer, the term of this patent is extended or adjusted under 35 U.S.C. 154(b) by 0 days.

(21) Appl. No.: 17/747,333

(22) Filed: May 18, 2022

(65) Prior Publication Data

US 2022/0393254 A1 Dec. 8, 2022

Related U.S. Application Data

(63) Continuation of application No. 16/592,621, filed on Oct. 3, 2019, now Pat. No. 11,387,497, which is a continuation-in-part of application No. 15/647,468, filed on Jul. 12, 2017, now Pat. No. 10,541,451, which is a continuation-in-part of application No. 14/688,179, filed on Apr. 16, 2015, now Pat. No. 9,735,450, which is a continuation of application No. PCT/US2013/065092, filed on Oct. 15, 2013, which is a continuation-in-part of application No. 13/801,333, filed on Mar. 13, 2013, now Pat. No. 9,312,522, said application No. 15/647,468 is a continuation-in-part of application No. 14/536,563, filed on Nov. 7, 2014, now Pat. No. 9,728,814, which is a continuation of application No. 14/178,806, filed on Feb. 12, 2014, now Pat. No. 9,520,618, said application No. 16/592,621 is a continuation-in-part of application No. 15/140,434, filed on Apr. 27, 2016, now abandoned, which is a continuation of application No. PCT/US2014/063222, filed on Oct. 30, 2014.

(Continued)

(51) Int. Cl.
| | |
|---|---|
| H01M 10/39 | (2006.01) |
| H01M 50/463 | (2021.01) |
| H01M 50/138 | (2021.01) |
| H01M 4/134 | (2010.01) |
| H01M 4/38 | (2006.01) |

(52) U.S. Cl.
CPC ......... H01M 10/399 (2013.01); H01M 4/134 (2013.01); H01M 4/38 (2013.01); H01M 4/381 (2013.01); H01M 4/382 (2013.01); H01M 50/138 (2021.01); H01M 50/463 (2021.01)

(58) Field of Classification Search
None
See application file for complete search history.

(56) References Cited

U.S. PATENT DOCUMENTS

| | | | |
|---|---|---|---|
| 2005/0079411 A1* | 4/2005 | Kairawicz | B21D 51/16 72/379.4 |
| 2011/0014505 A1* | 1/2011 | Bradwell | H01M 10/617 429/81 |

* cited by examiner

*Primary Examiner* — Christopher P Domone
(74) *Attorney, Agent, or Firm* — Wilson Sonsini Goodrich & Rosati

(57) ABSTRACT

Provided herein are energy storage devices. In some cases, the energy storage devices are capable of being transported on a vehicle and storing a large amount of energy. An energy storage device is provided comprising at least one liquid metal electrode, an energy storage capacity of at least about 1 MWh and a response time less than or equal to about 100 milliseconds (ms).

20 Claims, 15 Drawing Sheets

Related U.S. Application Data

(60) Provisional application No. 61/715,821, filed on Oct. 18, 2012, provisional application No. 61/763,925, filed on Feb. 12, 2013, provisional application No. 61/898,642, filed on Nov. 1, 2013.

ELECTROCHEMICAL ENERGY STORAGE DEVICES

CROSS-REFERENCE

This application is a continuation of U.S. patent application Ser. No. 16/592,621, filed Oct. 3, 2019, which is a continuation-in-part application of U.S. patent application Ser. No. 15/647,468 (now U.S. Pat. No. 10,541,451), filed Jul. 12, 2017, which is a continuation-in-part application of U.S. patent application Ser. No. 14/688,179 (now U.S. Pat. No. 9,735,450), filed Apr. 16, 2015, which is a continuation of PCT Application No. PCT/US2013/065092, filed Oct. 15, 2013, which claims the benefit of U.S. Provisional Application No. 61/715,821, filed Oct. 18, 2012, and which is a continuation-in-part of U.S. patent application Ser. No. 13/801,333 (now U.S. Pat. No. 9,312,522), filed Mar. 13, 2013, which claims the benefit of U.S. Provisional Application No. 61/763,925, filed Feb. 12, 2013, and U.S. Provisional Application No. 61/715,821, filed Oct. 18, 2012, and which is a continuation-in-part of U.S. patent application Ser. No. 14/536,563 (now U.S. Pat. No. 9,728,814), filed Nov. 7, 2014, which is a continuation of U.S. patent application Ser. No. 14/178,806 (now U.S. Pat. No. 9,520,618), filed Feb. 12, 2014, which claims the benefit of U.S. Provisional Application No. 61/763,925, filed Feb. 12, 2013, each of which is entirely incorporated herein by reference, and is a continuation-in-part application of U.S. patent application Ser. No. 15/140,434, filed Apr. 27, 2016, which is a continuation of PCT Application No. PCT/US2014/063222, filed Oct. 30, 2014, and which claims the benefit of U.S. Provisional Application No. 61/898,642, filed Nov. 1, 2013.

Various devices are configured for use at elevated or high temperatures. Examples of such devices include energy storage devices, such as, for example, elevated or high temperature batteries (e.g., comprising liquid metal electrodes), which are devices capable of converting stored chemical energy into electrical energy. Such devices may in some cases operate at a temperature of, or in excess of, 300° C. Energy storage devices (e.g., batteries) may be used within an electric power grid or as part of a standalone system. Batteries may be used in many household and industrial applications. Batteries can be charged from an electric power source (e.g., electric power produced by a renewable energy resource such as wind or solar) for later discharge when there is a demand for electrical energy consumption.

SUMMARY

Recognized herein are various limitations associated with elevated or high temperature devices, such as, for example, battery systems (also "batteries" herein). For instance, some battery systems operate at high temperatures (e.g., at least about 100° C. or 300° C.) and comprise reactive materials (e.g., reactive metal vapors of lithium, sodium, potassium, magnesium, or calcium). Operation of such batteries can generate heat that may need to be removed from the system to maintain a stable operating temperature. In some cases, such as, for example, when the battery is idle, heat is not generated and needs to be added to the system to maintain the battery at a given operating state (e.g., to maintain electrodes and/or electrolyte in a molten state).

The present disclosure provides energy storage systems, and systems and methods for operating energy storage systems. Operation (e.g., heat management or temperature control) of an energy storage system may include providing a thermal management fluid to or from the energy storage system. In some cases, the thermal management fluid may be provided to (e.g., contacted with) the energy storage system as well as with other portions of the system (e.g., a storage reservoir, condenser or other component in the system). The thermal management fluid may contact one or more portions of the energy storage system. For example, the systems and methods herein can flow the thermal management fluid through a frame of the energy storage system to maintain the system at an operating temperature, operate the system in an energy-efficient manner, extend an operating lifetime of the system and/or enable the system to operate during periods (e.g., time periods, or periods with a given supply and/or demand level) when it can supply most value (e.g., maximum profit (value) can be derived from operation of the system) to the customer (e.g., discharge during hours of peak energy demand).

In an aspect of the present disclosure, an energy storage system comprises a plurality of electrochemical cells each comprising a negative electrode, electrolyte and positive electrode, wherein at least one, two, or all of the negative electrode, the electrolyte and the positive electrode is in a liquid state at an operating temperature of the electrochemical cell, wherein the plurality of electrochemical cells are connected in series and/or parallel; and a frame supporting the plurality of electrochemical cells, wherein the frame comprises one or more fluid flow paths for bringing a thermal management fluid in thermal communication with at least a subset of the plurality of electrochemical cells.

In an embodiment, the frame comprises tubes, pipes, or enclosed trusses. In another embodiment, the thermal management fluid is air, a gas, oil, molten salt, water, or steam. In another embodiment, the gas is argon or nitrogen. In another embodiment, the operating temperature is between about 150° C. and 750° C. In another embodiment, the system further comprises thermal insulation surrounding the frame elements. In another embodiment, the thermal insulation enables the system to operate continuously in a self-heated configuration when charged and/or discharged at least once every two days. In another embodiment, in a self-heated configuration, the thermal insulation enables the system to increase its internal temperature above the operating temperature during regular operation, and wherein the system maintains its internal temperature at about the operating temperature by activating an actuator to allow the thermal management fluid to flow through the one or more fluid flow paths driven by natural convection.

In an embodiment, the system further comprises insulation along at least a portion of the fluid flow path to aid in removal of heat from a predetermined location within the system. In another embodiment, the insulation is thinner in a portion of the fluid flow path adjacent a heated zone of the system.

In an embodiment, the thermal management fluid does not contact the electrochemical cells. In another embodiment, the frame mechanically/structurally supports the electrochemical cells in a series and/or parallel configuration. In another embodiment, the frame is resistant to corrosion. In another embodiment, the frame comprises stainless steel. In another embodiment, the frame is chemically resistant to the thermal management fluid. In another embodiment, the frame is chemically resistant to reactive metals. In another embodiment, the system further comprises a fluid flow system that is configured and arranged to direct the thermal management fluid through the one or more fluid flow paths of the frame. In another embodiment, the fluid flow system is configured or programmed to provide the thermal management fluid at an adjustable flow rate that is selected to maintain the temperature of the system at the operating temperature. In another embodiment, the system comprises at least 10 electrochemical cells. In another embodiment, the frame comprises a chamber that contains at least a subset of the plurality of electrochemical cells. In another embodiment, at least a subset of the plurality of electrochemical cells is connected in series.

In an embodiment, the frame comprises a plurality of parallel fluid flow paths. In another embodiment, fluid flow rates through at least two of the parallel fluid flow paths are separately controllable. In another embodiment, the frame comprises a plurality of orthogonal fluid flow paths. In another embodiment, the frame is rectangular box. In another embodiment, a dimension of the frame is configured to selectively accelerate heat transfer.

In an embodiment, the system further comprises a circulatory fluid flow system that is configured to store thermal energy, wherein the one or more fluid flow paths are in fluid communication with a fluid flow path of the circulatory fluid flow system. In another embodiment, the circulatory fluid flow system comprises a thermal energy storage medium. In another embodiment, the thermal energy storage medium comprises molten salt, gravel, sand, steam or water.

In an embodiment, the negative electrode comprises an alkali or alkaline earth metal. In another embodiment, the alkali or alkaline earth metal is lithium, sodium, potassium, magnesium, calcium or a combination thereof.

In an embodiment, the positive electrode comprises a Group 12 element. In another embodiment, the Group 12 element is selected from the group consisting are zinc, cadmium, and mercury. In another embodiment, the positive electrode further comprises one or more of tin, lead, bismuth, antimony, tellurium, and selenium. In another embodiment, the positive electrode comprises one or more of tin, lead, bismuth, antimony, tellurium, and selenium.

In an embodiment, the electrolyte comprises a salt of an alkali or alkaline earth metal. In another embodiment, the system further comprises a thermal insulation package that comprises one or more layers of insulating material. In another embodiment, the system further comprises a pass-through configured and adapted to facilitate a connection between hot and cold zones of the energy storage system. In another embodiment, the system further comprises at least one wire that passes through the pass-through in a circuitous path, wherein a length of the wire is at least two times a length of the pass-through. In another embodiment, connection comprises a wire, a sensor, a cell current connection, or a cell voltage connection.

In another aspect of the present disclosure, a method for operating an energy storage system comprises (a) providing an energy storage system comprising a plurality of electrochemical cells supported by a frame structure, an individual cell of the plurality of electrochemical cells comprising a negative electrode, electrolyte and positive electrode, wherein at least one, two, or all of the negative electrode, the electrolyte and the positive electrode is in a liquid state at an operating temperature of the individual electrochemical cell, wherein the frame structure comprises one or more fluid flow paths for bringing a thermal management fluid in thermal communication with at least a subset of the plurality of electrochemical cells; and (b) directing the thermal management fluid through the one or more fluid flow paths.

In an embodiment, the thermal management fluid is directed through the one or more fluid flow paths to maintain a temperature of the individual cell, or cell parts, at the operating temperature. In another embodiment, upon directing the thermal management fluid through the one or more fluid flow paths, the temperature of the individual cell is maintained to within about +/−60° C. In another embodiment, upon directing the thermal management fluid through the one or more fluid flow paths, the temperature of the individual cell fluctuates by at most about +/−60° C. in a time period of 10 hours, 9 hours, 8 hours, 7 hours, 6 hours, 5 hours, 4 hours, 3 hours, 2 hours, 1 hour or less.

In an embodiment, the directing of the thermal management fluid is performed to maximize the efficiency and/or operating lifetime of the energy storage system. In another embodiment, the thermal management fluid is directed at a rate that is varied over time. In another embodiment, the thermal management fluid is directed at a rate that depends on at least one of (i) a temperature of the energy storage system or electrochemical cell thereof; (ii) a rate of change of the temperature of the energy storage system or electrochemical cell thereof; (iii) whether the energy storage system is charging, discharging or idle; (iv) an anticipated future operation of the energy storage system; and (v) a current or anticipated market condition. In another embodiment, the thermal management fluid is directed at a rate that depends on at least one, two, three, four, or at least all of (i)-(v). In another embodiment, an anticipated future operation of the energy storage system comprises the time and extent of future charging, discharging and/or idle operation of the energy storage system. In another embodiment, a current or anticipated market conditions comprise the price of energy.

In an embodiment, the thermal management fluid is directed through the one or more fluid flow paths with the aid of a fluid flow system in fluid communication with the one or more fluid flow paths. In another embodiment, the fluid flow system comprises a fan, pump or convection-assisted flow.

In an embodiment, directing the thermal management fluid through the one or more fluid flow paths dissipates or adds thermal energy from the plurality of electrochemical cells at a rate of at least about 1 Watt (W). In another embodiment, directing the thermal management fluid through the one or more fluid flow paths dissipates thermal energy from or adds thermal energy to the plurality of electrochemical cells at a rate of at most about 100 kilo-Watts (kW).

In an embodiment, the method further comprises rapidly cooling at least a portion of the energy storage system in response to a potentially hazardous event. In another embodiment, the potentially hazardous event is an earthquake or a cell breach. In another embodiment, upon rapidly cooling, a temperature of a hottest of the plurality of electrochemical cells decreases from its operating temperature to a temperature below a freezing point of the electrolyte in less than about 4 hours.

In an embodiment, directing the thermal management fluid through the one or more fluid flow paths comprises directing the thermal management fluid through a plurality of fluid flow paths. In another embodiment, the thermal management fluid is directed using forced and/or natural convection. In another embodiment, flow of the thermal management fluid is directed using natural convection and is controlled by an actuator that opens a given fluid flow path of the one or more fluid flow paths.

Another aspect of the present disclosure provides a system comprising one or more computer processors and memory coupled thereto. The memory comprises a computer-readable medium with machine executable code that, upon execution by the one or more computer processors, implements any of the methods above or elsewhere herein.

In some embodiments, a control system for regulating an energy storage system comprises (a) at least one computer processor; and (b) memory operatively coupled to the computer processor, the memory comprising machine executable code that upon execution by the computer processor implements a method, the method comprising directing thermal management fluid through one or more fluid flow paths in a frame structure that supports an energy storage system, wherein the fluid flow paths bring the thermal management fluid in thermal communication with at least a subset of a plurality of electrochemical cells of the energy storage system, wherein an individual cell of the plurality of electrochemical cells comprises a negative electrode, electrolyte and positive electrode, and wherein at least two of the negative electrode, the electrolyte and the positive electrode is in a liquid state at an operating temperature of the individual electrochemical cell.

In an embodiment, the computer processor and the memory are located outside of a hot zone of the energy storage system. In another embodiment, the energy storage system further comprises a temperature sensor in the hot zone or in thermal communication with the hot zone. In another embodiment, the temperature sensor is in electronic communication with the computer processor.

In some embodiments, a computer system programmed to direct a thermal management fluid through one or more fluid flow paths of an energy storage system is provided. The energy storage system comprises a plurality of electrochemical cells supported by a frame structure, an individual cell of the plurality of electrochemical cells comprising a negative electrode, electrolyte and positive electrode, wherein at least one, two, or all of the negative electrode, the electrolyte and the positive electrode is in a liquid state at an operating temperature of the individual electrochemical cell, wherein the frame structure comprises the one or more fluid flow paths for bringing the thermal management fluid in thermal communication with at least a subset of the plurality of electrochemical cells.

In an embodiment, the directing of the thermal management fluid is performed to maintain a temperature of the individual cell, or cell parts, at the operating temperature. In another embodiment, the directing of the thermal management fluid is performed to maximize the efficiency and/or operating lifetime of the energy storage system. In another embodiment, the thermal management fluid is directed at a rate that is varied over time.

In an embodiment, the thermal management fluid is directed at a rate that depends on at least one of (i) a temperature of the energy storage system or electrochemical cell thereof; (ii) a rate of change of the temperature of the energy storage system or electrochemical cell thereof; (iii) whether the energy storage system is charging, discharging or idle; (iv) an expected (or anticipated) future operation of the energy storage system; and (v) a current or anticipated market condition. In another embodiment, the thermal management fluid is directed at a rate that depends on at least one, two, three, four, or at least all of (i)-(v). In another embodiment, the anticipated future operation of the energy storage system comprises the time and extent of future charging, discharging and/or idle operation of the energy storage system. In another embodiment, the current or anticipated market conditions comprise the price of energy.

Another aspect of the present disclosure provides a computer-readable medium comprising machine executable code that, upon execution by one or more computer processors, implements any of the methods above or elsewhere herein.

In some embodiments, a computer readable medium is provided that comprises machine-executable code that upon execution by one or more computer processors implements a method, the method comprising directing thermal management fluid through one or more fluid flow paths in a frame structure that supports an energy storage system, wherein the fluid flow paths bring the thermal management fluid in thermal communication with at least a subset of a plurality of electrochemical cells of the energy storage system, wherein an individual cell of the plurality of electrochemical cells comprises a negative electrode, electrolyte and positive electrode, and wherein at least two of the negative electrode, the electrolyte and the positive electrode is in a liquid state at an operating temperature of the individual electrochemical cell.

In an embodiment, the thermal management fluid is directed through the one or more fluid flow paths to maintain a temperature of the individual cell, or cell parts, at the operating temperature. In another embodiment, the thermal management fluid is directed through the one or more fluid flow paths to maximize the efficiency and/or operating lifetime of the energy storage system. In another embodiment, the thermal management fluid is directed through the one or more fluid flow paths at a rate that is varied over time. In another embodiment, the thermal management fluid is directed through the one or more fluid flow paths at a rate that depends on at least one, two, three, four, or at least all of (i) a temperature of the energy storage system or electrochemical cell thereof; (ii) a rate of change of the temperature of the energy storage system or electrochemical cell thereof; (iii) whether the energy storage system is charging, discharging or idle; (iv) an anticipated future operation of the energy storage system; and (v) a current or anticipated market condition. In another embodiment, the anticipated future operation of the energy storage system comprises the time and extent of future charging, discharging and/or idle operation of the energy storage system. In another embodiment, the current or anticipated market conditions comprise the price of energy.

Another aspect of the present disclosure provides an electrochemical energy storage device comprising a container including a negative electrode, a positive electrode and an electrolyte disposed between the negative electrode and positive electrode. The electrochemical energy storage device can have a first potential difference between the negative electrode and positive electrode at a first temperature that is less than about 50° C. and a second potential difference between the negative electrode and positive electrode at a second temperature of at least about 250° C. The second potential difference can be greater than the first potential difference. At least two of the positive electrode, electrolyte and negative electrode can be liquid at the second temperature. The container can have a surface area-to-volume ratio of less than or equal to about 100 $m^{-1}$, and the electrochemical energy storage device can maintain at least about 90% of its energy storage capacity after 500 charge/discharge cycles.

In some embodiments, the container can contain one or more electrochemical cells, and an individual electrochemical cell of the one or more electrochemical cells can include the negative electrode, the positive electrode and the electrolyte. In some embodiments, over the charge/discharge cycle, a rate of heat generation in the individual electrochemical cell can be greater than or equal to about 50% of a rate of heat loss from the individual electrochemical cell. In some embodiments, the electrochemical energy storage device can maintain at least about 90% of its energy storage capacity after 1,000 charge/discharge cycles.

Another aspect of the present disclosure provides an energy storage system, comprising a container comprising one or more energy storage cells. An individual energy storage cell of the one or more energy storage cells can comprise at least one liquid electrode and a control system. The control system can comprise a computer processor that is programmed to monitor at least one operating temperature of the one or more energy storage cells and/or the container. The computer processor can regulate a flow of electrical energy into at least a subset of the one or more energy storage cells such that the subset undergoes sustained self-heating over a charge/discharge cycle.

In some embodiments, over the charge/discharge cycle, a rate of heat generation in the individual energy storage cell can be greater than or about equal to a rate of heat loss from the individual energy storage cell. In some embodiments, over the charge/discharge cycle, a rate of heat generation in the individual energy storage cell can be less than or equal to about 150% of a rate of heat loss from the individual energy storage cell.

In some embodiments, the computer processor can monitor the at least one operating temperature and regulates the flow of electrical energy such that the at least one operating temperature is greater than or equal to about 250° C. and the at least one liquid electrode is maintained as a liquid. In some embodiments, the computer processor can monitor the at least one operating temperature and regulate the flow of electrical energy such that over the charge/discharge cycle, the at least one operating temperature is greater than or equal to about 250° C.

In some embodiments, the at least one liquid electrode can comprise (i) lithium, sodium, potassium, magnesium, calcium, or any combination thereof, or (ii) antimony, lead, tin, tellurium, bismuth, or any combination thereof.

In some embodiments, the individual energy storage cell can further comprise an electrolyte adjacent to the at least one liquid electrode. The electrolyte can be a liquid, solid or a paste.

In some embodiments, the one or more energy storage cells can maintain at least about 90% of their energy storage capacity after 100 charge/discharge cycles. In some embodiments, the one or more energy storage cells can maintain at least about 90% of their energy storage capacity after 500 charge/discharge cycles.

In some embodiments, the individual energy storage cell can have an efficiency of at least about 80%. In some embodiments, the individual energy storage cell can have an efficiency of at least about 80% at a current density of at least about 100 mA/cm$^2$. In some embodiments, the individual energy storage cell can have an efficiency of at least about 90%. In some embodiments, the individual energy storage cell can have an efficiency of at least about 90% at a current density of at least about 100 mA/cm$^2$.

In another aspect, the present disclosure provides an energy storage device comprising a negative electrode, a positive electrode and an electrolyte disposed between the negative electrode and positive electrode. At least one of the positive electrode and negative electrode can be liquid at an operating temperature of the energy storage device that is greater than a non-operating temperature of the energy storage device. The energy storage device can maintain at least about 90% of its energy storage capacity after 500 charge/discharge cycles, and the energy storage device can have an efficiency of at least about 80% at a current density of at least about 100 mA/cm$^2$.

In some embodiments, the energy storage device can maintain at least about 95% of its energy storage capacity after 500 charge/discharge cycles.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure," "FIG.," "Figures," or "FIGs." herein), of which:

FIG. 12 is an example of a thermal insulation structure portion comprising multiple insulation layers and a pass-through;

DETAILED DESCRIPTION

Figure 1:
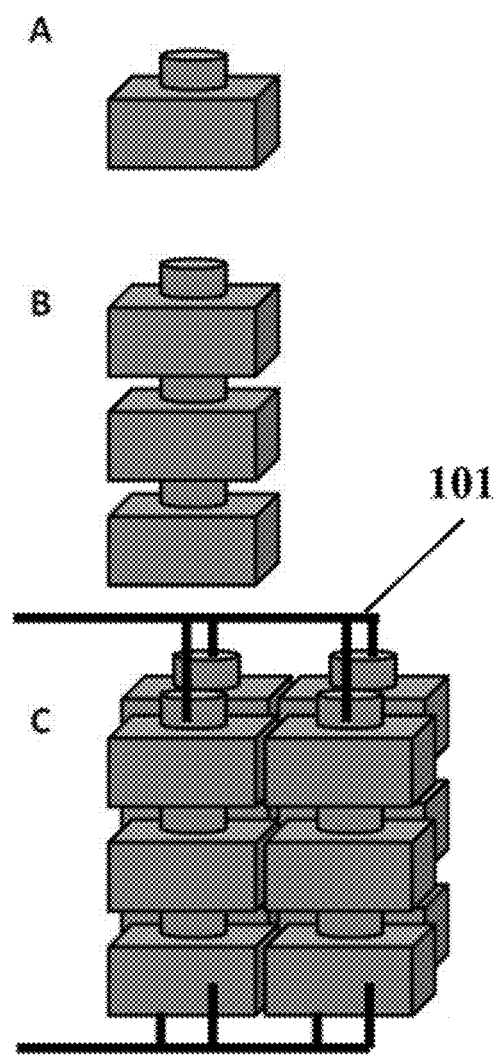
FIG. 1 is an illustration of an electrochemical cell (A) and a compilation (i.e., battery) of electrochemical cells (B and C)

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "cell," as used herein, generally refers to an electrochemical cell. A cell can include a negative electrode of material 'A' and a positive electrode of material 'B', denoted as A∥B. The positive and negative electrodes can be separated by an electrolyte. A cell can also include a housing, one or more current collectors, and a high temperature electrically isolating seal. In some cases, a cell can be about 4 inches wide, about 4 inches deep and about 2.5 inches tall. In some cases, a cell can be about 8 inches wide, about 8 inches deep and about 2.5 inches tall. In some examples, any given dimension (e.g., height, width or depth) of an electrochemical cell can be at least about 1, 2, 2.5, 3, 3.5, 4, 4.5, 5, 5.5, 6, 6.5, 7, 7.5, 8, 8.5, 9, 9.5, 10, 12, 14, 16, 18 or 20 inches. In an example, a cell (e.g., each cell) can have dimensions of about 4 inches×4 inches×2.5 inches. In another example, a cell (e.g., each cell) can have dimensions of about 8 inches×8 inches×2.5 inches. In some cases, a cell may have about at least about 70 Watt-hours of energy storage capacity. In some cases, a cell may have at least about 300 Watt-hours of energy storage capacity.

The term "module," as used herein, generally refers to cells that are attached together in parallel by, for example, mechanically connecting the cell housing of one cell with the cell housing of an adjacent cell (e.g., cells that are connected together in an approximately horizontal packing plane). In some cases, the cells are connected to each other by joining features that are part of and/or connected to the cell body (e.g., tabs protruding from the main portion of the cell body). A module can include a plurality of cells in parallel. A module can comprise any number of cells, e.g., at least about 2, 3, 4, 5, 6, 7, 8, 9, 10, 11, 12, 13, 14, 15, 16, 17, 18, 19, 20, or more cells. In some cases, a module comprises at least about 4, 9, 12, or 16 cells. In some cases, a module is capable of storing about 700 Watt-hours of energy and/or delivering at least about 175 Watts (W) of power. In some cases, a module is capable of storing at least about 1080 Watt-hours of energy and/or delivering at least about 500 Watts of power. In some cases, a module is capable of storing at least about 1080 Watt-hours of energy and/or delivering at least about 200 Watts (e.g., about 500 Watts) of power. In some cases, a module can include a single cell.

The term "pack," as used herein, generally refers to modules that are attached through different electrical connections (e.g., vertically). A pack can comprise any number of modules, e.g., at least about 1, 2, 3, 4, 5, 6, 7, 8, 9, 10, 11, 12, 13, 14, 15, 16, 17, 18, 19, 20, or more modules. In some cases, a pack comprises at least about 3 modules. In some cases, a pack is capable of storing at least about 2 kilo-Watt-hours of energy and/or delivering at least about 0.4 kilo-Watts (e.g., at least about 0.5 kilo-Watts or 1.0 kilo-Watts) of power. In some cases, a pack is capable of storing at least about 3 kilo-Watt-hours of energy and/or delivering at least about 0.75 kilo-Watts (kW) (e.g., at least about 1.5 kilo-Watts) of power. In some cases, a pack comprises at least about 6 modules. In some cases, a pack is capable of storing about 6 kilo-Watt-hours of energy and/or delivering at least about 1.5 kilo-Watts (e.g., about 3 kilo-Watts) of power.

The term "core," as used herein generally refers to a plurality of modules or packs that are attached through different electrical connections (e.g., in series and/or parallel). A core can comprise any number of modules or packs, e.g., at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, or more packs. In some cases, the core also comprises mechanical, electrical, and thermal systems that allow the core to efficiently store and return electrical energy in a controlled manner. In some cases, a core comprises at least about 12 packs. In some cases, a core is capable of storing at least about 35 kilo-Watt-hours of energy and/or delivering at least about 7 kilo-Watts of power. In some cases, a core is capable of storing at least about 25 kilo-Watt-hours of energy and/or delivering at least about 6.25 kilo-Watts of power. In some cases, a core comprises at least about 36 packs. In some cases, a core is capable of storing at least about 200 kilo-Watt-hours of energy and/or delivering at least about 40, 50, 60, 70, 80, 90 or 100 kilo-Watts or more of power.

The term "core enclosure", or "CE," as used herein, generally refers to a plurality of cores that are attached through different electrical connections (e.g., in series and/or parallel). A CE can comprise any number of cores, e.g., at least about 1, 2, 3, 4, 5, 6, 7, 8, 9, 10, 11, 12, 13, 14, 15, 16, 17, 18, 19, 20, or more cores. In some cases, the CE contains cores that are connected in parallel with appropriate by-pass electronic circuitry, thus enabling a core to be disconnected while continuing to allow the other cores to store and return energy. In some cases, a CE comprises at least 4 cores. In some cases, a CE is capable of storing at least about 100 kilo-Watt-hours of energy and/or delivering about 25 kilo-Watts of power. In some cases, a CE comprises 4 cores. In some cases, a CE is capable of storing about 100 kilo-Watt-hours of energy and/or delivering about 25 kilo-Watts of power. In some cases, a CE is capable of storing about 400 kilo-Watt-hours of energy and/or delivering at least about 80 kilo-Watts, e.g., at least or about 80, 100, 120, 140, 160, 180 or 200 kilo-Watts or more of power.

The term "system," as used herein, generally refers to a plurality of cores or CEs that are attached through different electrical connections (e.g., in series and/or parallel). A system can comprise any number of cores or CEs, e.g., at least about 2, 3, 4, 5, 6, 7, 8, 9, 10, 11, 12, 13, 14, 15, 16, 17, 18, 19, 20, or more cores. In some cases, a system comprises 20 CEs. In some cases, a system is capable of storing about 2 mega-Watt-hours of energy and/or delivering at least about 400 kilo-Watts (e.g., about 500 kilo-Watts or about 1000 kilo-Watts) of power. In some cases, a system comprises 5 CEs. In some cases, a system is capable of storing about 2 mega-Watt-hours of energy and/or delivering at least about 400 kilo-Watts, e.g., at least about 400, 500, 600, 700, 800, 900, 1000 kilo-Watts or more of power.

A group of cells (e.g., a core, a CE, a system, etc.) with a given energy capacity and power capacity (e.g., a CE or a system capable of storing a given amount of energy) may be configured to deliver at least about 10%, at least about 20%, at least about 30%, at least about 40%, at least about 50%, at least about 60%, at least about 70%, at least about 80%, at least about 90%, at least about 95%, or about 100% of a given (e.g., rated) power level. For example, a 1000 kW system may be capable of also operating at 500 kW, but a 500 kW system may not be able to operate at 1000 kW. In some cases, a system with a given energy capacity and power capacity (e.g., a CE or a system capable of storing a given amount of energy) may be configured to deliver less than about 100%, less than about 110%, less than about 125%, less than about 150%, less than about 175%, or less than about 200% of a given (e.g., rated) power level, and the like. For example, the system may be configured to provide more than its rated power capacity for a period of time that is less than the time it may take to consume its energy capacity at the power level that is being provided (e.g., provide power that is greater than the rated power of the system for a period of time corresponding to less than about 1%, less than about 10% or less than about 50% of its rated energy capacity).

The term "battery," as used herein, generally refers to one or more electrochemical cells connected in series and/or parallel. A battery can comprise any number of electrochemical cells, modules, packs, cores, CEs or systems. A battery may undergo at least one charge/discharge or discharge/charge cycle ("cycle").

The term "vertical," as used herein, generally refers to a direction that is parallel to the gravitational acceleration vector (g).

The term "charge cutoff voltage" or "CCV," as used herein, generally refers to the voltage at which a cell is fully or substantially fully charged, such as a voltage cutoff limit used in a battery when cycled in a constant current mode.

The term "open circuit voltage" or "OCV," as used herein, generally refers to the voltage of a cell (e.g., fully or partially charged) when it is disconnected from any circuit or external load (i.e., when no current is flowing through the cell).

The term "voltage" or "cell voltage," as used herein, generally refers to the voltage of a cell (e.g., at any state of charge or charging/discharging condition). In some cases, voltage or cell voltage may be the open circuit voltage. In some cases, the voltage or cell voltage can be the voltage during charging or during discharging.

Voltages of the present disclosure may be taken or represented with respect to reference voltages, such as ground (0 volt (V)), or the voltage of the opposite electrode in an electrochemical cell.

Electrochemical Cells, Devices and Systems

The present disclosure provides electrochemical energy storage devices (e.g., batteries) and systems. An electrochemical energy storage device generally includes at least one electrochemical cell, also "cell" and "battery cell" herein, sealed (e.g., hermetically sealed) within a housing. A cell can be configured to deliver electrical energy (e.g., electrons under potential) to a load, such as, for example, an electronic device, another energy storage device or a power grid.

An electrochemical cell of the disclosure can include a negative electrode, an electrolyte adjacent to the negative electrode, and a positive electrode adjacent to the electrolyte. The negative electrode can be separated from the positive electrode by the electrolyte. The negative electrode can be an anode during discharge. The positive electrode can be a cathode during discharge.

In some examples, an electrochemical cell is a liquid metal battery cell. In some examples, a liquid metal battery cell can include a liquid electrolyte arranged between a negative liquid (e.g., molten) metal electrode and a positive liquid (e.g., molten) metal, metalloid and/or non-metal electrode. In some cases, a liquid metal battery cell has a molten alkaline earth metal (e.g., magnesium, calcium) or alkali metal (e.g., lithium, sodium, potassium) negative electrode, an electrolyte, and a molten metal positive electrode. The molten metal positive electrode can include, for example, one or more of tin, lead, bismuth, antimony, tellurium and selenium. For example, the positive electrode can include Pb or a Pb—Sb alloy. The positive electrode can also include one or more transition metals or d-block elements (e.g., Zn, Cd, Hg) alone or in combination with other metals, metalloids or non-metals, such as, for example, a Zn—Sn alloy or Cd—Sn alloy. In some examples, the positive electrode can comprise a metal or metalloid that has only one stable oxidation state (e.g., a metal with a single or singular oxidation state). Any description of a metal or molten metal positive electrode, or a positive electrode, herein may refer to an electrode including one or more of a metal, a metalloid and a non-metal. The positive electrode may contain one or more of the listed examples of materials. In an example, the molten metal positive electrode can include lead and antimony. In some examples, the molten metal positive electrode may include an alkali or alkaline earth metal alloyed in the positive electrode.

In some examples, an electrochemical energy storage device includes a liquid metal negative electrode, a liquid metal positive electrode, and a liquid salt electrolyte separating the liquid metal negative electrode and the liquid metal positive electrode. The negative electrode can include an alkali or alkaline earth metal, such as lithium, sodium, potassium, rubidium, cesium, magnesium, barium, calcium, sodium, or combinations thereof. The positive electrode can include elements selected from transition metals or d-block elements (e.g., Group 12), Group IIIA, IVA, VA and VIA of the periodic table of the elements, such as zinc, cadmium, mercury, aluminum, gallium, indium, silicon, germanium, tin, lead, pnicogens (e.g., arsenic, bismuth and antimony), chalcogens (e.g., sulfur, tellurium and selenium), or combinations thereof. In some examples, the positive electrode comprises a Group 12 element of the periodic table of the elements, such as one or more of zinc (Zn), cadmium (Cd) and mercury (Hg). In some cases, the positive electrode may form a eutectic or off-eutectic mixture (e.g., enabling lower operating temperature of the cell in some cases). In some examples, the positive electrode comprises a first positive electrode species and a second positive electrode species at a ratio (mol-%) of about 20:80, 40:60, 50:50, or 80:20 of the first positive electrode species to the second electrode species. In some examples, the positive electrode comprises Sb and Pb at a ratio (mol-%) of about 20:80, 40:60, 50:50, or 80:20 Sb to Pb. In some examples, the positive electrode comprises between about 20 mol % and 80 mol-% of a first positive electrode species mixed with a second positive electrode species. In some cases, the positive electrode comprises between about 20 mol-% and 80 mol-% Sb (e.g., mixed with Pb). In some cases, the positive electrode comprises between about 20 mol-% and 80 mol-% Pb (e.g., mixed with Sb). In some examples, the positive electrode comprises one or more of Zn, Cd, Hg, or such material(s) in combination with other metals, metalloids or non-metals, such as, for example, a Zn—Sn alloy, Zn—Sn alloy, Cd—Sn alloy, Zn—Pb alloy, Zn—Sb alloy, or Bi. In an example, the positive electrode can comprise 15:85, 50:50, 75:25 or 85:15 mol-% Zn:Sn.

The electrolyte can include a salt (e.g., molten salt), such as an alkali or alkaline earth metal salt. The alkali or alkaline earth metal salt can be a halide, such as a fluoride, chloride, bromide, or iodide of the active alkali or alkaline earth metal, or combinations thereof. In an example, the electrolyte (e.g., in Type 1 or Type 2 chemistries) includes lithium chloride. In some examples, the electrolyte can comprise sodium fluoride (NaF), sodium chloride (NaCl), sodium bromide (NaBr), sodium iodide (NaI), lithium fluoride (LiF), lithium chloride (LiCl), lithium bromide (LiBr), lithium iodide (LiI), potassium fluoride (KF), potassium chloride (KCl), potassium bromide (KBr), potassium iodide (KI), calcium fluoride ($CaF_2$), calcium chloride ($CaCl_2$)), calcium bromide ($CaBr_2$), calcium iodide ($CaI_2$), or any combination thereof. In another example, the electrolyte includes magnesium chloride ($MgCl_2$). As an alternative, the salt of the active alkali metal can be, for example, a non-chloride halide, carbonate, hydroxide, nitrate, nitrite, sulfate, sulfite, or combinations thereof. In some cases, the electrolyte can comprise a mixture of salts (e.g., 25:55:20 mol-% LiF:LiCl:LiBr, 50:37:14 mol-% LiCl:LiF:LiBr, etc.). The electrolyte may exhibit low (e.g., minimal) electronic conductance (e.g., electronic shorting may occur through the electrolyte via valence reactions of $PbCl_2 \leftrightarrow PbCl_3$ which increases electronic conductance). For example, the electrolyte can have an electronic transference number (i.e., percentage of electrical (electronic and ionic) charge that is due to the transfer of electrons) of less than or equal to about 0.03% or 0.3%.

In some cases, the negative electrode and the positive electrode of an electrochemical energy storage device are in the liquid state at an operating temperature of the energy storage device. To maintain the electrodes in the liquid states, the battery cell may be heated to any suitable temperature. In some examples, the battery cell is heated to and/or maintained at a temperature of about 100° C., about 150° C., about 200° C., about 250° C., about 300° C., about 350° C., about 400° C., about 450° C., about 500° C., about 550° C., about 600° C., about 650° C., or about 700° C. The battery cell may be heated to and/or maintained at a temperature of at least about 100° C., at least about 150° C., at least about 200° C., at least about 250° C., at least about 300° C., at least about 350° C., at least about 400° C., at least about 450° C., at least about 500° C., at least about 550° C., at least about 600° C., at least about 650° C., at least about 700° C., at least about 800° C., or at least about 900° C. In such a case, the negative electrode, electrolyte and positive electrode can be in a liquid (or molten) state. In some situations, the battery cell is heated to between about 200° C. and about 600° C., between about 500° C. and about 550° C., or between about 450° C. and about 575° C.

In some implementations, the electrochemical cell or energy storage device may be at least partially or fully self-heated. For example, a battery may be sufficiently insulated, charged, discharged and/or conditioned at sufficient rates, and/or cycled a sufficient percentage of the time to allow the system to generate sufficient heat through inefficiencies of the cycling operation that cells are maintained at a given operating temperature (e.g., a cell operating temperature above the freezing point of at least one of the liquid components) without the need for additional energy to be supplied to the system to maintain the operating temperature.

Electrochemical cells of the disclosure may be adapted to cycle between charged (or energy storage) modes and discharged modes. In some examples, an electrochemical cell can be fully charged, partially charged or partially discharged, or fully discharged.

In some implementations, during a charging mode of an electrochemical energy storage device, electrical current received from an external power source (e.g., a generator or an electrical grid) may cause metal atoms in the metal positive electrode to release one or more electrons, dissolving into the electrolyte as a positively charged ion (i.e., cation). Simultaneously, cations of the same species can migrate through the electrolyte and may accept electrons at the negative electrode, causing the cations to transition to a neutral metal species, thereby adding to the mass of the negative electrode. The removal of the active metal species from the positive electrode and the addition of the active metal to the negative electrode stores electrochemical energy. In some cases, the removal of a metal from the positive electrode and the addition of its cation to the electrolyte can store electrochemical energy. In some cases, electrochemical energy can be stored through a combination of removal of the active metal species from the positive electrode and its addition to the negative electrode, and the removal of one or more metals (e.g., different metals) from the positive electrode and their addition to the electrolyte (e.g., as cations). During an energy discharge mode, an electrical load is coupled to the electrodes and the previously added metal species in the negative electrode can be released from the metal negative electrode, pass through the electrolyte as ions, and deposit as a neutral species in the positive electrode (and in some cases alloy with the positive electrode material), with the flow of ions accompanied by the external and matching flow of electrons through the external circuit/load. In some cases, one or more cations of positive electrode material previously released into the electrolyte can deposit as neutral species in the positive electrode (and in some cases alloy with the positive electrode material), with the flow of ions accompanied by the external and matching flow of electrons through the external circuit/load. This electrochemically facilitated metal alloying reaction discharges the previously stored electrochemical energy to the electrical load.

In a charged state, the negative electrode can include negative electrode material and the positive electrode can include positive electrode material. During discharging (e.g., when the battery is coupled to a load), the negative electrode material yields one or more electrons, and cations of the negative electrode material. In some implementations, the cations migrate through the electrolyte to the positive electrode material and react with the positive electrode material (e.g., to form an alloy). In some implementations, ions of the positive metal species (e.g., cations of the positive electrode material) accept electrons at the positive electrode and deposit as a metal on the positive electrode. During charging, in some implementations, the alloy at the positive electrode disassociates to yield cations of the negative electrode material, which migrate through the electrolyte to the negative electrode. In some implementations, one or more metal species at the positive electrode disassociates to yield cations of the negative electrode material in the electrolyte. In some examples, ions can migrate through an electrolyte from an anode to a cathode, or vice versa. In some cases, ions can migrate through an electrolyte in a push-pop fashion in which an entering ion of one type ejects an ion of the same type from the electrolyte. For example, during discharge, an alkali metal anode and an alkali metal chloride electrolyte can contribute an alkali metal cation to a cathode by a process in which an alkali metal cation formed at the anode interacts with the electrolyte to eject an alkali metal cation from the electrolyte into the cathode. The alkali metal cation formed at the anode in such a case may not necessarily migrate through the electrolyte to the cathode. The cation can be formed at an interface between the anode and the electrolyte, and accepted at an interface of the cathode and the electrolyte.

The present disclosure provides Type 1 and Type 2 cells, which can vary based on, and be defined by, the composition of the active components (e.g., negative electrode, electrolyte and positive electrode), and based on the mode of operation of the cells (e.g., low voltage mode versus high voltage mode). A cell can comprise materials that are configured for use in Type 2 mode of operation. A cell can comprise materials that are configured for use in Type 1 mode of operation. In some cases, a cell can be operated in both a high voltage (Type 2) operating mode and the low voltage (Type 1) operating mode. For example, a cell with positive and negative electrode materials that are ordinarily configured for use in a Type 1 mode can be operated in a Type 2 mode of operation. A cell can be cycled between Type 1 and Type 2 modes of operation. A cell can be initially charged (or discharged) under Type 1 mode to a given voltage (e.g., 0.5 V to 1 V), and subsequently charged (then discharged) under Type 2 mode to a higher voltage (e.g., 1.5 V to 2.5 V, or 1.5 V to 3 V). In some cases, cells operated under Type 2 mode can operate at a voltage between electrodes that can exceed those of cells operated under Type 1 mode. In some cases, Type 2 cell chemistries can operate at a voltage between electrodes that can exceed those of Type 1 cell chemistries operated under Type 1 mode. Type 2 cells can be operated in Type 2 mode.

In an example Type 1 cell, upon discharging, cations formed at the negative electrode can migrate into the electrolyte. Concurrently, the electrolyte can provide a cation of the same species (e.g., the cation of the negative electrode material) to the positive electrode, which can reduce from a cation to a neutrally charged metallic species, and alloy with the positive electrode. In a discharged state, the negative electrode can be depleted (e.g., partially or fully) of the negative electrode material (e.g., Li, Na, K, Mg, Ca). During charging, the alloy at the positive electrode can disassociate to yield cations of the negative electrode material (e.g., $Li^+$, $Na^+$, $K^+$, $Mg^{2+}$, $Ca^{2+}$, which migrates into the electrolyte. The electrolyte can then provide cations (e.g., the cation of the negative electrode material) to the negative electrode, where the cations accept one or more electrons from an external circuit and are converted back to a neutral metal species, which replenishes the negative electrode to provide a cell in a charged state. A Type 1 cell can operate in a push-pop fashion, in which the entry of a cation into the electrolyte results in the discharge of the same cation from the electrolyte.

In an example Type 2 cell, in a discharged state the electrolyte comprises cations of the negative electrode material (e.g., $Li^+$, $Na^+$, $K^+$, $Mg^{2+}$, $Ca^{2+}$), and the positive electrode comprises positive electrode material (e.g., Sb, Pb, Sn, Bi, Zn, Hg). During charging, a cation of the negative electrode material from the electrolyte accepts one or more electrons (e.g., from a negative current collector) to form the negative electrode comprising the negative electrode material. In some examples, the negative electrode material is liquid and wets into a foam (or porous) structure of the negative current collector. In some examples, negative current collector may not comprise foam (or porous) structure. In some examples, the negative current collector may comprise a metal, such as, for example, tungsten (e.g., to avoid corrosion from Zn), tungsten carbide or molybdenum negative collector not comprising Fe—Ni foam. Concurrently, positive electrode material from the positive electrode sheds electrons (e.g., to a positive current collector) and dissolves into the electrolyte as cations of the positive electrode material (e.g., $Sb^{3+}$, $Pb^{2+}$, $Bi^{3+}$, $Zn^{2+}$, $Hg^{2+}$). The concentration of the cations of the positive electrode material can vary in vertical proximity within the electrolyte (e.g., as a function of distance above the positive electrode material) based on the atomic weight and diffusion dynamics of the cation material in the electrolyte. In some examples, the cations of the positive electrode material are concentrated in the electrolyte near the positive electrode.

In some implementations, negative electrode material may not need to be provided at the time of assembly of a cell that can be operated in a Type 2 mode. For example, a Li∥Pb cell or an energy storage device comprising such cell(s) can be assembled in a discharged state having only a Li salt electrolyte and a Pb or Pb alloy (e.g., Pb—Sb) positive electrode (i.e., Li metal may not be required during assembly).

Although electrochemical cells of the present disclosure have been described, in some examples, as operating in a Type 1 mode or Type 2 mode, other modes of operation are possible. Type 1 mode and Type 2 mode are provided as examples and are not intended to limit the various modes of operation of electrochemical cells disclosed herein.

In some cases, an electrochemical cell comprises a liquid metal negative electrode (e.g., sodium (Na) or lithium (Li)), and a solid ion-conducting (e.g., β"-alumina ceramic) electrolyte, and a liquid positive electrode. Such a cell can be a high temperature battery. One or more such cells can be provided in an electrochemical energy storage device. The negative electrode can include an alkali or alkaline earth metal, such as, for example, lithium, sodium, potassium, magnesium, calcium, or combinations thereof. The positive electrode may comprise a liquid chalcogen or molten chalcogenide (e.g., sulfur (S), selenium (Se), or tellurium (Te)), and/or a molten salt comprising a transition metal halide (e.g., $NiCl_3$, $FeCl_3$) and/or other (e.g., supporting) compounds (e.g., NaCl, NaF, NaBr, NaI, KCl, LiCl, bromide salts), or any combination thereof. In some instances, the solid ion conducting electrolyte is a beta alumina (e.g., β"-alumina) ceramic capable of conducting sodium ions at elevated or high temperature (e.g., above about 200° C., above about 250° C., above about 300° C., or above about 350° C.). In some instances, the solid ion-conducting electrolyte operates above about 100° C., above about 150° C., above about 200° C., above about 250° C., above about 300° C., or above about 350° C.

Batteries and Housings

Electrochemical cells of the disclosure can include housings that may be suited for various uses and operations. A housing can include one cell or a plurality of cells. A housing can be configured to electrically couple the electrodes to a switch, which can be connected to the external power source and the electrical load. The cell housing may include, for example, an electrically conductive container that is electrically coupled to a first pole of the switch and/or another cell housing, and an electrically conductive container lid that is electrically coupled to a second pole of the switch and/or another cell housing. The cell can be arranged within a cavity of the container. A first one of the electrodes of the cell (e.g., positive electrode) can contact and be electrically coupled with an endwall of the container. A second one of the electrodes of the cell (e.g., negative electrode) can contact and be electrically coupled with a conductive feedthrough or conductor (e.g., negative current lead) on the container lid. An electrically insulating seal (e.g., bonded ceramic ring) may electrically isolate negative potential portions of the cell from positive portions of the container (e.g., electrically insulate the negative current lead from the positive current lead). In an example, the negative current lead and the container lid (e.g., cell cap) can be electrically isolated from each other, where a dielectric sealant material can be placed between the negative current lead and the cell cap. As an alternative, a housing can include an electrically insulating sheath (e.g., alumina sheath) or a corrosion-resistant and electrically conductive sheath or crucible (e.g., graphite sheath or crucible). In some cases, a housing and/or container may be a battery housing and/or container.

A battery, as used herein, can comprise a plurality of electrochemical cells. The cell(s) can include housings. Individual cells can be electrically coupled to one another in series and/or in parallel. In series connectivity, the positive terminal of a first cell is connected to a negative terminal of a second cell. In parallel connectivity, the positive terminal of a first cell can be connected to a positive terminal of a second, and/or additional, cell(s). Similarly, cell modules, packs, cores, CEs and systems can be connected in series and/or in parallel in the same manner as described for cells.

Reference will now be made to the figures, wherein like numerals refer to like parts throughout. It will be appreciated that the figures and features therein are not necessarily drawn to scale.

With reference to FIG. 1, an electrochemical cell (A) is a unit comprising an anode and a cathode. The cell may comprise an electrolyte and be sealed in a housing as described herein. In some cases, the electrochemical cells can be stacked (B) to form a battery (i.e., a compilation of one or more electrochemical cells). The cells can be arranged in parallel, in series, or both in parallel and in series (C). Further, cell modules, packs, cores, CEs and/or systems can be connected in series and/or in parallel. Interconnections 101 may connect individual cells and/or groups of cells.

The cells can be arranged in groups (e.g., modules, packs, cores, CEs, systems, or any other group comprising one or more electrochemical cells). In some cases, such groups of electrochemical cells may allow a given number of cells to be controlled or regulated together at the group level (e.g., in concert with or instead of regulation/control of individual cells).

The battery may be assembled through repeated addition of individual cells or groups of cells. In one example, cells can be assembled into modules, which can be stacked to form packs, which can then be interconnected to form cores. In some cases, the packs may be assembled (e.g., vertically and/or horizontally) on trays, which is another example of a group of electrochemical cells; the trays can be assembled (e.g., vertically and/or horizontally) to form cores. Further, the cores can then be interconnected to form CEs and systems. In another example, cells can be assembled into modules, which can be interconnected (e.g., vertically and horizontally) to form cores. In yet another example, cells can be stacked to form a single cell tower (see, for example, configuration B in FIG. 1), which is yet another example of a group of electrochemical cells. Multiple cell towers, each comprising multiple cells stacked vertically on top one another, can then be added together to form, for example, a pack. Thus, in an example, a pack comprising a stack of 4 modules, each module comprising a 2 by 2 array of cells, can also be assembled by interconnecting 4 towers with 4 cells each (arranged in a 2 by 2 array of towers). Groups of cells utilized for assembly purposes may or may not be the same as groups of cells utilized for regulation/control purposes. Groups of cells may be supported by (e.g., packs or cores) or comprise (e.g., trays or towers) various frames. The frames of different groups of cells may be connected during assembly.

As described in greater detail elsewhere herein, individual cells or portion(s) thereof, groups of cells, or devices or systems comprising such cell(s) (e.g., energy storage systems comprising energy storage devices such as batteries) can be thermally maintained and/or regulated, e.g., by a thermal management system. The thermal management system may be distributed across various portions of the energy storage device/system, and/or across a system for operating the energy storage device/system. In some implementations, one or more frames may be used for thermal management of the systems herein. Such thermal management frames may also provide structural support. At least a portion of the thermal management system may be assembled by connecting frames. The frames may be configured, for example, to form a system of fluid flow pathways and/or ducts comprising a thermal management fluid. In some cases, the frames may be configured to be in thermal contact with (e.g., via the thermal management fluid) one or more electrochemical cells.

Electrochemical cells of the disclosure (e.g., Type 1 cell operated in Type 2 mode, Type 1 cell operated in Type 1 mode, or Type 2 cell) may be capable of storing, receiving input of ("taking in"), discharging, and/or returning a suitably large amount of energy (e.g., substantially large amounts of energy). In some instances, a cell is capable of storing, taking in, discharging, and/or returning about 1 Watt-hour (Wh), about 5 Wh, 25 Wh, about 50 Wh, about 100 Wh, about 250 Wh, about 500 Wh, about 1 kilo-Watt-hour (kWh), about 1.5 kWh, about 2 kWh, about 3 kWh, about 5 kWh, about 10 kWh, about 15 kWh, about 20 kWh, about 30 kWh, about 40 kWh, or about 50 kWh. In some instances, the battery is capable of storing, taking in, discharging, and/or returning at least about 1 Wh, at least about 5 Wh, at least about 25 Wh, at least about 50 Wh, at least about 100 Wh, at least about 250 Wh, at least about 500 Wh, at least about 1 kWh, at least about 1.5 kWh, at least about 2 kWh, at least about 3 kWh, at least about 5 kWh, at least about 10 kWh, at least about 15 kWh, at least about 20 kWh, at least about 30 kWh, at least about 40 kWh, or at least about 50 kWh. It is recognized that the amount of energy stored in an electrochemical cell and/or battery may be less than the amount of energy taken into the electrochemical cell and/or battery (e.g., due to inefficiencies and losses). A cell can have such energy storage capacities upon operating at any of the current densities herein.

A cell can be capable of providing a current at a current density of at least about 10 milli-amperes per square centimeter ($mA/cm^2$), 20 $mA/cm^2$, 30 $mA/cm^2$, 40 $mA/cm^2$, 50 $mA/cm^2$, 60 $mA/cm^2$, 70 $mA/cm^2$, 80 $mA/cm^2$, 90 $mA/cm^2$, 100 $mA/cm^2$, 200 $mA/cm^2$, 300 $mA/cm^2$, 400 $mA/cm^2$, 500 $mA/cm^2$, 600 $mA/cm^2$, 700 $mA/cm^2$, 800 $mA/cm^2$, 900 $mA/cm^2$, 1 $A/cm^2$, 2 $A/cm^2$, 3 $A/cm^2$, 4 $A/cm^2$, 5 $A/cm^2$, or 10 $A/cm^2$, where the current density is determined based on the effective cross-sectional area of the electrolyte and where the cross-sectional area is the area that is orthogonal to the net flow direction of ions through the electrolyte during charge or discharging processes. In some instances, a cell can be capable of operating at a direct current (DC) efficiency of at least about 10%, 20%, 30%, 35%, 40%, 45%, 50%, 55%, 60%, 65%, 70%, 75%, 80%, 90%, 95% and the like. In some instances, a cell can be capable of operating at a charge efficiency (e.g., Coulombic charge efficiency) of at least about 10%, 20%, 30%, 40%, 50%, 60%, 70%, 80%, 85%, 90%, 95%, 98%, 99%, 99.5%, 99.9%, 99.95%, 99.99%, and the like.

In a charged state, electrochemical cells of the disclosure (e.g., Type 1 cell operated in Type 2 mode, Type 1 cell operated in Type 1 mode, or Type 2 cell) can have (or can operate at) a voltage of at least about 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. In some cases, a cell can have an open circuit voltage (OCV) of at least about 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. In an example, a cell has an open circuit voltage greater than about 0.5 V, greater than about 1 V, greater than about 2 V, or greater than about 3 V. In some cases, a charge cutoff voltage (CCV) of a cell is from about 0.5 V to 1.5 V, 1 V to 3 V, 1.5 V to 2.5 V, 1.5 V to 3 V, or 2 V to 3 V in a charged state. In some cases, a charge cutoff voltage (CCV) of a cell is at least about 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In some cases, a voltage of a cell (e.g., operating voltage) is between about 0.5 V and 1.5 V, 1 V and 2 V, 1 V and 2.5 V, 1.5 V and 2.0 V, 1 V and 3 V, 1.5 V and 2.5 V, 1.5 V and 3 V, or 2 V and 3 V in a charged state. A cell can provide such voltage(s) (e.g., voltage, OCV and/or CCV) upon operating at up to and exceeding about 10 cycles, 20 cycles, 30 cycles, 40 cycles, 50 cycles, 100 cycles, 200 cycles, 300 cycles, 400 cycles, 500 cycles, 600 cycles, 700 cycles, 800 cycles, 900 cycles, 1,000 cycles, 2,000 cycles, 3,000 cycles, 4,000 cycles, 5,000 cycles, 10,000 cycles, 20,000 cycles, 50,000 cycles, 100,000 cycles, or 1,000,000 or more cycles (also "charge/discharge cycles" herein). A cell can be operated without a substantial decrease in capacity. During operation at an operating temperature of the cell, the cell can have a negative electrode, electrolyte and positive electrode in a liquid (or molten) state.

An electrochemical cell of the present disclosure can have a response time of any suitable value (e.g., suitable for responding to disturbances in the power grid). In some instances, the response time is about 100 milliseconds (ms), about 50 ms, about 10 ms, about 1 ms, and the like. In some cases, the response time is at most about 100 milliseconds (ms), at most about 50 ms, at most about 10 ms, at most about 1 ms, and the like.

A compilation or array of cells (e.g., battery) can include any suitable number of cells, such as at least about 2, at least about 5, at least about 10, at least about 50, at least about 100, at least about 500, at least about 1000, at least about 5000, at least about 10000, and the like. In some examples, a battery includes 1, 2, 3, 4, 5, 6, 7, 8, 9, 10, 15, 20, 30, 40, 50, 60, 70, 80, 90, 100, 200, 300, 400, 500, 600, 700, 800, 900, 1,000, 2,000, 5,000, 10,000, 20,000, 50,000, 100,000, 500,000, or 1,000,000 cells.

In some implementations, one or more types of cells can be included in energy storage systems of the present disclosure. For example, an energy storage device can comprise Type 2 cells or a combination of Type 1 cells and Type 2 cells (e.g., 50% Type 1 cells and 50% Type 2 cells). Such cells can be operated under Type 2 mode. In some cases, a first portion of the cells may be operated in Type 1 mode, and a second portion of the cells may be operated in Type 2 mode.

Batteries of the disclosure may be capable of storing, taking in, discharging, and/or returning a suitably large amount of energy (e.g., a substantially large amount of energy) for use with a power grid (i.e., a grid-scale battery) or other loads or uses. In some instances, a battery is capable of storing, taking in, discharging, and/or returning about 5 kilo-Watt-hour (kWh), about 25 kWh, about 50 kWh, about 100 kWh, about 500 kWh, about 1 mega-Watt-hour (MWh), about 1.5 MWh, about 2 MWh, about 3 MWh, about 5 MWh, about 10 MWh, about 25 MWh, about 50 MWh, or about 100 MWh. In some instances, the battery is capable of storing, taking in, discharging, and/or returning at least about 1 kWh, at least about 5 kWh, at least about 25 kWh, at least about 50 kWh, at least about 100 kWh, at least about 500 kWh, at least about 1 MWh, at least about 1.5 MWh, at least about 2 MWh, at least about 3 MWh, at least about 4 MWh, at least about 5 MWh, at least about 10 MWh, at least about 25 MWh, at least about 50 MWh, or at least about 100 MWh.

In some instances, the cells and cell housings are stackable. Any suitable number of cells can be stacked. Cells can be stacked side-by-side, on top of each other, or both. In some instances, at least about 3, 6, 10, 50, 100, or 500 cells are stacked. In some cases, a stack of 100 cells is capable of storing, taking in, discharging, and/or returning at least 50 kWh of energy. A first stack of cells (e.g., 10 cells) can be electrically connected to a second stack of cells (e.g., another 10 cells) to increase the number of cells in electrical communication (e.g., 20 in this instance). In some instances, an energy storage device comprises a stack of 1 to 10, 11 to 50, 51 to 100, or more electrochemical cells.

An electrochemical energy storage device can include one or more individual electrochemical cells. An electrochemical cell can be housed in a container, which can include a container lid (e.g., cell cap) and seal component. The device can include at least 1, 2, 3, 4, 5, 6, 7, 8, 9, 10, 20, 30, 40, 50, 100, 200, 300, 400, 500, 1000, 10,000, 100,000 or 1,000,000 cells. The container lid may utilize, for example, a seal (e.g., annular dielectric gasket) to electrically isolate the container from the container lid. Such a component may be constructed from an electrically insulating material, such as, for example, glass, oxide ceramics, nitride ceramics, chalcogenides, or a combination thereof (e.g., ceramic, silicon oxide, aluminum oxide, nitrides comprising boron nitride, aluminum nitride, zirconium nitride, titanium nitride, carbides comprising silicon carbide, titanium carbide, or other oxides comprising of lithium oxide, calcium oxide, barium oxide, yttrium oxide, silicon oxide, aluminum oxide, or lithium nitride, lanthanum oxide, or any combinations thereof). The seal may be made hermetic by one or more methods. For example, the seal may be subject to relatively high compressive forces (e.g., greater than about 1,000 psi or greater than about 10,000 psi) between the container lid and the container in order to provide a seal in addition to electrical isolation. Alternatively, the seal may be bonded through a weld, a braze, or other chemically adhesive material that joins relevant cell components to the insulating sealant material.

Figure 2:
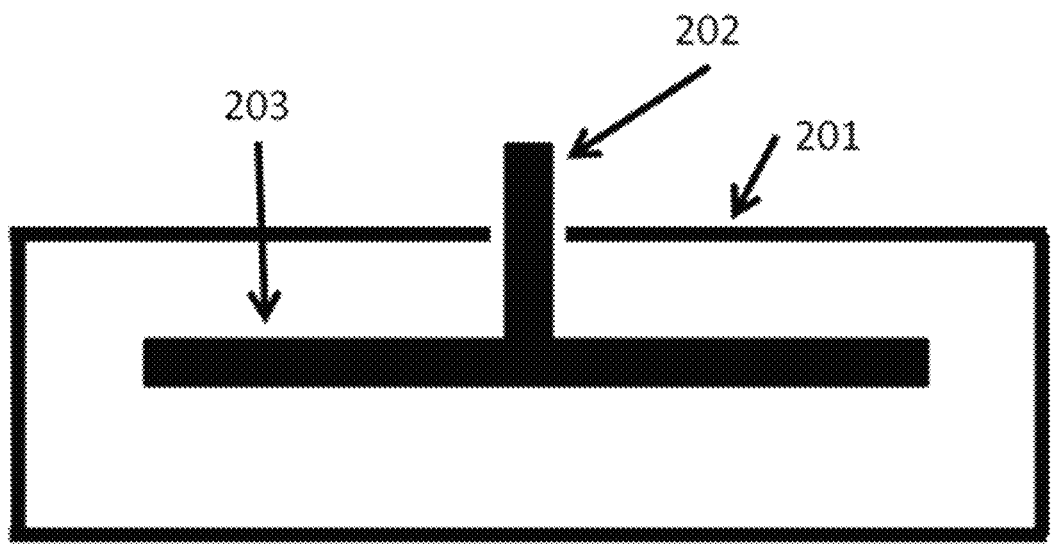
FIG. 2 is a schematic cross sectional illustration of a battery housing having a conductor in electrical communication with a current collector pass through an aperture in the housing.

FIG. 2 schematically illustrates a battery that comprises an electrically conductive housing 201 and a conductor 202 in electrical communication with a current collector 203. The battery of FIG. 2 can be a cell of an energy storage device. The conductor can be electrically isolated from the housing and can protrude through the housing through an aperture in the housing such that the conductor of a first cell is in electrical communication with the housing of a second cell when the first and second cells are stacked.

In some cases, a cell comprises a negative current collector, a negative electrode, an electrolyte, a positive electrode and a positive current collector. The negative electrode can be part of the negative current collector. As an alternative, the negative electrode is separate from, but otherwise kept in electrical communication with, the negative current collector. The positive electrode can be part of the positive current collector. As an alternative, the positive electrode can be separate from, but otherwise kept in electrical communication with, the positive current collector.

A cell housing can comprise an electrically conductive container and a conductor in electrical communication with a current collector. The conductor may protrude through the housing through an aperture in the container and may be electrically isolated from the container. The conductor of a first housing may contact the container of a second housing when the first and second housings are stacked.

In some instances, the area of the aperture through which the conductor protrudes from the housing and/or container is small relative to the area of the housing and/or container. In some cases, the ratio of the area of the aperture to the area of the housing is about 0.001, about 0.005, about 0.01, about 0.05, about 0.1, about 0.15, about 0.2, about 0.3, about 0.4, or about 0.5. In some cases, the ratio of the area of the aperture to the area of the housing is less than or equal to about 0.001, less than or equal to about 0.005, less than or equal to about 0.01, less than or equal to about 0.05, less than or equal to about 0.1, less than or equal to about 0.15, less than or equal to about 0.2, or less than or equal to about 0.3, less than or equal to about 0.4, or less than or equal to about 0.5.

A cell can comprise an electrically conductive housing and a conductor in electrical communication with a current collector. The conductor protrudes through the housing through an aperture in the housing and may be electrically isolated from the housing. The ratio of the area of the aperture to the area of the housing may be less than about 0.3, 0.2, 0.15, 0.1, 0.05, 0.01, 0.005, or 0.001 (e.g., less than about 0.1).

A cell housing can comprise an electrically conductive container and a conductor in electrical communication with a current collector. The conductor can protrude through the container through an aperture in the container and is electrically isolated from the container. The ratio of the area of the aperture to the area of the container may be less than about 0.3, 0.2, 0.15, 0.1, 0.05, 0.01, 0.005, or 0.001 (e.g., less than about 0.1). The housing can be capable of enclosing a cell that is capable of storing, taking in, discharging, and/or returning less than about 100 Wh of energy, about 100 Wh of energy, or more than about 100 Wh of energy. The housing can be capable of enclosing a cell that is capable of storing, taking in, discharging, and/or returning at least about 25 Wh of energy. The cell can be capable of storing, taking in, discharging, and/or returning at least about 1 Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, 30 kWh, 40 kWh, or 50 kWh of energy.

Figure 3:
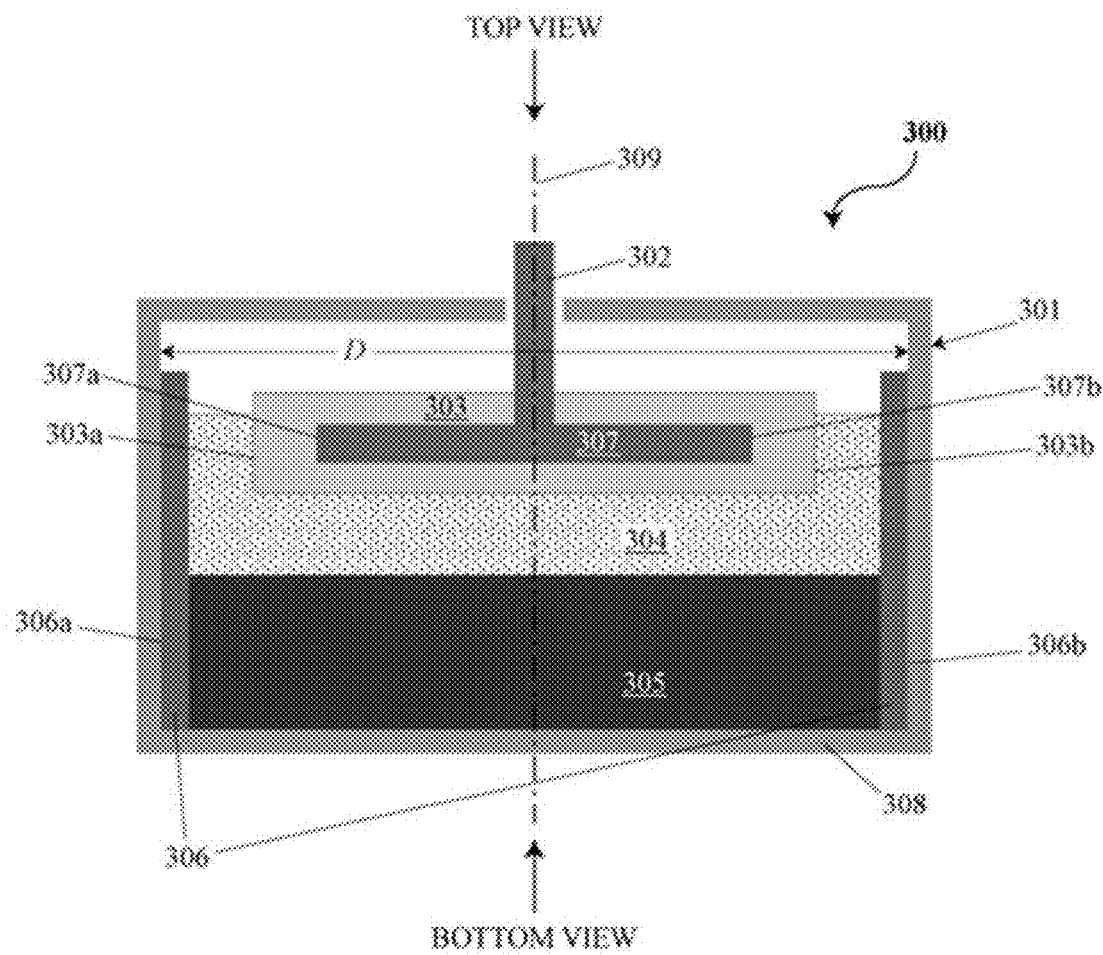
FIG. 3 is a cross-sectional side view of an electrochemical cell or battery.

FIG. 3 is a cross-sectional side view of an electrochemical cell or battery 300 comprising a housing 301, an electrically conductive feed-through (i.e., conductor, such as a conductor rod) 302 that passes through an aperture in the housing and is in electrical communication with a liquid metal negative electrode 303, a liquid metal positive electrode 305, and a liquid salt electrolyte 304 between the liquid metal electrodes 303, 305. The cell or battery 300 can be configured for use with cell chemistries operated under a low voltage mode ("Type 1 mode") or high voltage mode ("Type 2 mode"), as disclosed elsewhere herein. The conductor 302 may be electrically isolated from the housing 301 (e.g., using electrically insulating seals). The negative current collector 307 may comprise foam material 303 that behaves like a sponge, and the negative electrode liquid metal soaks into the foam. The liquid metal negative electrode 303 is in contact with the molten salt electrolyte 304. The liquid salt electrolyte is also in contact with the positive liquid metal electrode 305. The positive liquid metal electrode 305 can be in electrical communication with the housing 301 along the side walls and/or along the bottom end wall of the housing.

The housing may include a container and a container lid (e.g., cell cap). The container and container lid may be connected mechanically (e.g., welded). In some cases, the mechanical connection may comprise a chemical connection. In some instances, the container lid is electrically isolated from the container. The cell lid may or may not be electrically isolated from the negative current lead in such instances. In some instances, the container lid is electrically connected to the container (e.g., cell body). The cell lid may then be electrically isolated from the negative current lead. During operation (e.g., when in a molten state), the container lid and the container can be connected electronically (e.g., through a direct electrical connection, such as, for example, via a welded lid-to-cell body joint, or ionically through the electrolyte and the electrodes). The negative current lead may be electrically isolated from the container and/or container lid (e.g., cell cap), via, for example, the use of an electrically insulating hermetic seal. In some examples, an electrically insulating barrier (e.g., seal) may be provided between the negative current lead and the container lid. As an alternative, the seal can be in the form of a gasket, for example, and placed between the container lid, and the container. In some examples, the electrochemical cell or battery 300 may comprise two or more conductors passing through one or more apertures and in electrical communication with the liquid metal negative electrode 303. In some instances, a separator structure (not shown) may be arranged within the electrolyte 304 between the liquid negative electrode 303 and the (liquid) positive electrode 305.

The housing 301 can be constructed from an electrically conductive material such as, for example, steel, iron, stainless steel, low carbon steel, graphite, nickel, nickel based alloys, titanium, aluminum, molybdenum, tungsten, or conductive compounds such as nitrides (e.g., silicon carbide or titanium carbide), or a combination thereof (e.g., alloy).

The housing 301 may comprise a housing interior 306. The housing interior 306 may include, but is not limited to, a sheath (e.g., a graphite sheath), a coating, a crucible (e.g., a graphite crucible), a surface treatment, a lining, or any combination thereof). In one example, the housing interior 306 is a sheath. In another example, the housing interior 306 is a crucible. In yet another example, the housing interior 306 is a coating or surface treatment. The housing interior 306 may be thermally conductive, thermally insulating, electrically conductive, electrically insulating, or any combination thereof. In some cases, the housing interior 306 may be provided for protection of the housing (e.g., for protecting the stainless steel material of the housing from corrosion). In some cases, the housing interior can be anti-wetting to the liquid metal positive electrode. In some cases, the housing interior can be anti-wetting to the liquid electrolyte.

The housing may comprise a lining component (e.g., a lining component that is thinner than the cell body) of a separate metal or compound, or a coating (e.g., an electrically conductive coating), such as, for example, a steel housing with a graphite lining, or a steel housing with a nitride coating or lining (e.g., boron nitride, aluminum nitride), a titanium coating or lining, or a carbide coating or lining (e.g., silicon carbide, titanium carbide). The coating can exhibit favorable properties and functions, including surfaces that are anti-wetting to the positive electrode liquid metal. In some cases, the lining (e.g., graphite lining) can be dried by heating above room temperature in air or dried in a vacuum oven before or after being placed inside the cell housing. Drying or heating the lining can remove moisture from the lining prior to adding the electrolyte, positive electrode, or negative electrode to the cell housing.

The housing 301 may include a thermally and/or electrically insulating sheath or crucible 306. In this configuration, the negative electrode 303 may extend laterally between the side walls of the housing 301 defined by the sheath or crucible without being electrically connected (i.e., shorted) to the positive electrode 305. Alternatively, the negative electrode 303 may extend laterally between a first negative electrode end 303a and a second negative electrode end 303b. When the sheath or crucible 306 is not provided, the negative electrode 303 may have a diameter (or other characteristic dimension, illustrated in FIG. 3 as the distance from 303a to 303b) that is less than the diameter (or other characteristic dimension such as width for a cuboid container, illustrated in FIG. 3 as the distance D) of the cavity defined by the housing 301.

The crucible can be made to be in electronic contact with the cell housing using a thin layer of a conductive liquid metal or semi-solid metal alloy located between the crucible and the cell housing, such as the elements Pb, Sn, Sb, Bi, Ga, In, Te, or a combination thereof.

The housing interior (e.g., sheath, crucible and/or coating) 306 can be constructed from a thermally insulating, thermally conductive, and/or electrically insulating or electrically conductive material such as, for example, graphite, carbide (e.g., SiC, TiC), nitride (e.g., BN), alumina, titania, silica, magnesia, boron nitride, or a mixed oxide, such as, for example, calcium oxide, aluminum oxide, silicon oxide, lithium oxide, magnesium oxide, etc. For example, as shown in FIG. 3, the sheath (or other) housing interior 306 has an annular cross-sectional geometry that can extend laterally between a first sheath end 306a and a second sheath end 306b. The sheath may be dimensioned (illustrated in FIG. 3 as the distance from 306a to 306b) such that the sheath is in contact and pressed up against the side walls of the cavity defined by the housing cavity 301. As an alternative, the housing interior 306 can be used to prevent corrosion of the container and/or prevent wetting of the cathode material up the side wall, and may be constructed out of an electronically conductive material, such as steel, stainless steel, tungsten, molybdenum, nickel, nickel based alloys, graphite, titanium, or titanium nitride. For example, the sheath may be very thin and may be a coating. The coating can cover just the inside of the walls, and/or, can also cover the bottom of the inside of the container. In some cases, the sheath (e.g., graphite sheath) may be dried by heating above room temperature in air or dried in a vacuum oven before or after being placed inside the cell housing. Drying or heating the lining may remove moisture from the lining prior to adding the electrolyte, positive electrode, or negative electrode to the cell housing.

A cell can include an electrically insulating or electrically conductive, and chemically stable sheath or coating between one or more walls of the cell and the negative electrode, electrolyte and/or positive electrode to minimize or prevent shorting to the one or more walls of the cell. In some cases, the cell can be formed of a non-ferrous container or container lining, such as a carbon-containing material (e.g., graphite), or a carbide (e.g., SiC, TiC), or a nitride (e.g., TiN, BN), or a chemically stable metal (e.g., Ti, Ni, B). The container or container lining material may be electrically conductive.

Instead of a sheath, the cell may comprise an electrically conductive crucible or coating that lines the side walls and bottom inner surface of the cell housing, referred to as a cell housing liner, preventing direct contact of the positive electrode with the cell housing. The cell housing liner may prevent wetting of the positive electrode between the cell housing and the cell housing liner or sheath and may prevent direct contact of the positive electrode on the bottom surface of the cell housing. The sheath may be very thin and can be a coating. The coating can cover just the inside of the walls, and/or, can also cover the bottom of the inside of the container. The sheath may not fit perfectly with the housing 301 which may hinder the flow of current between the cell lining and the cell housing. To ensure adequate electronic conduction between the cell housing and the cell lining, a liquid of metal that has a low melting point (e.g., Pb, Sn, Bi), can be used to provide a strong electrical connection between the sheath/coating and the cell housing. This layer can allow for easier fabrication and assembly of the cell.

The housing 301 can also include a first (e.g., negative) current collector or lead 307 and a second (e.g., positive) current collector 308. The negative current collector 307 may be constructed from an electrically conductive material such as, for example, nickel-iron (Ni—Fe) foam, perforated steel disk, sheets of corrugated steel, sheets of expanded metal mesh, etc. The negative current collector 307 may be configured as a plate or foam that can extend laterally between a first collector end 307a and a second collector end 307b. The negative current collector 307 may have a collector diameter that is less than or similar to the diameter of the cavity defined by the housing 301. In some cases, the negative current collector 307 may have a collector diameter (or other characteristic dimension, illustrated in FIG. 3 as the distance from 307a to 307b) that is less than or similar to the diameter (or other characteristic dimension, illustrated in FIG. 3 as the distance from 303a to 303b) of the negative electrode 303. The positive current collector 308 may be configured as part of the housing 301; for example, the bottom end wall of the housing may be configured as the positive current collector 308, as illustrated in FIG. 3. Alternatively, the current collector may be discrete from the housing and may be electrically connected to the housing. In some cases, the positive current collector may not be electrically connected to the housing. The present disclosure is not limited to any particular configurations of the negative and/or positive current collector configurations.

The negative electrode 303 can be contained within the negative current collector (e.g., foam) 307. In this configuration, the electrolyte layer comes up in contact with the bottom, sides, and/or the top of the foam 307. The metal contained in the foam (i.e., the negative electrode material) can be held away from the sidewalls of the housing 301, such as, for example, by the absorption and retention of the liquid metal negative electrode into the foam, thus allowing the cell to run without the insulating sheath 306. In some cases, a graphite sheath or graphite cell housing liner (e.g., graphite crucible) may be used to prevent the positive electrode from wetting up along the side walls, which can prevent shorting of the cell.

Current may be distributed substantially evenly across a positive and/or negative liquid metal electrode in contact with an electrolyte along a surface (i.e., the current flowing across the surface may be uniform such that the current flowing through any portion of the surface does not substantially deviate from an average current density). In some examples, the maximum density of current flowing across an area of the surface is less than about 105%, or less than or equal to about 115%, less than or equal to about 125%, less than or equal to about 150%, less than or equal to about 175%, less than or equal to about 200%, less than or equal to about 250%, or less than or equal to about 300% of the average density of current flowing across the surface. In some examples, the minimum density of current flowing across an area of the surface is greater than or equal to about 50%, greater than or equal to about 60%, greater than or equal to about 70%, greater than or equal to about 80%, greater than or equal to about 90%, or greater than or equal to about 95% of the average density of current flowing across the surface.

Viewed from a top or bottom direction, as indicated respectively by "TOP VIEW" and "BOTTOM VIEW" in FIG. 3, the cross-sectional geometry of the cell or battery 300 can be circular, elliptical, square, rectangular, polygonal, curved, symmetric, asymmetric or any other compound shape based on design requirements for the battery. In an example, the cell or battery 300 is axially symmetric with a circular or square cross-section. Components of cell or battery 300 (e.g., component in FIG. 3) may be arranged within the cell or battery in an axially symmetric fashion. In some cases, one or more components may be arranged asymmetrically, such as, for example, off the center of the axis 309.

The combined volume of positive and negative electrode material may be at least about 5%, 10%, 20%, 30%, 40%, 50%, 60%, 70%, 80%, 90%, or 95% of the volume of the battery (e.g., as defined by the outer-most housing of the battery, such as a shipping container). In some cases, the combined volume of anode and cathode material is at least about 5%, at least about 10%, at least about 20%, at least about 30%, at least about 40%, at least about 60%, at least about 75%, of the volume of the cell. The combined volume of the positive and negative electrodes material may increase or decrease (e.g., in height) during operation due to growth or expansion, or shrinkage or contraction, respectively, of the positive or negative electrode. In an example, during discharge, the volume of the negative electrode (anode during discharge) may be reduced due to transfer of the negative electrode material to the positive electrode (cathode during discharge), wherein the volume of the positive electrode is increased (e.g., as a result of an alloying reaction). The volume reduction of the negative electrode may or may not equal the volume increase of the positive electrode. The positive and negative electrode materials may react with each other to form a solid or semi-solid mutual reaction compound (also "mutual reaction product" herein), which may have a density that is the same, lower, or higher than the densities of the positive and/or negative electrode materials. Although the mass of material in the electrochemical cell or battery 300 may be constant, one, two or more phases (e.g., liquid or solid) may be present, and each such phase may comprise a certain material composition (e.g., an alkali metal may be present in the materials and phases of the cell at varying concentrations: a liquid metal negative electrode may contain a high concentration of an alkali metal, a liquid metal positive electrode may contain an alloy of the alkali metal and the concentration of the alkali metal may vary during operation, and a mutual reaction product of the positive and negative liquid metal electrodes may contain the alkali metal at a fixed or variable stoichiometry). The phases and/or materials may have different densities. As material is transferred between the phases and/or materials of the electrodes, a change in combined electrode volume may result.

In some cases, a cell can include one or more alloyed products that are liquid, semi-liquid (or semi-solid), or solid. The alloyed products can be immiscible (or, in some cases, soluble) with the negative electrode, positive electrode and/or electrolyte. The alloyed products can form from electrochemical processes during charging or discharging of a cell.

An alloyed product can include an element constituent of a negative electrode, positive electrode and/or electrolyte. An alloyed product can have a different density than the negative electrode, positive electrode or electrolyte, or a density that is similar or substantially the same. The location of the alloyed product can be a function of the density of the alloyed product compared to the densities of the negative electrode, electrolyte and positive electrode. The alloyed product can be situated in the negative electrode, positive electrode or electrolyte, or at a location (e.g., interface) between the negative electrode and the electrolyte or between the positive electrode and the electrolyte, or any combination thereof. In an example, an alloyed product is an intermetallic between the positive electrode and the electrolyte (see, for example, FIG. 4). In some cases, some electrolyte can seep in between the intermetallic and the positive electrode. In other examples, the alloyed product can be at other locations within the cell and be formed of a material of different stoichiometries/compositions, depending on the chemistry, temperature, and/or charge state of the cell.

Figure 4:
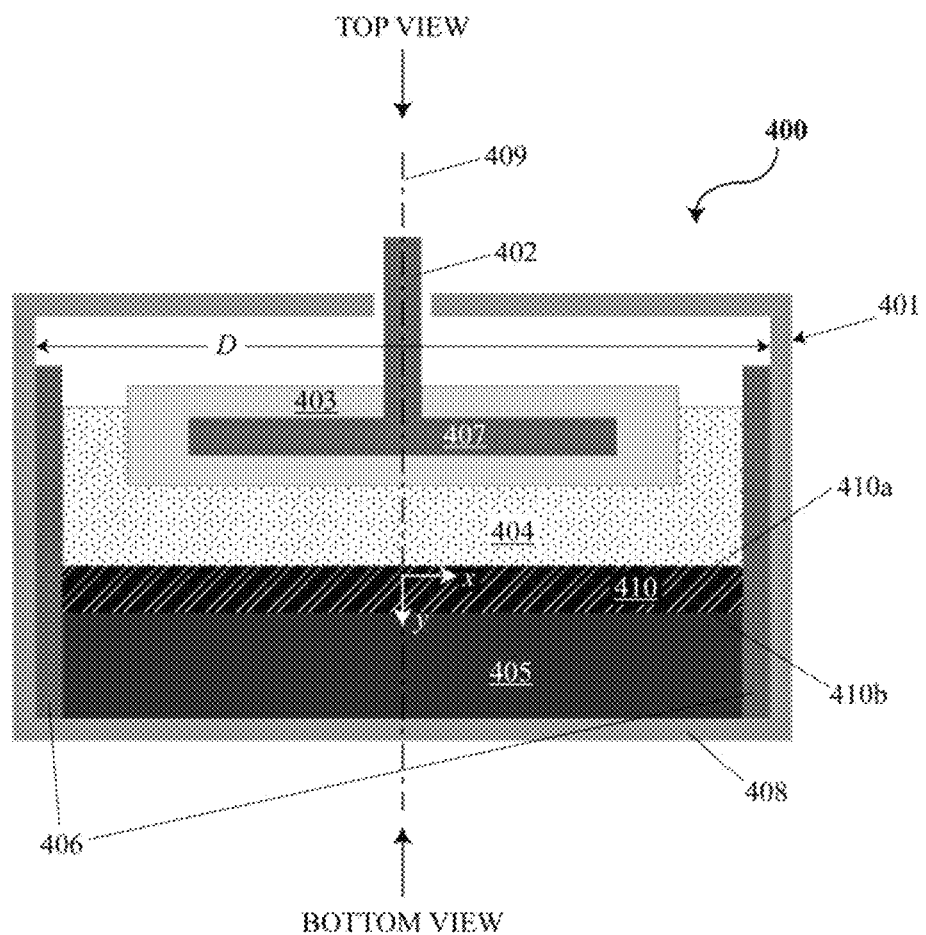
FIG. 4 is a cross-sectional side view of an electrochemical cell or battery with an intermetallic layer.

FIG. 4 is a cross-sectional side view of an electrochemical cell or battery 400 with an intermetallic layer 410. The intermetallic layer 410 can include a mutual reaction compound of a material originating from the negative electrode 403 and positive electrode material 405. For example, a negative liquid metal electrode 403 can comprise an alkali or alkaline earth metal (e.g., Na, Li, K, Mg, or Ca), the positive liquid metal electrode 405 can comprise one or more of transition metal, d-block (e.g., Group 12), Group IIIA, IVA, VA or VIA elements (e.g., lead and/or antimony and/or bismuth), and the intermetallic layer 410 can comprise a mutual reaction compound or product thereof (e.g., alkali plumbide, antimonide or bismuthide, e.g., $Na_3Pb$, $Li_3Sb$, $K_3Sb$, $Mg_3Sb_2$, $Ca_3Sb_2$, or $Ca_3Bi_2$). An upper interface 410a of the intermetallic layer 410 is in contact with the electrolyte 404, and a lower interface 410b of the intermetallic layer 410 is in contact with the positive electrode 405. The mutual reaction compound may be formed during discharging at an interface between a positive liquid metal electrode (liquid metal cathode in this configuration) 405 and a liquid salt electrolyte 404. The mutual reaction compound (or product) can be solid or semi-solid. In an example, the intermetallic layer 410 can form at the interface between the liquid metal cathode 405 and the liquid salt electrolyte 404. In some cases, the intermetallic layer 410 may exhibit liquid properties (e.g., the intermetallic may be semi-solid, or it may be of a higher viscosity or density than one or more adjacent phases/materials).

The cell 400 comprises a first current collector 407 and a second current collector 408. The first current collector 407 is in contact with the negative electrode 403, and the second current collector 408 is in contact with the positive electrode 405. The first current collector 407 is in contact with an electrically conductive feed-through 402. A housing 401 of the cell 400 can include a thermally and/or electrically insulating sheath 406. In an example, the negative liquid metal electrode 403 includes magnesium (Mg), the positive liquid metal electrode 405 includes antimony (Sb), and the intermetallic layer 410 includes Mg and Sb ($Mg_xSb$, where 'x' is a number greater than zero), such as, for example, magnesium antimonide ($Mg_3Sb_2$). Cells with a Mg∥Sb chemistry may contain magnesium ions within the electrolyte as well as other salts (e.g., $MgCl_2$, NaCl, KCl, or a combination thereof). In some cases, in a discharged state, the cell is deficient in Mg in the negative electrode and the positive electrode comprises and alloy of Mg—Sb. In such cases, during charging, Mg is supplied from the positive electrode, passes through the electrolyte as a positive ion, and deposits onto the negative current collector as Mg. In some examples, the cell has an operating temperature of at least about 550° C., 600° C., 650° C., 700° C., or 750° C., and in some cases between about 650° C. and about 750° C. In a charged state, all or substantially all the components of the cell can be in a liquid state. Alternative chemistries exist, including Ca-Mg||Bi comprising a calcium halide constituent in the electrolyte (e.g., $CaF_2$, KF, LiF, $CaCl_2$), KCl, LiCl, $CaBr_2$, KBr, LiBr, or combinations thereof) and operating above about 500° C., Ca-Mg||Sb-Pb comprising a calcium halide constituent in the electrolyte (e.g., $CaF_2$, KF, LiF, $CaCl_2$), KCl, LiCl, $CaBr_2$, KBr, LiBr, or combinations thereof) and operating above about 500° C., Li||Pb-Sb cells comprising a lithium-ion containing halide electrolyte (e.g., LiF, LiCl, LiBr, or combinations thereof) and operating between about 350° C. and about 550° C., and Na||Pb cells comprising a sodium halide as part of the electrolyte (e.g., NaCl, NaBr, NaI, NaF, LiCl, LiF, LiBr, LiI, KCl, KBr, KF, KI, $CaCl_2$), $CaF_2$, $CaBr_2$, $CaI_2$, or combinations thereof) and operating above about 300° C. In some cases, the product of the discharge reaction may be an intermetallic compound (e.g., $Mg_3Sb_2$ for the Mg||Sb cell chemistry, $Li_3Sb$ for the Li||Pb-Sb chemistry, $Ca_3Bi_2$ for the Ca-Mg||Bi chemistry, or $Ca_3Sb_2$ for the Ca-Mg||Pb-Sb chemistry), where the intermetallic layer may develop as a distinct solid phase by, for example, growing and expanding horizontally along a direction x and/or growing or expanding vertically along a direction y at the interface between the positive electrode and the electrolyte. The growth may be axially symmetrical or asymmetrical with respect to an axis of symmetry 409 located at the center of the cell or battery 400. In some cases, the intermetallic layer is observed under Type 1 mode of operation but not Type 2 mode of operation. For example, the intermetallic layer (e.g., the intermetallic layer in FIG. 4) may not form during operation of a Type 2 cell.

Wired or wire-less interconnections may be formed between individual electrochemical cells and/or between groups of electrochemical cells (e.g., modules, towers, packs, trays, cores, CEs, systems, or any other group comprising one or more electrochemical cells). In some cases, groups of cells may be joined via one or more cell-to-cell interconnections. In some cases, groups of cells may be joined via a group-level interconnection. The group-level interconnection may further comprise one or more interconnections with one or more individual cells of the group. The interconnections may be structural and/or electrical. Cells and/or groups of cells may be assembled (or stacked) horizontally or vertically. Such assembled cells and/or groups of cells may be arranged in series or parallel configurations. Further, groups of cells may be supported by various frames. The frames may provide structural support, participate or aid in forming the interconnections (e.g., frames on groups of cells may mate or be connected), and/or be part of a thermal management system (e.g., in concert with a thermal management frame). For example, an interconnection may be structural, electrical and/or thermal.

The electrochemical cells can be arranged in series and/or parallel to form an electrochemical energy storage system (e.g., battery). The energy storage system can comprise modules, packs, cores, CEs and/or systems of electrochemical cells surrounded by a frame (e.g., a frame that can be used for both structural support and thermal management of the system).

Figure 5:
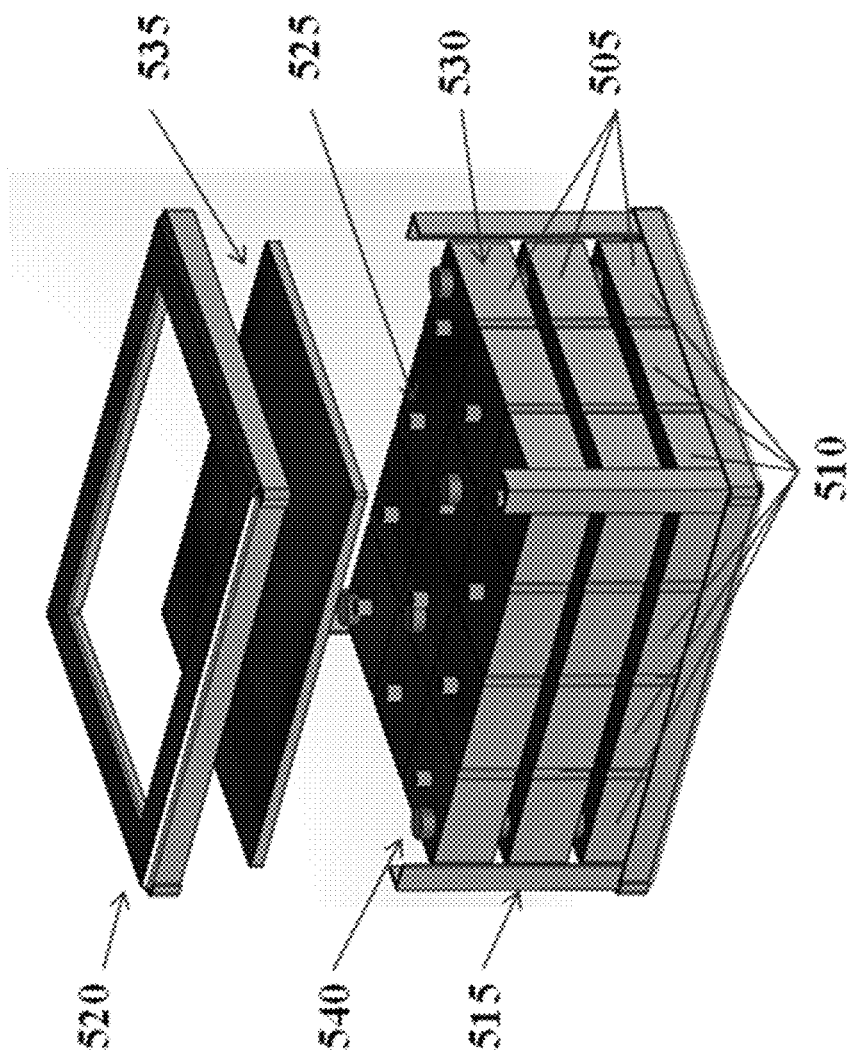
FIG. 5 shows an example of a cell pack.

FIG. 5 shows an example of a cell pack 500 comprising 3 modules 505. Each of the modules comprises 12 cells 530 that are connected in parallel 510. The modules are held in place with cell pack framing (also "frame" herein) 515 that includes a top component of the frame 520. The cells are stacked directly on top of each other with the negative current terminal of one cell 525 contacted directly with the housing of another cell (e.g., the cell above it). The negative current terminals of the top layer of cells will have no housing of another cell directly above, so can instead be contacted (e.g., brazed to, welded to) a negative busbar 535.

In some configurations, the parallel connections 510 made in the module can be created using a single piece (or component) with multiple pockets for cell materials. This piece can be a stamped component that allows for direct electrical connection between cells. In some examples, the stamped pocketed electrically conductive housing does not create a barrier between the cells. In some cases, the pocketed electrically conductive housing seals the pockets from each other. This electrically conductive housing can be easier to manufacture and assemble than individual electrically conductive cell housings. In some configurations, the parallel connections 510 made in the module can be created by direct contact of the housings of the cells in the module.

When stacked vertically, the electrochemical cells bear the weight of the cells stacked above. The cells can be constructed to support this weight. In some cases, cell-to-cell spacers 640 are placed between the layers of cells. These spacers can disperse the weight of the above cells and/or relieve some of the weight applied to the negative current terminals. In some cases, the negative current terminals are electrically isolated from the housing with a seal. This seal can be the weakest structural component of the electrochemical cell, so the spacers can reduce the amount of force applied to the seals.

In some implementations, a liquid metal battery comprises a plurality of electrochemical cells each comprising an electrically conductive housing and a conductor in electrical communication with a current collector. The electrically conductive housing can comprise a negative electrode, electrolyte and positive electrode that are in a liquid state at an operating temperature of the cell. The conductor can protrude through the electrically conductive housing through an aperture in the electrically conductive housing and can be electrically isolated from the electrically conductive housing with a seal. The plurality of electrochemical cells can be stacked in series with the conductor of a first cell in electrical contact with the electrically conductive housing of a second cell. The liquid metal battery can also comprise a plurality of non-gaseous spacers disposed between the electrochemical cells. In some cases, the electrochemical cells are stacked vertically. For example, at least 2, 3, 4, 5, 6, 7, 8, 9, 10, 15, 20, 25, 30, 36, 40, 48, 50, 60, 70, 80, 90, 100, 120, 140, 160, 180, 200, 216, 250, 256, 300, 350, 400, 450, 500, 750, 1000, 1500, 2000 or more electrochemical cells can be stacked in series. In some cases, the battery further comprises at least one additional electrochemical cell connected in parallel to each of the plurality of electrochemical cells that are stacked in series. For example, each vertically stacked cell can be connected in parallel with at least 1, 2, 3, 4, 5, 6, 7, 8, 9, 10, 15, 16, 20, 25, 30, 40, 50, 60, 70, 80, 90, 100, 120, 140, 160, 180, 200, 250, 300, 350, 400, 450, 500, 750, 1000, 1500, 2000 or more additional electrochemical cells. In some cases, the electrically conductive housings are part of a current conducting pathway.

The non-gaseous spacers (also "spacers" herein) can be a solid material. In some cases, the spacers comprise a ceramic material. Non-limiting examples of ceramic materials include aluminum nitride (AlN), boron nitride (BN), yttrium oxide ($Y_2O_3$), zirconium oxide ($ZrO_2$), yttria partially stabilized zirconia (YPSZ), aluminum oxide ($Al_2O_3$), chalcogenides, erbium oxide ($Er_2O_3$), silicon dioxide ($SiO_2$), quartz, glass, or any combination thereof. In some cases, the spacers are electrically insulating. The spacers can have any suitable thickness. In some cases, the thickness of the spacer is approximately equal to the distance that the conductor protrudes out of the electrically conductive housing (e.g., the thickness of the spacer can be within about 0.005%, about 0.01%, about 0.05%, about 0.1% or about 0.5% of the distance that the conductor protrudes out of the electrically conductive housing).

The cell to cell connections can be configured in a variety of ways based on tolerances and optimal conductive path. In one configuration, the top face of the negative current lead in one cell can be directly joined (e.g., brazed, welded) to the bottom of the cell above it (see, for example, FIG. 6). Other configurations can include, for example, alternative directly joined (e.g., alternative braze joined) configurations, such as an outer diameter braze enhanced by differences in the coefficient of thermal expansion (CTE) of an inner rod and an outer fixture. For example, two cells can be connected by a conductor of a first cell that sits in a recessed portion of an electrically conductive housing of a second cell, where the CTE of the conductor is greater than the CTE of the electrically conductive housing.

Figure 6:
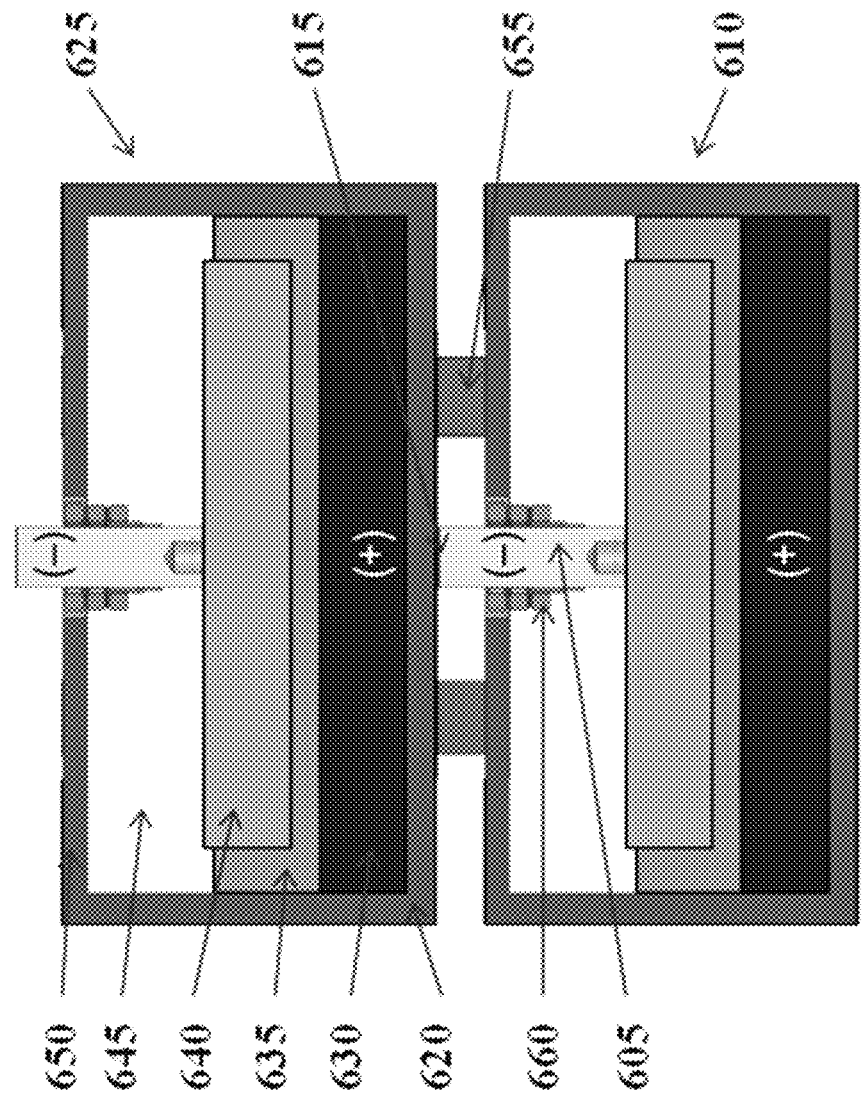
FIG. 6 shows an example of braze connection between the top of a conductive feed-through and the bottom of a cell.

In some cases, as shown in FIG. 6, the conductor 605 of a first cell 610 is brazed 615 to the electrically conductive housing 620 of the second cell 625. The braze material can be any suitable material. Some non-limiting examples of braze materials include materials that comprise iron (Fe), nickel (Ni), titanium (Ti), chromium (Cr), zirconium (Zr), phosphorus (P), boron (B), carbon (C), silicon (Si), or any combination thereof. The cell can comprise a cathode 630, an electrolyte 635 and an anode 640 connected to the current collector and conductor 605. The conductor can feed through the cell lid 650. In some cases, the cell has some empty head space 645.

In some implementations, the conductor 605 can feed through a seal 660 in the cell lid 650. The conductor (e.g., negative current lead) 605 may rigid. The seal 660 may not be rigid. As additional cells are added during assembly, an increasing weight can be exerted on the conductor 605 of the bottom cell 610 by the housing 620 of the top cell 625 (e.g., at the position 615). In some instances, the vertical spacing between the cells 610 and 625 may decrease if the seal 660 (with the conductor 605 and the anode 640) move downward into the cell 610 as a result of the compression force. To ensure that modules are electrically isolated from each other, spacers (e.g., ceramics) 655 can be placed across the surface of the cells to support the cells above them. In this configuration, the cell housing can be used as the main structural support for the system. The ceramic spacer 655 can relieve the seal 660 from having to support the weight of the top cell 625 (and any additional cells added during assembly). In some configurations, there may initially be a gap between the top of the spacers 655 and the bottom of the housing 620 of the top cell 625 (e.g., the thickness of the spacer can be slightly less than the distance that the conductor initially protrudes through the electrically conductive housing), and the spacers (e.g., ceramics) can be placed in compression during assembly as additional cell(s) are added (e.g., as the spacing between the top of the housing of the bottom cell 610 and the bottom of the housing of the top cell 625 decreases). As a result, the displacement (also "anode-cathode displacement" herein) between anodes and cathodes (e.g., final displacement after assembly between the anode 640 and the cathode 630 in cell 610) can in some cases be determined by the non-gaseous spacers. In some configurations, the spacers can be placed in compression right away (e.g., if the thickness of the spacer is slightly greater than the distance that the conductor initially protrudes through the electrically conductive housing).

Cells stacked vertically in series can be attached through a direct (e.g., hard) electrical connection such that the height from 650 to 640 and/or anode-cathode displacement (ACD) can be determined by the dimensional tolerance of 655. In some examples, the height from 650 to 640 can be at least about 3 millimeters (mm), at least about 5 mm, at least about 7 mm, at least about 10 mm, at least about 15 mm, and the like. In some examples, the ACD can be about 3 mm, about 5 mm, about 7 mm, about 10 mm, about 15 mm, or greater. FIG. 6 is an example of how such connections may be configured.

Cells stacked vertically in series can be connected using a direct electrical connection such that resistance per cell connection is reduced, for example, below about 100 milli-Ohm (mOhm), 10 mOhm, 1 mOhm, or 0.1 mOhm. FIG. 6 is an example of how such connections may be configured. FIG. 6 also provides an example of a CTE mismatched seal connection.

Figure 7:
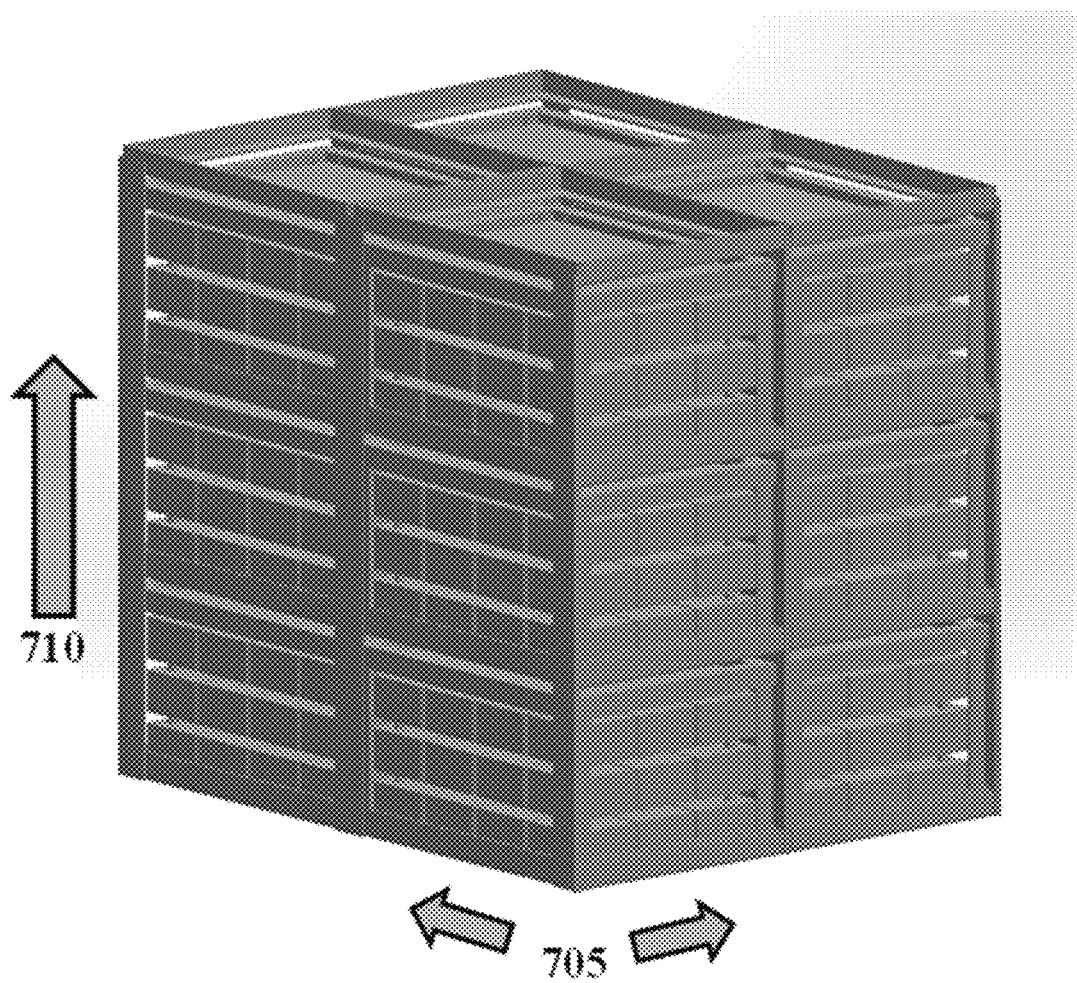
FIG. 7 shows an example of a stack of cell packs, also referred to as a core.

Cell packs can be attached in series and parallel in various configurations to produce cores, CEs, or systems. The number and arrangement of various groups of electrochemical cells can be chosen to create the desired system voltage and energy storage capacity. The packs, cores, CEs, or systems can then be enclosed together in high temperature insulation to create a system that can heat itself using the energy provided (e.g., rejected) from cells during charging and/or discharging. For example, FIG. 7 is an example of how packs can be configured, indicating that the cell packs in a given plane are connected to one another in parallel or in series 705, while the packs connected directly atop one another are connected in series 710.

The packs themselves can be connected vertically and horizontally to one another through one or more busbars (e.g., unlike the cell-to-cell connections within a pack which can be direct connections such as brazes or welds). In some cases, the busbar is flexible or comprises a flexible section (e.g., to accommodate non-isothermal expansion of the system throughout heat up and operation). In some cases, the busbar comprises or is connected via a compliant interconnection component (e.g., braided metal or metal alloy, or bent sheet metal) that may or may not comprise the same material as the (rest of the) busbar. The busbar and/or the compliant interconnection component can comprise a conductive material (e.g., stainless steel, nickel, copper, aluminum-copper based alloy, or any combination thereof). The pack may further comprise or form other or additional interconnections (e.g., to allow the pack to be interconnected with additional packs). In some implementations, busbars may be used to provide pack-level electrical connections/interconnections (e.g., only busbars may be used for pack-level electrical connections/interconnections).

A busbar can be used to make an electrical connection with cells in a parallel string (e.g., a parallel string of cells, a parallel string of packs, etc.). In some examples, a busbar can be used to configure a set of cells or cell modules into a parallel string configuration by being electrically connected with the same terminal on all of the cells or cell modules (e.g., the negative terminals of all of the cells or cell modules, or the positive terminals of all of the cell or cell modules). For example, a positive busbar and/or a negative busbar may be used. The positive busbar can be connected to the housing and may or may not need to be flexible. In some cases, the positive busbar may not be used. The negative busbar can be joined to features in (or on) one or more of the cell bodies (e.g., the cell bodies of individual cells in a pack) to provide a strong electrical connection. In some cases, the negative busbar can be attached to conductive feed-throughs (e.g., negative current leads), which may require some compliance for thermal expansion. For example, a flexible connection between a relatively rigid busbar core and the feed-through may be achieved using a compliance feature (e.g., a spiral pattern comprising one or multiple spiral arms) between the feed-through and the busbar. In some cases, the busbar may be sufficiently compliant such that the compliance feature is not needed. In configurations where cells are stacked vertically atop one another, the busbar at the top of the cell stack (e.g., cell pack stack) can comprise only the negative busbar (e.g., since the positive terminal of the stack can be on the bottom cell in the stack).

The core may be designed with multiple packs electrically connected in series and/or in parallel. The packs that are part of the core may be contained (e.g., all contained) within a single thermally managed chamber (also "thermal chamber" herein). For example, thermal insulation may surround a set of packs, thus maintaining (e.g., keeping) the packs (e.g., all packs) in good thermal contact with each other and thermally insulating the packs (e.g., all of the packs) from ambient conditions. In some cases, the core comprises electrically powered heaters installed near an inner surface of at least a portion of the insulation, electrically powered heaters distributed throughout the internal heated zone and/or connected to cell packs, or a combination thereof. The core may further comprise a frame (e.g., an internal metal frame). In some cases, the packs are arranged on trays that are arranged in a vertical and/or a horizontal stack. Each tray can provide mechanical support for the packs (e.g., the tray can comprise a frame). A plurality of trays (e.g., 2, 3, 4, 5, 10, 15, 20, 25, 30 or more trays) can be assembled into a core. The trays can be supported with the internal metal frame in the core.

Thermal insulation and/or frames may be provided with various groups of cells herein. The thermal insulation and/or the frame(s) may be configured to allow a group of cells to be cooled, the insulation to be removed, and individual or sets of subgroups of cells (or individual cells) to be disconnected, removed and/or replaced. For example, the thermal insulation and/or the frame may be designed to allow the core (and/or any system of the disclosure) to be cooled, the insulation to be removed, individual or sets of packs to be disconnected and removed from the core to allow for a single pack to be disconnected, removed and replaced, or any combination thereof. In some cases, a tray can be disconnected and removed from the core to allow for a single pack to be disconnected, removed and replaced, or any combination thereof. The core can then be reassembled and heated back up to operating temperature to allow for resumed operation. The thermal insulation and/or frames may further be configured to allow thermal management (e.g., modular thermal management) of individual cells or portion(s) thereof, groups of cells, or devices or systems comprising such cell(s).

Thermal Management

Elevated or high temperatures systems/devices (e.g., energy storage devices such as, for example, batteries) of the disclosure can comprise thermal management systems. In some cases, elevated temperature devices may be high temperature devices, and vice versa. In some examples, the energy storage system/device can comprise a plurality of electrochemical cells. Each electrochemical cell can comprise a negative electrode, an electrolyte and a positive electrode. At least one of the negative electrode, the electrolyte and the positive electrode can be in a liquid state at an operating temperature of the electrochemical cell.

In some implementations, thermal management of the devices (e.g., batteries) herein may include over-insulating (providing excess insulation) and cooling during normal operation. Heating can be performed at start-up of the device. For example, heating can be performed at start-up of a battery system that comprises a battery comprising one or more cells that may be organized in one or more groups of cells (e.g., for at least one of the metal electrodes and/or the electrolyte in the one or more cells to melt and/or for the battery to function). Heating may be achieved using any form of heaters, such as, for example, electrical resistance heaters that convert electrical energy from a power source (e.g., power generators via the electric power grid, back-up battery system, an on-site power generator such as a diesel generator, renewable power generators such as a wind turbine or a solar power system). Heating can also be provided to the system after it has been heated up in order to manage the temperature of the system during charging, discharging, and/or rest operating modes, or during periods of extended resting or during periods where the battery is charged and/or discharged at power rates below its regular (or normal) or intended operating power rates. When the battery is at, near or above its operating temperature, the battery may be able to keep itself warm by providing power from energy stored within the battery (e.g., the battery may discharge its energy to its own heaters). Battery insulation can be designed such that, once heated, the battery retains heat (e.g., in a thermal chamber of the battery) during idle time (e.g., when the battery is not charging or discharging). However, when the battery is operating, the thermal chamber may in some cases overheat. To regulate the temperature of the device (e.g., the temperature in the device chamber or container) during the cycling period (e.g., when the battery is charging and/or discharging), a thermal management system can be used (e.g., to cool hot zones). As cell components may require heat for operation, the system may be configured such that the cells and/or groups of cells (e.g., packs) are thermally insulated in excess to trap and retain as much heat as possible, while providing mechanism(s) for natural or forced movement of one or more thermal management fluids to help maintain given (e.g., optimal) thermal boundaries. The mechanism(s) may be activated by the thermal management system. Such activated cooling mechanisms may enable improved system reliability, performance robustness, and high efficiency operation. In some cases, the cooling mechanism(s) may comprise activated passive cooling (e.g., opening vents/convection flow channels, opening a vent/valve to allow natural convection to cool the system). In some cases, the cooling mechanism(s) may comprise active cooling (e.g., starting or increasing a flow of a thermal management fluid). In some cases, the cooling mechanism may comprise a combination of activated passive cooling and active cooling.

In an example, the system comprises an amount of insulation that enables the system to increase an internal temperature of the system above an operating temperature of the system (e.g., above the standard operating temperature) during regular operation. The system may maintain the internal temperature at about, or within less than about 10°

C., 20° C., 50° C., 100° C. or 200° C. of a given (e.g., desired) operating temperature by activating an actuator, such as, for example, a valve or a lift-gate, to allow a fluid (e.g., thermal management fluid) to flow through one or more fluid flow paths driven by natural convection. The system may be self-heated under normal/regular operation, and may need to be cooled via activated passive cooling to maintain its operating temperature.

In some implementations, the thermal management system may provide a mechanism for emergency cool-down (e.g., in a condition where emergency shut-down of the battery system is required, such as, for example, due to a natural disaster in the deployed region). Emergency cool-down may be triggered by a thermal management computer system when it receives one or more specific signals. Such signal(s) may comprise signal(s) received from within the system (e.g., battery system or a larger system comprising the battery system) and/or outside signal(s) indicating that emergency cool-down procedures are to be initiated (e.g., earthquake alert). The emergency cool-down may include one or more mechanisms for rejecting/evacuating heat from the battery system to the thermal management fluid and/or to the environment (e.g., surrounding atmosphere). For example, the emergency cool-down may include increasing a flow rate of the thermal management fluid, partially or fully opening vent(s) or other thermal relief structure(s) in the system, and/or varying a temperature of the thermal management fluid supplied (in) to the system such that more thermal energy can be removed from the system.

A thermal management system (e.g., within a battery system) configured to implement such mechanism(s) can be integrated in a frame (e.g., a support frame) of the battery, allowing thermal management fluid(s) to flow through the system (e.g., battery system). In some cases, the thermal management fluids may flow through the system (e.g., battery system) without touching any cells or cell components. In some cases, such functionality/mechanisms may be integrally formed with (e.g., built into) one or more structural members of the battery or a portion thereof (e.g., a structural support member of a core, such as, for example, a frame). In some cases, such functionality/mechanisms may be attached to one or more structural support members (e.g., a structural support member of a core). In some cases, the structural support members can be designed as dual-purpose components (e.g., providing structural support and also providing a mechanism for heat evacuation as needed).

During operation of a high temperature system (e.g., core) comprising high temperature cells, cells may generate heat during charging and/or discharging processes. If a system is operated continuously, sufficiently often and/or with sufficient intensity (e.g., sufficiently high charging/discharging rate) within a given time period, and if the system is configured in such a way that the heat generated through the charging and/or discharging processes can be at least partially contained (e.g., through thermal insulation around one or more packs of cells), such a system may continuously maintain its cells at or above its operating temperature without the need to add additional heat (e.g., through the use of electric heaters). In some cases, the amount of heat generated through normal or regular (e.g., intended) operation (e.g., charge for 5 hours, then rest for 7 hours, then discharge for 5 hours, then rest for 7 hours, repeated daily) may equal the amount of heat lost to the environment.

Normal or regular operation may include or be defined in terms of one or more charge/discharge operating metrics, such as, for example, overall (e.g., average) charging/discharging rate (e.g., time to fully charge, time to fully discharge), amount of energy charged or discharged (e.g., change in energy storage capacity upon charging/discharging) and/or energy efficiency (e.g., energy efficiency over a given time period). Operating parameters (e.g., charge or discharge rate) may fluctuate over time. The operating metrics may then be provided on an average or overall basis (e.g., average discharge over a 24-hour period may be specified even though the discharge rate may fluctuate over time; regardless of charge/discharge profile, the system may have a given charge/discharge metric when it returns to the same state of charge). A system with such charge/discharge metric(s) may be self-heated (e.g., upon the charging/discharging under such conditions, a portion of the energy may dissipate due to inefficiencies to provide the necessary heating), or may use a given amount of additional energy (e.g., less than about 10% of energy discharged to the grid) to provide heating.

Normal or regular operation may include charging the system at a rate that can fully charge the system (e.g., from minimum to full or maximum charge) in at least about 1 hour, 2 hours, 3 hours, 4 hours, 5 hours, 6 hours, 7 hours, 8 hours, 10 hours, 12 hours, 14 hours, or 20 hours. Normal or regular operation may include discharging the system (e.g., from full or maximum charge to minimum charge) at a rate that can fully discharge the system in at least about 1 hour, 2 hours, 3 hours, 4 hours, 5 hours, 6 hours, 7 hours, 8 hours, 10 hours, 12 hours, 14 hours, or 20 hours. Normal or regular operation may include charging and/or discharging the system for a period of less than about 1 hour, less than about 2 hours, less than about 4 hours, less than about 6 hours, less than about 8 hours, less than about 12 hours, less than about 14 hours, less than about 18 hours, less than about 20 hours, less than about 24 hours, less than about 36 hours, or less than about 48 hours. Normal or regular operation may include cumulate charge or energy passed during charging and/or discharging (e.g., a single charge and/or discharge cycle, or cumulative energy from several charge/discharge cycles, such as, for example, by charging 1 Wh, discharging 1 Wh, charging 1.5 Wh and discharging 1.5 Wh, thereby discharging 2.5 Wh (i.e., 1 Wh+1.5 Wh) overall) the system to release (e.g., to the grid) an amount of energy that is at least about 10%, 20%, 30%, 40%, 50%, 60%, 70%, 80%, 90%, 95%, 100%, 110%, 125%, 150%, 175%, 200%, 250%, 300%, 400%, 500%, 750%, 1000%, 2000%, 5000%, or 10,000% of its rated energy storage capacity within a given time period (e.g., less than or equal to about 2 weeks, 1 week, 4 days, 48 hours, 24 hours, 12 hours, 8 hours, 4 hours, or 1 hour). The system may release more energy than its rated energy capacity within a given time period by undergoing multiple partial and/or full discharge and/or charge cycles within the given time period). Normal or regular operation may include resting for a given (e.g., some) period between charging and/or discharging. The resting period may be less than about 1 hour, 2 hours, 3 hours, 4 hours, 5 hours, 6 hours, 7 hours, 8 hours, 10 hours, 12 hours, 14 hours, 18 hours, 20 hours, 24 hours, 36 hours, or 48 hours. The system may be operated at such charge/discharge metrics with a given average efficiency. For example, an overall DC-to-DC energy efficiency may be at least about 30%, 40%, 50%, 60%, 70%, 80%, 90%, 95% or 99%. Normal or regular operation may include discharging some cumulative amount of energy (e.g., at least about 50% of its rated energy capacity, at least about 80% of its rated energy capacity), charging some cumulative amount of energy (e.g., at least about 50% of its rated energy capacity, or at least about 80% of its rated energy capacity), not resting for a period or resting for some cumulative period between charge/discharge and/or charge/charge and/or charge/discharge operational modes (e.g., less than about 20 hours, less than about 16 hours), achieving some DC-to-DC round-trip energy efficiency (e.g., less than about 90%, less than about 80%, or less than about 70%), and/or operating at such charge/discharge metrics within a given time period (e.g., less than about 48 hours, or less than about 24 hours).

Such a system may be capable of maintaining its cells at or above a given cell operating temperature (e.g., a target cell operating temperature) as long as the system is being operated in this manner. Thus, a battery system can be configured to balance the heat generated with the heat released to the environment by providing a suitable amount of insulation and by controlling heat loss through other heat loss paths (e.g., not through insulation but through vents, thermal management fluid, etc.). In some cases, the battery system can be configured to balance the heat generated with the heat released to the environment by providing a suitable amount of insulation, by controlling heat loss through other heat loss paths (e.g., not through insulation but through vents, thermal management fluid, etc.) and by operating the system regularly (e.g., continuously, often).

In some cases, there can be (e.g., extended) periods of inactivity within the cells (e.g., during which the cells are not charging or discharging). Thermal insulation can be used to prevent heat loss from the cells (e.g., to keep the metal electrodes molten when heat is not being generated from charging or discharging of the cell). The thermal insulation may be designed such that it maintains the cells at or above operating temperature for a given period of time (e.g., a finite period of time, such as, for example, at least about 30 minutes, 1 hour, 2 hours, 4 hours, 6 hours, 8 hours, 10 hours, 12 hours, 18 hours, 24 hours, 2 days, 5 days, 10 days, 20 days, 1 month, or more) when the cells are inactive and/or when no supplemental heating power is provided through heaters.

In some cases, a system (e.g., energy storage system such as, for example, a battery system) may be designed to operate without the need for heating even when the system is used less regularly and/or less intensely (e.g., than originally intended or quantified by a system specification, than normal or regular operation). A measure of the regularity of operation of the system may in some cases be based on percentage of use of the system during a given (e.g., specified) time period. For example, the system may be actively charging and/or discharging for less than or equal to about 99.5%, 99%, 95%, 90%, 85%, 80%, 75%, 70%, 65%, 60%, 55%, 50%, 45%, 40%, 35%, 30%, 25%, 20%, 15%, 10%, 5%, or less of the given time period (e.g., the battery may be in charging or discharging mode for less than about 20% of the time over a three day period). A measure of the intensity of operation of the system may in some cases be based on average charge or discharge power over a given (e.g., specified) time period as a percentage of its maximum rated power capacity. The given time period may include periods of rest (e.g., 0% of rated power). For example, the system may have an average charge or discharge power of less than or equal to about 99%, 95%, 90%, 80%, 70%, 60%, 50%, 40%, 30%, 20%, 10%, 5%, 1%, or less of its rated power over the given time period. In some examples, the given (e.g., specified) time period may be equal to or at least about 1 hour, 2 hours, 5 hours, 10 hours, 12 hours, 24 hours, 36 hours, 2 days, 3 days, 4 days, 5 days, 1 week, 2 weeks or 4 weeks.

The thermal insulation may allow the system to be (e.g., fully) self-heated when operated normally/regularly (e.g., when cycled at least once every 2 days, or with at least 50% of its energy capacity discharged at least every two days). For example, thermal insulation may enable the system to operate continuously in the self-heated configuration when charged and discharged (or cycled) at least once every 2 days. In some examples, the normal/regular operation may include cycling (an example of a charge/discharge metric associated with such operation) at least once every 1 day, 2 days, 3 days, 4 days, or the like.

In such cases (e.g., during periods of inactivity, or when used less regularly or less intensely), it may be desirable to configure the system with an excess amount of insulation (e.g., reduced rate of heat loss) as well as capability to perform activated passive cooling, such as, for example, opening a valve, lift-gate or other thermal relief mechanism(s) to increase rate of heat loss and thus prevent over-heating. In some cases, cooling channels in the system that can transport air from outside a thermally maintained zone of the system (e.g., zone comprising the thermal chamber) may be activated such that air moves through one or more (e.g., dedicated) channels of (e.g., within) the system. Air heated within the system is allowed to (e.g., safely) exit the system through one or more channels of the system with or without the use of forced air convection systems (e.g., fans, blowers, air handlers, etc.). In some cases, air transport channels may be configured to allow natural convection to set in when thermal relief features are activated.

During periods of inactivity, or when used less regularly or less intensely, the system may continue to operate (or exist in a 'rest' operational mode and be ready to be charged or discharged) above a given temperature (e.g., a pre-defined minimum operating temperature limit, such as, for example, at least about 300° C., 350° C., 400° C., 450° C., 475° C., 500° C., 550° C., or 600° C.) without the need to add heat to the system. Thus, a robust system design of a high temperature battery may include over-insulating the system and performing activated passive cooling. Such a system configuration may enable more efficient operation during periods of inactivity and/or during less regular/intense use, and enable efficient operation when operated normally (e.g., as intended during periods of activity when cells are charging or discharging and/or during regular/intense use). Over-insulation and activated passive cooling may in some cases be more efficient (e.g., most advantageously employed) during periods when the system is used less regularly or less intensely.

The thermal management system may need to dissipate heat generated during charging and/or discharging (e.g., using active cooling or activated passive cooling) to prevent over-heating (e.g., especially since the system may be insulated). For example, the thermal management system can be configured to dissipate heat generated during normal/regular charging and/or during higher power discharging. In some cases, heat can be added to the system using heaters to keep the system above a minimum operating temperature during periods of resting and/or low intensity operation (e.g., operating at low rates of charging and/or discharging).

Thermal Management Via Frames

The thermal management system may be implemented with the aid of one or more structural members of the device configured as conduits for cooling. In some cases, the thermal management system may be implemented with the aid of one or more frames on the device. Described herein are examples of frame structures that comprise conduit(s) for thermal management in elevated or high temperatures devices, such as, for example, high temperature batteries.

An energy storage system of the disclosure can include a frame supporting at least a portion of a plurality of electrochemical cells. The frame can have one or more fluid flow paths for bringing a thermal management fluid in thermal communication with at least a subset of the plurality of electrochemical cells. The thermal management fluid can be any suitable fluid, including but not limited to air, purified/ cleaned air, a gas (e.g., helium, argon, supercritical $CO_2$), oil, water, molten salt, or steam. Examples of gases are argon or nitrogen. In some cases, ambient air may be used. In some cases, the thermal management fluid has a high heat capacity.

Figure 8:
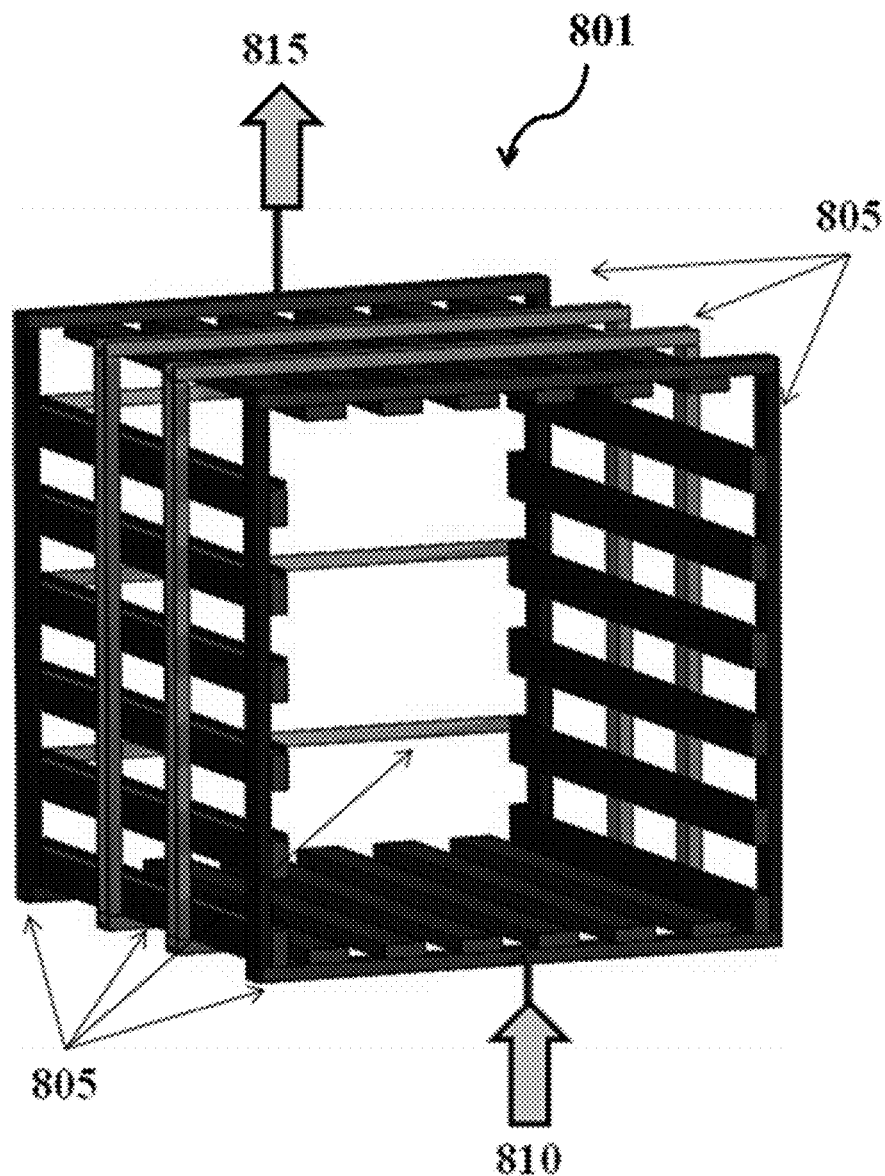
FIG. 8 shows an example of thermal management fluid flowing through a frame.

FIG. 8 shows an example of thermal management fluid being passed through a frame 801 structure of an energy storage device such as, for example, a battery (e.g., a liquid metal battery). The frame may have one or more functions (e.g., multiple critical functions) (with) in the device or (with) in a system comprising the device. Examples of such function(s) include, but are not limited to: (i) providing mechanical support to the cells and/or groups of cells (e.g., modules, packs, and/or cores) within the device/system, (ii) ensuring cells or groups of cells do not directly short to one another or short to grounded connections, (iii) maintaining electrical isolation between cells and/or groups of cells (e.g., modules and/or packs) and other non-electrically active structural members, and/or (iv) providing a path for thermal management fluid to flow to aid in thermal management of the battery (or battery system). In some cases, the frame 801 can comprise (e.g., be made of) frame elements 805 (e.g., pieces of the frame that can be joined together to make the frame). The frame elements 805 can comprise, for example, tubes, pipes, or enclosed trusses. The frame elements can be welded together. In some cases, the frame 801 can be integrally formed. In some cases, the frame 801 and/or portion(s) thereof can be joined with other frame(s) in the device/system. In some cases, thermal management fluid flow pathways may be welded or otherwise connected or joined to one or more portions of the frame structure. For example, external tubing may be joined to one or more fluid inlets or outlets on the frame 801 or on individual frame element(s) 805). The fluid inlet(s)/outlet(s) may be in fluid communication with fluid flow conduits in frame or frame element(s).

The frame can be of any suitable size or shape. In some cases, the frame is a rectangular box, e.g., comprising any number of vertical and horizontal frame elements 805 as shown in FIG. 8. The frame can mechanically and/or structurally support the electrochemical cells in a series and/or parallel configuration. In some cases, the frame partitions the electrochemical cells into subsets having any number of cells (e.g., groups of cells as described elsewhere herein). The electrochemical cells within a subset can be connected in parallel and/or series. Further, as described in greater detail elsewhere herein, the frame can be joined and/or otherwise connected with other frame(s). For example, groups of cells can comprise (and/or be contained within or supported by) frames, and the frames can be used to assemble the groups of cells into larger units. The assembly may include joining of fluid conduits in adjacent frames.

The frame (or any portion thereof) may be configured to interface with thermal insulation. In some implementations, the frame can comprise one or more specific areas or portions that act as tethering or harnessing locations for thermal insulation mounting. In some instances, thermal insulation may be attached to the frame through rigid metallic connections that may be permanently connected (e.g., welded or bonded) to the frame (or any portion thereof). In other instances, thermal insulation may be connected to the frame such that the connection points are removable or replaceable (e.g., to facilitate service access or periodic replacement). Thermal insulation may be assembled to the frame such that the insulation region of the assembly (e.g., a region comprising the thermal insulation and/or conduits or connections passing through the thermal insulation) does not create a direct thermal pathway between thermally insulated regions (e.g., region comprising a thermal chamber of the device, or a thermally maintained zone of the system) of the assembly, and non-insulated regions of the assembly and/or the surrounding environment.

Figure 12:
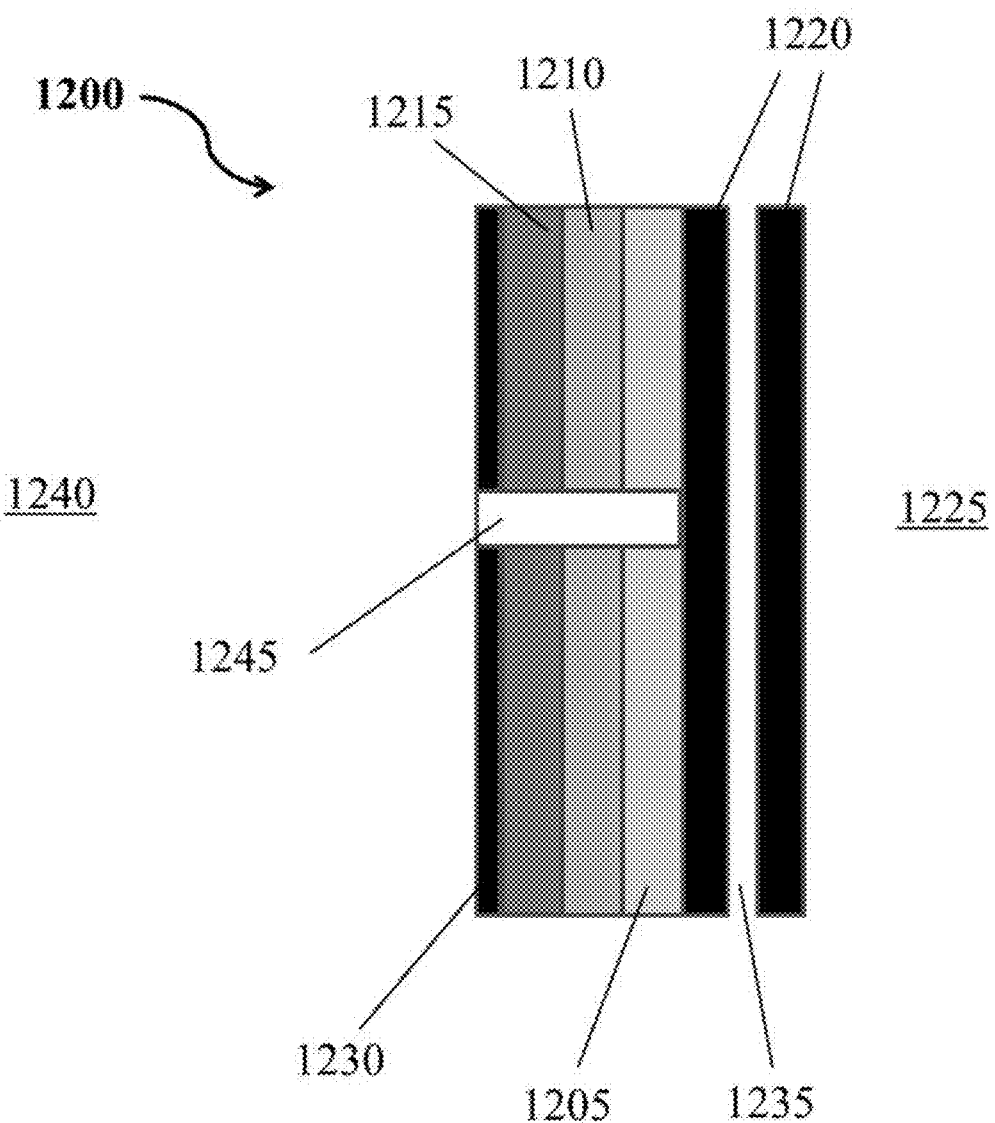

Implementations of the insulation may include configurations with multiple layers (see, for example, FIG. 12). For example, a thermal insulation structure (e.g., such as the portion of thermal insulation 1200 in FIG. 12) may comprise at least about 1, 2, 3, 4, 5, 6, 7, 8, 9, 10, 12, 14, 16, 18, 20, 25, 30, 35, or 40 layers. The layers (or any subset thereof) may be formed of same, similar (e.g., comprising chemically similar materials, or comprising blends comprising at least about 10% 40%, 50%, 60%, 70%, 80% or 90% of a common material) or different materials. In some cases, at least about, about, or less than about 5%, 10%, 15%, 20%, 25%, 30%, 35%, 40%, 45%, 50%, 55%, 60%, 65%, 70%, 75%, 80%, 85%, 90%, 95% or 100% of the layers in a given thermal insulation structure are same or similar. In some cases, the layering may aid the thermal insulation performance. For example, thin sheets of air or bonding material between layers may create additional insulating interfaces.

The frame can comprise a chamber that contains at least a subset of the plurality of electrochemical cells. The frame or chamber can contain any number of electrochemical cells (e.g., 1, 2, 3, 4, 5, 6, 7, 8, 9, 10, 11, 12, 13, 14, 15, 16, 17, 18, 19, 20, or more). In some cases, the frame or chamber contains at least about 5, at least about 10, at least about 20, at least about 30, at least about 40, at least about 50, at least about 60, at least about 80, at least about 100, at least about 200, at least about 300, at least about 400, at least about 500, at least about 600, or at least about 700 electrochemical cells. The chamber can be a thermal chamber. In some cases, the frame or chamber can comprise multiple thermal chambers.

With continued reference to FIG. 8, the frame can comprise one or a plurality of fluid flow paths. In some implementations, the fluid flow paths may be parallel. For example, a plurality of parallel fluid flow paths may be provided. At least a portion of the fluid flow paths may be separately controllable (e.g., by a control system of the disclosure). Such control may include opening/closing of one or more flow paths, control or maintenance of flow rate(s), control or maintenance of fluid temperature, etc. For example, a fluid flow rate (e.g., mass flow rate, volumetric flow rate) through at least two of the parallel fluid flow paths can be separately controllable. The thermal management fluid can enter fluid flow paths, e.g., at 810, through one or more openings. The fluid can then flow through the frame through any number of (e.g., orthogonal, parallel) fluid flow paths 805. An individual fluid flow path may have a cross-sectional geometry that is circular, square, rectangular, oval, or any other suitable shape. The fluid flow path may have a cross sectional area of less than about 0.1 $cm^2$, less than about 0.5 $cm^2$, less than about 1 $cm^2$, less than about 2 $cm^2$, less than about 5 $cm^2$, less than about 10 $cm^2$, less than about 20 $cm^2$, less than about 50 $cm^2$, or less than about 100 $cm^2$. The fluid can exit the fluid flow paths, e.g., at 815, through one or more openings. In an alternative configuration, the fluid can enter the frame at 815 and exit at 810. Further, the fluid can alternatively or additionally enter and/or exit the frame on any face or boundary of the frame (e.g., on a face perpendicular or adjacent to the faces/boundaries comprising the inlet/outlet 810 or 815). In some cases, the thermal management fluid enters the frame through a first opening, is divided into a plurality of fluid flow paths, and exits through a second opening. In some cases, the thermal management fluid enters the frame through two or more distinct openings. The thermal management fluid may flow through distinct thermal flow paths (e.g., each in fluid communication with one or more distinct openings, such as, for example, a distinct inlet and/or a distinct outlet) that separate the fluid in each path, thus enabling the system to separately control fluid flow rate through each path (e.g., each controlled by their own fluid flow control actuator, such as, for example, a life-gate or valve). Such fluid control may be implemented with the aid of control systems (e.g., system 1100 in FIG. 11) configured to implement methods of the disclosure.

In some cases, the thermal management fluid does not contact the electrochemical cells (e.g., the thermal management fluid can be retained within the frame elements). The frame can be made from any suitable material including plastic, aluminum, steel or stainless steel. The frame can be resistant to corrosion. In some cases, the frame contacts the thermal management fluid and is chemically resistant to thermal management fluid. The disclosure allows for multiple uses ("multi-use") of the frame, including, for example, direct contact with the middle of a hot zone to absorb heat (e.g., pull heat away) from the hottest point in the device/system. In some cases, the thermal management fluid does not come in contact with cells (e.g., thereby increasing cell life and reducing system complexity). The frame can be chemically resistant to reactive materials (e.g., reactive metals), such as, for example, reactive metals used in the electrochemical cells (e.g., so that the frame can maintain its structure should one of the electrochemical cells leak).

The frame can have a feature or characteristic (e.g., geometric feature) that selectively accelerates heat transfer (e.g., the thickness or composition of the frame elements and/or the cross-sectional area or diameter of fluid flow path(s) can be different to allow more or less heat to pass between the electrochemical cells and the thermal management fluid). For example, a dimension of the frame (e.g., thickness, cross-sectional area or diameter of a fluid flow path in the frame, or thermal mass of the frame as a whole), or a portion thereof, can be configured to selectively accelerate heat transfer (e.g., in accordance with location of the frame or frame portion within the system). Various geometric features may enable various configurations of thermal management fluid routing. In some cases, the fluid flow path may be routed between cells or groups of cells (e.g., between packs) to permit selective removal of heat from the system. In some cases, the fluid may be routed directly onto one or more cell housings (or portions thereof) or onto frames, interconnections, or other structural or heat transfer members associated with individual cells or groups of cells. In some cases, the fluid may be routed via a duct, tubing, fins, or other heat transfer members in contact with one or more cell housings (or portions thereof) or in contact with frames, interconnections, or other structural or heat transfer members associated with individual cells or groups of cells.

The system can be insulated. In some cases, thermal insulation surrounds the frame (or frame elements) and/or is provided on the inside of fluid flow channel(s). Thermal insulation inside of a fluid flow channel can provide thermal insulation between the thermal transfer fluid (also "thermal management fluid" herein) and one or more structural portions of the fluid flow channel (e.g., stainless steel frame). The insulation can be distributed in a manner that facilitates thermal management of the system. An amount (e.g., volume, mass, thickness, total insulating capability, etc.) of thermal insulation at or in proximity to (e.g., facing) the center of the system/device and/or frame (e.g., at or in proximity to a heated zone) may be less than an amount of thermal insulation at or in proximity to the periphery of the system/device and/or frame (e.g., not at or not in proximity to a heated zone, or facing away from the center). For example, the system may comprise insulation along at least a portion of a fluid flow path to aid in removal of heat from a predetermined location within the system. The amount of insulation along any given portion may vary in accordance with location. For example, least amount of insulation may be provided in a location that is in proximity or adjacent to a heated zone (e.g., the insulation is thinner in a portion of the fluid flow path adjacent a heated zone of the system, and/or the insulation is thinner in a portion of the fluid flow path that is in the proximity of or adjacent to the center of the heated zone, and/or the insulation is thinner in a portion of the fluid flow path that is in the proximity of or adjacent to a specific group of cells).

Figure 9:
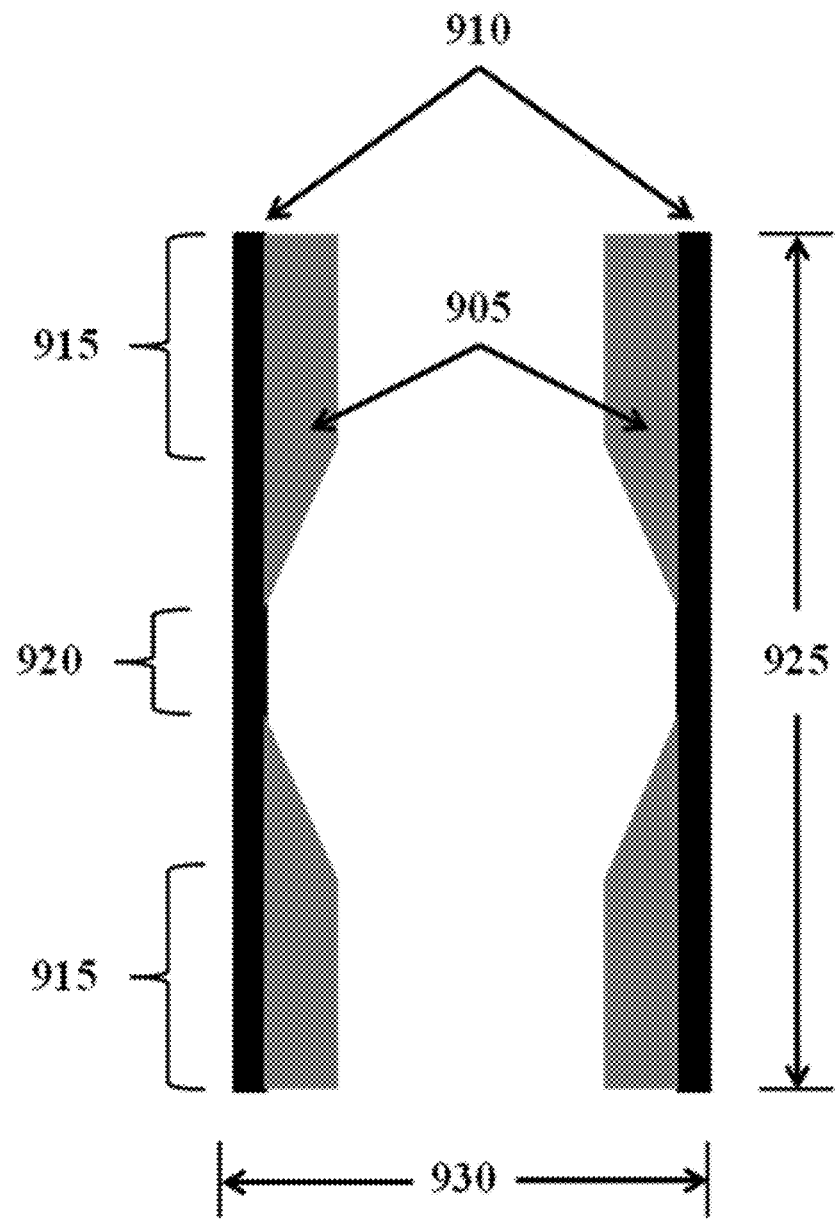
FIG. 9 shows an example of an insulation insert for central box tubing.

FIG. 9 is an example of a distribution of insulation configured to evacuate more heat from the hotter portions of the system than from less hot portions of the system. As shown, an insulation insert 905 can be placed into box tubing 910 (having a height (or length) 925 and a width 930) to allow more insulation along top and bottom regions 915 of the inside of the tube and less insulation in a central region 920 (e.g., in the event that there is a thermal gradient across the length (or height or width) of any thermal management fluid flow pathway). In some examples, flow paths or channels can be lined with insulation to selectively extract heat from specific locations in the device/system (e.g., the core) to decrease or minimize thermal gradients within the device/system, or across a portion of the device/system (e.g., a pack).

Figure 10:
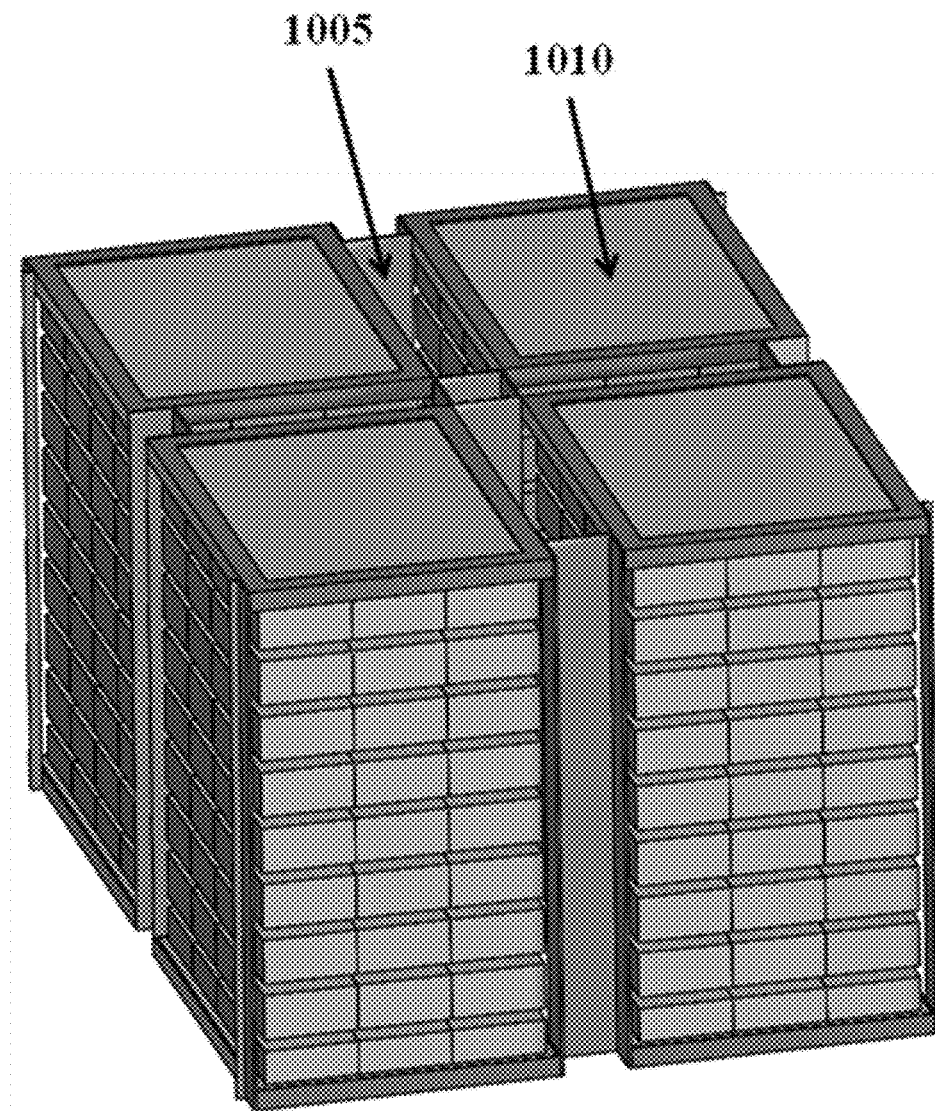
FIG. 10 shows an example of a core of electrochemical cells with ducts for thermal management fluid.

In some cases, the system includes ducting. With reference to FIG. 10, the ducting 1005 can be located between groups of electrochemical cells 1010 (e.g., enclosed by a frame). Thermal management fluid can be passed through the ducting (e.g., in addition to or instead of passing thermal management fluid through the frame). The thermal management fluid that is passed through the frame elements can be the same or different than the fluid that is passed through the ducting. Additional ducting can be added along the edges or the gaps or to pass through the insulation. In some examples, 1, 2, 3, 4, 5, 6, 7, 8, 9, 10, 12, 14, 15, 16, 18, 20 or more horizontal, vertical, spiral-shaped, winding and/or other ducts may be provided.

Fluid ducts, fluid flow paths (e.g., high capacity flow paths and low capacity capillaries) and direct fluid contact interfaces can form a hierarchy of heat transfer components/interfaces of various sizes and capacities (e.g., heat transfer capacities, as determined by fluid flow rate, fluid type, cell housing material, duct material, fluid flow path material, and so on. Different types of heat transfer components may be suited for different regions or situations (e.g., size of flow path and/or duct may be configured in accordance with a difference in temperature between the fluid and the cell(s), or a suitable configuration may be selected based on operating temperature).

The system can further include a fluid flow system that is configured and arranged to direct the thermal management fluid through the one or more fluid flow paths of the frame and/or ducting. The fluid flow system can include a pump, a fan, a blower, and/or any other suitable device for moving the thermal management fluid. The device used to direct fluid flow can be placed in a cool zone near the inlet of the fluid flow path, near the outlet of the fluid flow path, or inside the hot zone of the system and within or peripheral to the fluid flow path. In some cases, the fluid flow system can include multiple pumps, fans, blowers, and/or any other suitable device for moving the thermal management fluid through separate fluid flow channels or paths. For example, a pump or a fan can be provided for each separate fluid flow path. In another example, fluid may be moved through multiple (e.g., parallel) fluid flow paths that are in fluid communication with each other by a pump or a fan provided in or at one of the flow paths; fluid movement through the remaining flow paths may result from the Venturi effect. In some cases, the fluid may be pre-treated (e.g., pre-heated) to prevent thermal shock to the system prior to allowing the fluid to flow in (e.g., prior to admitting the fluid into) the fluid flow (e.g., cooling) pathways.

In some examples, the fluid flow system can provide separate thermal control over specific or different areas within the hot zone of the system (e.g., the system may comprise 1, 2, 3, 4, 5, 6, 7, 8, 9, 10, 12, 14, 16, 18, 20, 25, 30, 35, 40, 50 or more separate control zones). In some cases, the fluid flow channels can be configured for performing targeted thermal management (e.g., cooling) of one or more specific groups of cells (e.g., packs, or a set of packs). Providing thermal control over specific areas within the hot zone may enable the thermal management/control system to make the overall system (e.g., the battery and/or the system comprising the battery) more isothermal, thereby decreasing or minimizing stresses on the system that may occur due to the existence of and shifting of thermal gradients within the system.

In some implementations, the fluid flow system operates at all times. For example, if the flow is stopped completely, the fan (an example of a component of a fluid flow system) and/or other component(s) of the fluid flow system can overheat and/or melt (e.g., therefore requiring a fan rated for a 550° C. environment). The system may therefore maintain a low volume air flow during idle periods as a buffer (e.g., at the bottom of the device or system (e.g., the core)) to create a slight positive pressure (or over-pressure) inside the fluid flow (e.g., cooling) paths or tubes, thereby minimizing heat loss through the bottom (or a given surface) of the system and ensuring that the fan (and/or other component(s) of the fluid flow system) remains cool enough (e.g., stays within a specified low temperature zone, or below a given maximum or rated temperature). In some cases, the low volume air flow is provided by the fan.

In some implementations, the fluid flow system operates passively (e.g., without the need for fans, blowers, or pumps to actively force fluid through the fluid flow paths). The movement of thermal management fluid through the device or system can be driven primarily by natural convection. For example, the system may comprise a valve, damper or 'lift-gate' component at the inlet and/or outlet of a fluid flow path that can allow gas or air to flow into and/or out of the heated system cavity (e.g., thermal chamber). This convective flow process can drive hot air up and out a fluid flow path (e.g., like a chimney) by utilizing the phenomenon where hot air (or gas) rises and pulls cooler air (or gas) toward the fluid flow chamber. In some cases, natural convection is enabled and/or enhanced by positioning an inlet of the fluid flow path (e.g., the position where the fluid flow path transitions from ambient temperature, external environment into the hot zone of the system) near the bottom of the heated zone (also "hot zone" herein) and by positioning an exit of the fluid flow path near the top of the heated zone.

In some examples, the fluid flow system is configured or programmed to provide the thermal management fluid at an adjustable flow rate that is selected to maintain the temperature of the system or a portion of the system at the operating temperature (e.g., between about 150° C. and 750° C., or between about 450° C. and 550° C.). The fluid flow system may be controlled by one or more computers or processors of (or in communication with) a management/control system (e.g., the fluid flow system may be controlled by a thermal management/control system). In some examples, the thermal management system and the fluid flow system are controlled by redundant computers or processors to increase overall system reliability.

The fluid flow system may be configured or programmed to provide thermal management fluid to rapidly cool the at least a portion of the system or the whole system (e.g., the energy storage device or system). Rapid cooling may be required and/or desired in case of an emergency or catastrophic event (e.g., a catastrophic leak of cell active components, a fire, an earthquake, a flood, etc.) or in case of a scheduled or unscheduled maintenance procedure (e.g., to replace a failing cell or cell pack, a management/control system board and/or other system component). For example, rapid cooling may be used upon failure or breach of one or more cells in the system/device (e.g., leading to lost hermeticity). Such a failure or breach may be detected by a control system configured to provide thermal management. In some cases, a cell breach may be small and may result in a gradual degradation of cell and/or battery performance over many days or weeks (e.g., 1, 2, 5, 10, 15 or 20 days or weeks). In other cases, a cell breach may result in an immediate (e.g., within less than about 1, 5, 10, 30, 40, 50 or 60 seconds, within less than about 1, 2, 5, 10, 20, 30, 40 or 50 minutes, within less than about 1, 2, 3, 4, 6, 8, 10, 12, 16 or 20 hours, or within less than about one day) degradation in cell and/or battery performance and the system may need to immediately stop charging and/or discharging. In the case of an immediate cell and/or battery performance degradation due to a cell breach, an emergency cooling procedure may be initiated, such as, for example, turning on one or more fans/blowers and/or opening valves/lift-gates to accelerate the cool-down process. The fans/blowers in a thermal management system may in some cases only be initiated during an emergency cool-down procedure. In some cases, the rapid cooling may only be initiated when the temperature of the system is above a given temperature (e.g., a critical (safety) temperature), such as, for example, the freezing point of the electrolyte (e.g., molten salts) and/or electrodes (e.g., liquid metals), or above the flammability temperature of a specific active cell material. In some examples, a critical temperature is greater than about, or about, 550° C., 500° C., 450° C., 400° C., 350° C., 300° C., 250° C., 200° C., 150° C. or 100° C. Rapid cooling may include increasing a flow rate of thermal management fluid in one or more fluid flow paths of the system. The flow rate may be controlled selectively. At least a portion of such flow paths may be adjacent to a portion of the system for which a failure or emergency condition is detected (e.g., a failed cell).

An emergency cool-down process may comprise a rapid cool-down procedure. Such a procedure (or method) may be initiated and/or controlled by a control system. The method may be used to rapidly cool at least a portion of the energy storage system in response to a potentially hazardous event (e.g., earthquake and/or cell breach). The method may be performed when the system is at a given condition, such as, for example, when the system (or a portion thereof) is at or above (e.g., at least about 5° C., 10° C., 20° C., 50° C. or 100° C. above) a given operating temperature (e.g., any operating temperature herein), or at or above (e.g., at least about 5° C., 10° C., 20° C., 50° C. or 100° C. above) a given critical temperature (e.g., a critical freezing temperature). Upon rapidly cooling, a temperature of the system, device, or a portion thereof (e.g., at least one of the electrochemical cells in a battery) may decrease below a given threshold. In an example, the temperature of at least one of the electrochemical cells may decrease below a freezing point of one or more cell components (e.g., a hottest of a plurality of electrochemical cells can decrease from its operating temperature to a temperature below a freezing point of the electrolyte). The decrease in temperature may be achieved within a given time period ("time to cool down"). For example, the cooling may be achieved in less than about 5 seconds, 10 seconds, 30 seconds, 45 seconds, 1 minute, 2 minutes, 5 minutes, 10 minutes, 20 minutes, 30 minutes, 45 minutes, 60 minutes, 1 hour, 2 hours, 3 hours, 4 hours, 5 hours, 6 hours, 7 hours, 8 hours, 9 hours, 10 hours, 12 hours, 14 hours, 16 hours, 18 hours, 20 hours, 22 hours, 24 hours, 30 hours, 36 hours, 42 hours, or 48 hours. In an example, a hottest of the plurality of electrochemical cells can decrease from its operating temperature to a temperature below a freezing point of the electrolyte in less than about 4 hours.

At least a portion of the heat that is removed from the system can be rejected (e.g., lost) to the atmosphere or environment. In some cases, at least a portion of the heat that is removed from the system can be stored or used in another application (e.g., to heat homes or industrial processes through co-generation, or to prevent electronics from being chilled). In some implementations, a system comprising a circulatory fluid flow system that is configured to store thermal energy can be provided. One or more fluid flow paths (e.g., of the device) can be in fluid communication with a fluid flow path of the circulatory fluid flow system. The circulatory fluid flow system can comprise a thermal energy storage medium. The thermal energy storage medium can comprise any suitable material including, but not limited to, molten salt (e.g., any molten salt described herein), gravel, sand, steam or water. The thermal energy storage medium may be stored in a storage reservoir. In some cases, the thermal energy storage medium can be the thermal management fluid.

Insulation and Thermal Barriers

At least a portion of components of an energy storage device or system (e.g., electrochemical cells, groups of cells such as packs, and frames) may be thermally isolated from other room-temperature components of the energy storage device or system through thermal insulation boundaries. Thermal insulation can aid in defining thermal barrier(s) that allow one side of a thermal boundary (e.g., thermal boundary comprising the thermal barrier(s)) to be maintained at or above a temperature suitable (e.g., required) for cell operation (e.g., hot zone), while the other side of the thermal boundary can be maintained closer to room temperature or ambient temperature conditions (e.g., cool zone).

Thermal insulation may comprise materials with known (e.g., high) impedance for heat transfer (also "thermal impedance" herein). Such materials may be packaged in sheets, tiles, wraps, tapes or other (e.g., similar) form factors such that they may be packaged around the high temperature zone (also "hot zone" herein). As previously described with reference to FIG. 12, in some cases, different layers of thermal insulation may be used in the same assembly (e.g., assembly comprising thermal insulation assembled to a frame). For example, one layer may utilize a thermal insulator with a first thermal impedance and subsequent layers may comprise materials with one or more different thermal impedances (e.g., a second thermal impedance, a third thermal impedance, and so on). The thermal insulation may comprise a set or package of components. The thermal insulation package can comprise one or more layers of thermal insulation (e.g., one or more layers of insulating material). In some examples, removable and/or replaceable components (e.g., tiles) may be incorporated into the thermal insulation layers. In some examples, layers that can be displaced by motor or servo drives may be included in or incorporated into the thermal insulation package and may be used to help manage the temperature of the system. For example, a control system may activate an actuator (e.g., motor or servo drive) to change the position or configuration of one or more portions of the thermal insulation package to change (e.g., decrease) the thermal insulating property of the thermal insulation package, thereby increasing, maintaining, or decreasing the rate of heat loss from the system. Such a process may be controlled by a control system and may be part of the thermal management control of the system.

Thermal insulation may have dedicated areas or portions ("pass-throughs") through which wires, sensors and/or high current/voltage (e.g., cell current or voltage) connections, collectively referred to as "connections" herein, can pass in order to connect electrochemical cells (e.g., inside the thermal insulation) to other components in the energy storage system (e.g., outside the thermal insulation). For example, pass-throughs may carry wires and/or sensors that are in communication with a management/control system (e.g., system 1100 in FIG. 11). Such sensors may include, for example, one or more temperature sensors placed in or in thermal communication with the hot zone of the system. In some examples, pass-throughs carry only voltage (e.g., low voltage) sense wires. The voltage sense wires may be designed to handle (e.g., withstand) only small amounts of current (e.g., less than about 10 milli-amperes (mA) or less than about 1 mA). In some examples, pass-throughs carry voltage sense wires and/or wires for distributing current to/from cells. In some examples, pass-throughs carry high current and/or high voltage wires to busbars. Pass-throughs may have a cross-section that is, for example, circular, rectangular, square, oval, or polygonal. Such pass-throughs may have a cross-section area of greater than about 0.0001 square centimeters ($cm^2$), greater than about 0.001 $cm^2$, greater than about 0.01 $cm^2$, greater than about 0.1 $cm^2$, greater than about 1 $cm^2$ or greater than about 10 $cm^2$).

FIG. 12 is an example of a thermal insulation structure portion 1200 that comprises a first insulation layer 1205, a second insulation layer 1210 and a third insulation layer 1215. A first surface of the first insulation layer 1205 can contact or be positioned adjacent a frame (or frame element(s)) 1220 in (or adjacent to) a hot (e.g., inside) zone 1225. The frame 1220 can comprise a flow path (e.g., air flow path) 1235. A second surface of the first insulation layer 1205 can contact or be positioned adjacent a first surface of the second insulation layer 1210. A second surface of the second insulation layer 1210 can contact or be positioned adjacent to a first surface of the third insulation layer 1215. A second surface of the third insulation layer 1215 can contact or be positioned adjacent an outer skin 1230. The outer skin 1230 may face a cold or cool (e.g., outside) zone 1240. Thermal insulation of devices herein may in some cases comprise at least about 1, 2, 1, 2, 3, 4, 5, 6, 7, 8, 9, 10, 12, 14, 16, 18, 20, 22, 24, 26, 28, 30, 35, 40, 45, 50, 75 or 100 thermal insulation structure portions (e.g., such as the structure portion 1200).

A pass-through (e.g., high thermal efficiency pass-through) 1245 provides a conduit from the first surface of the layer 1205, through the layer 1205, through the layer 1210, through the layer 1215, through the outer skin 1230 to the cold/cool zone 1240. Wires, sensors and/or high current/voltage connections (not shown) may be passed from the hot zone/side 1225 to the cold/cool zone/side 1240.

A pass-through may be thermally efficient to limit or prevent excessive heat loss through it. In some cases, the pass-through can be filled with material(s) with high thermal impedance to limit or decrease heat transfer from the hot zone of the system to other lower temperature areas (e.g., to one or more cool zones). The filling material may be homogenous (e.g., one material fills the entire pass-through) or heterogeneous (e.g., two or more different materials are used as fillers in one pass-through). In some cases, the pass-through can comprise one or more plugs and/or one or more end-caps that may limit or decrease heat transfer through the pass-through. Plug(s) and/or end cap(s) may encapsulate material with high thermal impedance within the pass-through structure. In some examples, the entire pass-through structure can be mounted on a tile (or sheet, wrap, tape, etc.) of thermal insulation such that the tile (or sheet, wrap, tape, etc.) may be removed along with the pass-through as part of service or repair.

Figure 13A:
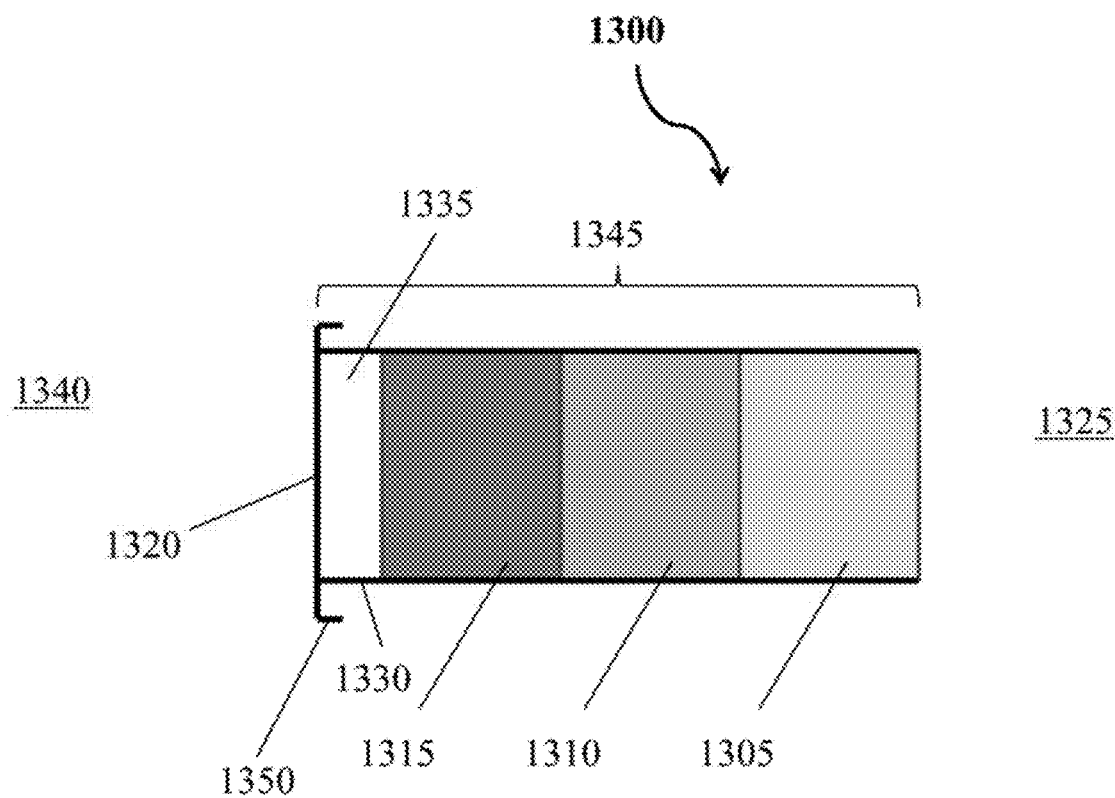
FIG. 13A is an example of a pass-through with an end cap.

FIG. 13A is an example of a pass-through 1300 that comprises an end cap 1320. The pass-through 1300 can be surrounded by insulation layers 1305, 1310 and 1315. Alternatively, the pass-through 1300 can comprise (e.g., be filled with) filler materials 1305, 1310 and 1315. The pass-through may comprise an electrically conductive component (not shown), such as, for example, voltage sense wire(s), high current carrying wire(s), or wire(s) associated with thermal measurement (e.g., thermocouple wires). The insulation layers or filler materials 1305, 1310 and 1315 may be disposed between a hot zone 1325 and a cold (e.g., room temperature) zone 1340. The end cap 1320 may be attached to a wall or boundary 1330 of the pass-through. The wall 1330 may or may not extend along the entire length 1345 of the pass-through. In some cases, the wall 1330 may extend beyond the last filler material 1315. In such instances, an air gap 1335 may form between the filler material 1315 and the end cap 1320. In some cases, the pass-through may not comprise the wall 1330, and the end cap 1320 may be attached directly to the last filler material 1315; in such a case, the air gap 1335 may or may not form. The end cap 1320 can comprise one or more flanges 1350.

The wires that transit the pass-through may comprise special materials (e.g., materials that are stable at or above the operating temperature of the system, oxidation-resistant materials, materials that have suitable (e.g., sufficient and/or high) electrical conductivity at the operating temperature of the system), such as, for example, nickel, aluminum, bronze, brass, stainless steel, or any combination thereof. Such materials may limit or decrease heat-induced corrosion on the wires. The wires in the pass-through may transition (e.g., sequentially) from materials that are stable at higher temperatures, to more electrically conducting but less thermally stable materials (e.g., copper). In some examples, the wire in the pass-through comprises at least about 1, 2, 3, 4, 5, 6, 7, 8, 9, 10, 12, 14, 16, 18, 20, 25, 30 or more different sections. The sections may comprise different materials. The sections may be integrally formed, or joined (e.g., welded) together to form a composite wire. In some cases, the materials may be sequentially arranged in order from materials with highest thermal stability (and, in some cases, lower conductivity) in a region of the pass-through adjacent the hot side to materials with highest electrical conductivity (and, in some cases, lower thermal stability) in a region adjacent the cool side.

The pass-through may comprise wires that are built into (e.g., integrally formed with) the pass-through structure. In some cases, different pass-throughs in the system may be designed such that the wire lengths, location of the wires within the pass-through and/or spacing between the wires are the same for the different pass-throughs. In some cases, the pass-through may comprise wires that are floating within the pass-through. In some cases, wires may be cast or set in high thermal impedance material such that wires do not form a straight-line connection between high temperature (e.g., hot) and low temperature (e.g., cold/cool, room temperature) zones of the system. Wires routed in this manner may have excess length incorporated within the pass-through to allow thermal energy conducted by the wires to be released as the wires travel through heterogeneous layers of thermal impedance material within the pass-through. The (actual) length of the wire may be, for example, at least about 1.5 times, at least about 2 times, at least about 5 times, at least about 10 times, at least about 50 times, or at least about 100 times greater than a distance from the hot zone to the cold zone (e.g. length of the pass-through). This may aid with easily and/or safely interconnecting the wires with electronics components, and/or making areas of the system service access/touch safe.

Figure 13B:
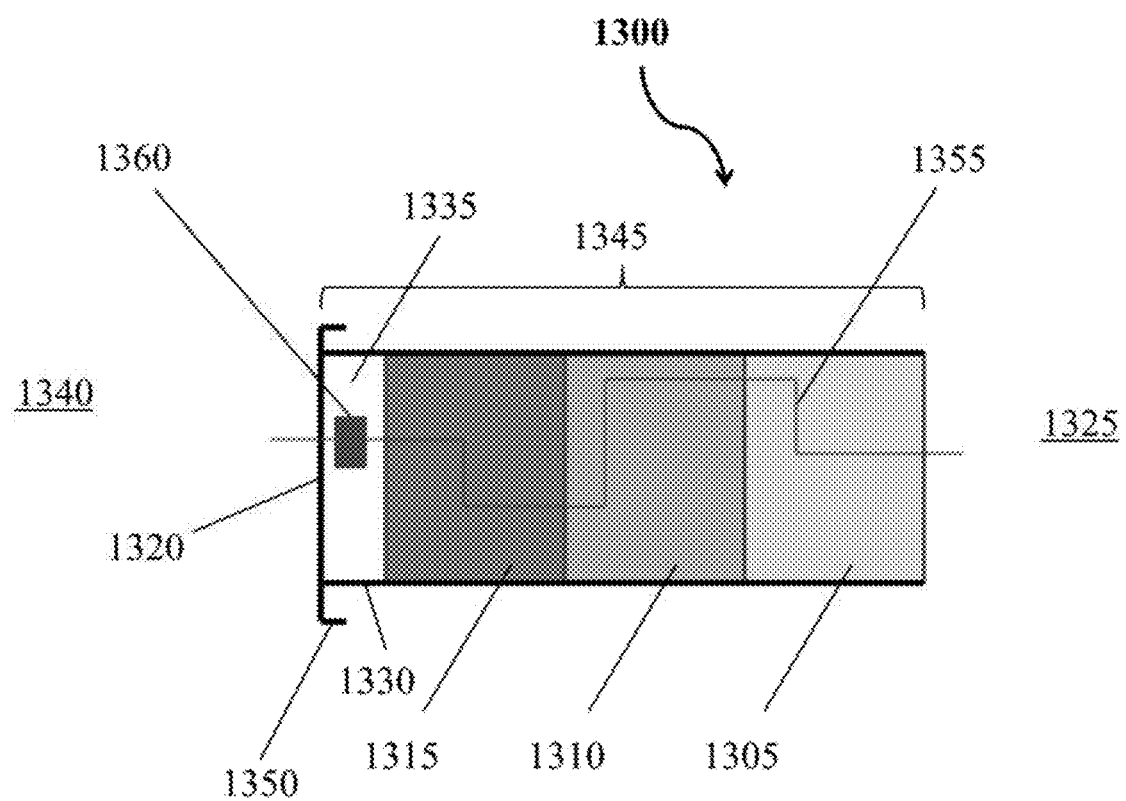
FIG. 13B shows the pass-through in FIG. 13A with a wire.

FIG. 13B is another example of the pass-through 1300, further comprising a wire 1355. The wire 1355 (or multiple such wires) may have a circuitous (e.g., zigzag, spiral or helix) pattern or path (through the pass-through) that can prevent a direct thermal opening from the hot zone 1325 to the cold zone 1340. The rate of heat conducted through one or more wires in the pass-through may be related to or depend on one or more of: the temperature difference between the hot zone and the cold zone, the cross-sectional area of the wire(s), the thermal conductivity of the material(s) of the wire(s), and the inverse of the length of the wire(s). In some cases, further reducing the cross-sectional area may result in a mechanically fragile wire that is susceptible to breaking and/or oxidation. To reduce the amount of heat conducted through a wire, the wire may have a length that is significantly longer than the length of the pass-through. Extra wire loops 1360 may increase the length of the wire and reduce the amount of heat that is conducted through the wire. The wire may be configured in a helical coil, such as, for example, a wire that spirals in a circular geometric path from the hot zone to the cold zone. The axis of the helical structural can be about parallel (e.g., substantially parallel) to the direction of the heat flow path from the hot zone to the cold zone. The wire may be configured in other geometries, such as, for example, a helical-type geometry with an oval, square, rectangular, polygon, and/or other cross-sectional shape. The heat dissipation may decrease or prevent coupling of heat to electronics on the cold side (e.g., room temperature zone) 1340.

Pass-throughs may comprise infrared (IR) reflective coatings. The IR coatings may be applied to pass-throughs to limit or decrease heat transfer through IR losses. In some instances, pass-throughs carrying wires may comprise coatings that reduce abrasion on wire insulation (e.g., wire insulating material) in order to prevent loss of wire insulation through chaffing.

Pressure Relief Mechanism

Figure 14:
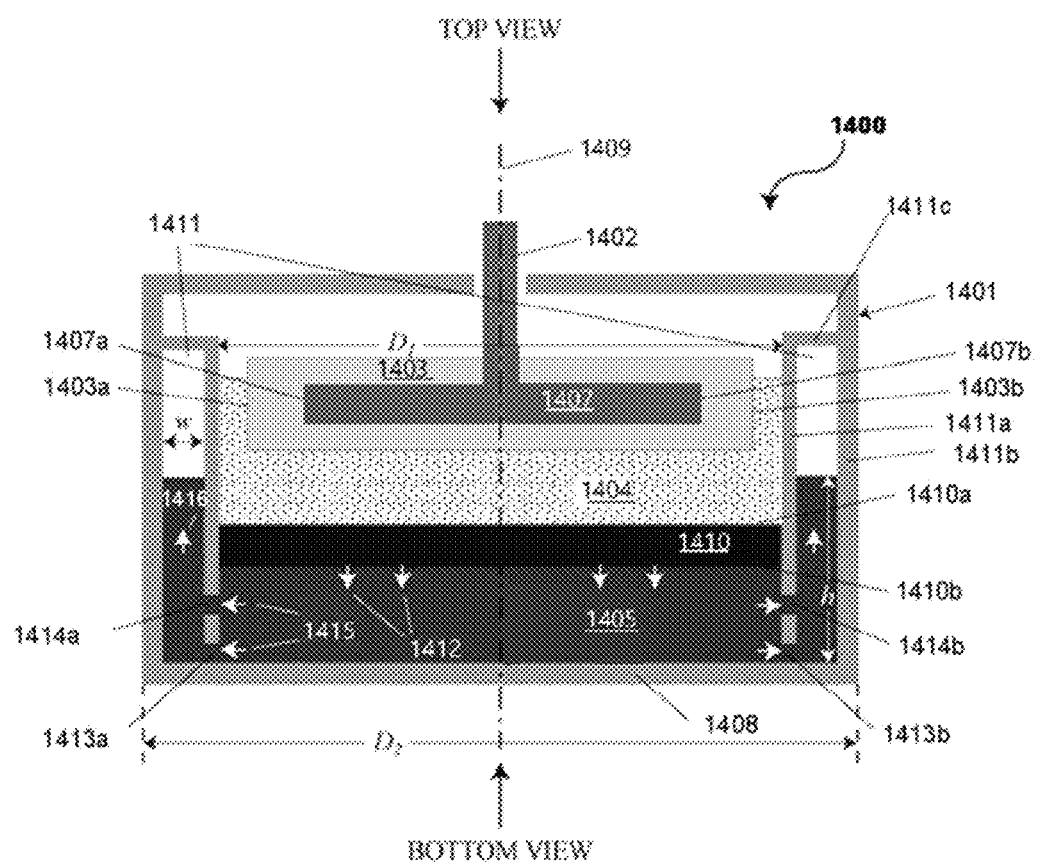
FIG. 14 is a cross-sectional side view of an electrochemical cell or battery with a pressure relief structure.

FIG. 14 is a cross-sectional side view of an electrochemical cell or battery 1400 with a pressure relief structure 1411. In an example, the battery cell 1400 can have an axially symmetric, circular cross-section when viewed from above ("top view" in FIG. 14). The housing 1401 can have concentric walls 1411a, 1411b. A first chamber or cavity can include a negative liquid metal electrode 1403, a negative current collector 1407, a liquid metal electrolyte 1404, a positive liquid metal electrode 1405 and a positive current collector 1408. During discharge, a solid intermetallic layer 1410 may form, as described elsewhere herein. The pressure relief structure 1411 forms a second chamber. The walls of the first and second chambers can form the concentric walls of the housing 1401 which may include a container, as described elsewhere herein. Thus, the pressure relief structure 1411 is provided in the annular chamber (also referred to as "riser pipe" herein) defined by the concentric walls. In some cases, the concentric walls of the housing may be integrally formed. Alternatively, the concentric walls may be formed separately and mechanically joined, e.g., by welding. The housing and/or the walls can be formed of any materials for housings/containers described herein.

During discharge, the negative liquid metal electrode 1403 can be an anode and the positive liquid metal electrode 1405 can be a cathode. The intermetallic layer 1410 includes an upper interface 1410a and a lower interface 1410b. As the lower interface 1410b of the intermetallic layer 1410 moves in a downward direction indicated by arrows 1412, the liquid material of the cathode 1405 is compressed. When pressure builds due to active electrochemistry in the first chamber space, the cathode material can rise between the walls 1411a, 1411b of the pressure relief structure 1411 via one or more openings 1413a, 1413b, 1414a, 1414b. The openings can be provided adjacent to the housing 1401 (e.g., openings 1413a, 1413b) such that the inner wall 1411a of the pressure relief structure is not in contact with the bottom wall of the housing 1401. In some examples, the bottom wall can be the positive current collector 1408. The openings can also be provided at some predetermined distance from the bottom wall of the housing 1401 (e.g., openings 1414a, 1414b). For example, the inner wall 1411a can be attached to the bottom wall of the housing and only have openings 1414a, 1414b.

The holes may be circular or of any other shape allowing the cathode material to flow through the holes. For example, circular holes may be preferred to minimize drag on the flowing cathode material. The cathode material may flow through the holes as indicated by arrows 1415, and upward in the pressure relief structure as indicated by arrows 1416.

Combinations and/or a plurality of openings 1413a, 1413b, 1414a, 1414b can be provided along the inner wall of the annular pressure relief chamber 1411. The holes may be provided at different axial distances from the bottom wall of the housing and may be of varying size. For example, the holes may be spaced to prevent the intermetallic layer 1410 from "bottoming out", i.e., from reaching the uppermost level of the holes (which may be near the bottom of the first chamber), and blocking the riser pipe inlet (the area around arrows 1415).

The pressure relief structure can have a top wall 1411c. The top wall 1411c can close the pressure relief structure to prevent material inside the riser pipe from spilling over the top of the riser pipe. In some cases, the wall 1411b may be formed separately from the housing. For example, the walls 1411a, 1411b, and 1411c can be integrally formed as an annular tube with a closed top and an open bottom (e.g., openings 1413a, 1413b), or as an annular tube with closed top and bottom but with perforations or holes near the bottom (e.g., openings 1414a, 1414b). In some examples, one or more parts or all of the pressure relief structure may be formed of one or more materials different than the housing 1401. One or more parts or all of the pressure relief structure may be formed of an electrically insulating material, such as the electrically insulating materials described elsewhere herein.

With continued reference to FIG. 14, the cathode material in the riser pipe is not in contact with to the electrolyte 1404. Further, the cathode material is electrically isolated from the electrolyte and the anode. When the cathode material is electrically conductive (e.g., a liquid metal cathode material), the cathode material in the riser pipe (second chamber) can be electrically connected with the cathode material in the first chamber. In some cases, such as, for example, when an unsheathed housing is employed as described elsewhere herein, only the wall 1411b may be electrically insulating; the walls 1411b and 1411c may be electrically conductive. The wall 1411c may only be electrically conductive if it is to not contact the electrolyte at any point.

The cathode material may rise in the pressure relief structure 1411 to a height h. The height h may vary around the circumference of the pressure relief structure. The height h can be related to the volume change of the cathode (i.e., the liquid and solid cathode materials 1405 and intermetallic layer 1410). For example, the cathode materials 1405 and 1410 can have a volume $V_1$ when charged, and a volume $V_2$ when discharged. The height h can be related to the volume difference $V_2-V_1$ and the cross-sectional area of the pressure relief structure. The annular pressure relief structure in FIG. 14 can have a width w, and an area related to w and the circumference of the annular structure. The dimensions of the pressure relief structure, e.g., w, may be such that the cathode material can easily enter and rise in the structure. For example, the pressure relief structure can be dimensioned to minimize capillary wicking effects, and to ensure that the cathode material experiences minimal drag forces. The pressure relief structure can be dimensioned to accommodate a predetermined amount of cathode material. For example, the pressure relief structure may be dimensioned to accommodate less than 10%, less than 25%, less than 50%, or less than 75% of maximum volume or mass of the cathode material or of the liquid cathode material.

In some cases, the addition of the riser pipe decreases the gap between a first negative electrode end 1403a and an adjacent wall (e.g., the wall 1411a in FIG. 14), which may contribute to enhanced side wall creep of the liquid cathode material. To prevent the cathode material from climbing the pressure relief structure 1411 along the wall facing the first chamber and shorting to the anode from the sides (i.e., climbing upward in FIG. 14, parallel and on the opposite side of the wall 1411a from the arrows 1416), the pressure relief structure(s) may be isolated from the anode by a sheath (e.g., carbon or metal nitride or other sheath materials described herein) or coating of material (e.g., PVD or CVD coating of a high temperature material), which is not readily wet by the cathode material. In some cases, the material may provide a surface texture or chemistry that interacts with the intermetallic material, e.g., the intermetallic may easily slide along the surface.

Conversely, one or more parts of the pressure relief structure, e.g., the surfaces defining the chamber of the riser pipe, may be formed of and/or coated with a material that is readily wet by the cathode to ensure smooth flow of the cathode material in the riser pipe. The material can be inert. In some cases, the material may have desired reactivity with the cathode material. In some cases, the inlet and/or the openings 1413a, 1413b, 1414a, 1414b can be coated with a material that prevents the intermetallic from sliding into the riser pipe. The inlet and/or the openings 1413a, 1413b, 1414a, 1414b may be covered with a mesh. The inlet and/or the openings 1413a, 1413b, 1414a, 1414b may comprise one or more valves or valve-like features. For example, the inlet and/or the openings can be configured to allow flow into the riser pipe above a certain hydraulic pressure value (e.g., during discharging), and to allow flow from the riser pipe into the first chamber (e.g., during charging) at a relatively lower pressure.

Alternative configurations of the pressure relief mechanism may include external pressure relief structures, such as, for example, a riser pipe mounted externally to the housing 1401 and in fluid communication with the first chamber via one or more the openings 1413a, 1413b, 1414a, 1414b, ducts or connectors.

Method for Operating an Energy Storage System

The disclosure provides methods for operating an energy storage system. In some cases, the method includes providing an energy storage system comprising a plurality of electrochemical cells supported by a frame structure. An individual cell of the plurality of electrochemical cells can comprise a negative electrode, an electrolyte and a positive electrode. At least one of the negative electrode, the electrolyte and the positive electrode can be in a liquid state at an operating temperature of the individual electrochemical cell. The frame structure can comprise one or more fluid flow paths for bringing a thermal management fluid in thermal communication with at least a subset of the plurality of electrochemical cells. In some cases, the method includes directing the thermal management fluid through the one or more fluid flow paths.

The method can be performed to achieve any number of objectives. In some cases, directing of the thermal management fluid is performed to maintain a temperature of the individual cell or one or more portions thereof (also "cell parts" herein), a group of cells, or a device or system comprising such cell(s) at the operating temperature (e.g., between about 150° C. and 750° C.). In some cases, directing of the thermal management fluid is performed to increase or maximize the efficiency and/or operating lifetime of the energy storage system.

The thermal management fluid can be directed at a rate that is varied over time. In some examples, the thermal management fluid is directed at a rate that depends on: (a) a temperature of the energy storage system or electrochemical cell thereof; (b) a rate of change of the temperature of the energy storage system or electrochemical cell thereof; (c) whether the energy storage system is charging, discharging or idle; (d) an anticipated future operation of the energy storage system; and/or (e) a current or anticipated market condition. The anticipated future operation of the energy storage system can include the time and extent of future charging, discharging and/or idle operation of the energy storage system. The current or anticipated market conditions can include the price of energy.

The thermal management fluid can be directed through the one or more fluid flow paths with the aid of a fluid flow system in fluid communication with the one or more fluid flow paths. In some examples, the fluid flow system comprises a vent, damper, lift-gate, valve, fan, pump or convection-assisted flow (e.g., forced and/or natural convection).

Heat can be added or removed from the system at any suitable rate. In some cases, directing the thermal management fluid through the one or more fluid flow paths dissipates or adds thermal energy from the plurality of electrochemical cells at a rate of about 1 Watt (W), about 10 W, about 50 W, about 100 W, about 500 W, about 1 kilo-Watt (kW), about 5 kW, about 10 kW, about 50 kW, about 100 kW, about 500 kW, or about 1000 kW. In some examples, directing the thermal management fluid through the one or more fluid flow paths dissipates or adds thermal energy from the plurality of electrochemical cells at a rate of at least about 1 watt (W), at least about 10 W, at least about 50 W, at least about 100 W, at least about 500 W, at least about 1 kilowatt (kW), at least about 5 kW, at least about 10 kW, at least about 50 kW, at least about 100 kW, at least about 500 kW, or at least about 1000 kW. In some examples, directing the thermal management fluid through the one or more fluid flow paths dissipates or adds thermal energy from the plurality of electrochemical cells at a rate of at most about 1 watt (W), at most about 10 W, at most about 50 W, at most about 100 W, at most about 500 W, at most about 1 kilowatt (kW), at most about 5 kW, at most about 10 kW, at most about 50 kW, at most about 100 kW, at most about 500 kW, or at most about 1000 kW.

The temperature of the system or any individual cell thereof can be maintained with any suitable tolerance. In some cases, upon directing the thermal management fluid through the one or more fluid flow paths, the temperature is maintained to within less than about 1° C., 2° C., 5° C., 10° C., 20° C., 30° C., 40° C., 50° C., 60° C., 70° C., 80° C., 90° C., 100° C., 150° C., 200° C., or 250° C. of a target temperature setting. In some cases, the temperature of an individual cell fluctuates by at most about 1° C., 2° C., 5° C., 10° C., 20° C., 30° C., 40° C., 50° C., 60° C., 70° C., 80° C., 90° C., 100° C., 150° C., 200° C., or 250° C. in a time period of 5 hours or less.

Control Systems, Methods and Algorithms

Provided herein are computer control systems that are programmed to implement methods of the disclosure. Such a control system (also "system" or "management/control system" herein) can comprise a computer programmed to direct a thermal management fluid through one or more fluid flow paths and/or a computer readable medium comprising an algorithm to direct a thermal management fluid through one or more fluid flow paths. Thus, the control system can comprise a thermal management/control system.

In some implementations, the system comprises an energy storage system. The energy storage system can include an electrochemical energy storage device comprising one or more electrochemical energy storage cells. The system (e.g., the energy storage system, the electrochemical energy storage device) can comprise a thermal zone (e.g., hot zone). The thermal zone may contain the electrochemical energy storage cells. The system can further comprise a computer system coupled to the device. The computer system can regulate the charging and/or discharging of the device, thermally manage the device, or a combination thereof. The computer system (e.g., controller) can monitor one or more the electrochemical cells of the system/device a condition indicative of a failure (e.g., breach in a seal of an electrochemical cell of the electrochemical energy storage device). Such a failure or breach condition may be used by the computer system to trigger a thermal management response. The computer system can include one or more computer processors and a memory location coupled to the computer processor. The memory location comprises machine-executable code that, upon execution by the computer processor, implements any of the methods above or elsewhere herein. The computer system (e.g., computer processor, memory and/or other components of the computer system) are not in the thermal zone. The computer system may electronically communicate with the thermal zone (e.g., via wires, sensors and/or high current/voltage (e.g., cell current or voltage) connections). In some cases, the computer system may electronically communicate with one or more components in the thermal (e.g., hot) zone. For example, one or more temperature sensors (e.g., for monitoring one or more electrochemical cells, or for monitoring one or more groups of electrochemical cells) may be placed in in the hot zone of the system, and may provide measurement data to the computer system outside of the hot zone. The temperature sensor(s) can be in electronic communication with, for example, the computer processor.

In some implementations, the system comprises a plurality of electrochemical cells supported by a frame structure. An individual cell of the plurality of electrochemical cells can comprise a negative electrode, an electrolyte and a positive electrode. At least one, two, or all of the negative electrode, the electrolyte and the positive electrode can be in a liquid state at an operating temperature of the individual electrochemical cell. The frame structure can comprise the one or more fluid flow paths for bringing the thermal management fluid in thermal communication with at least a subset of the plurality of electrochemical cells.

The thermal management fluid can be directed at a rate that is varied over time for any suitable purpose. In some examples, the directing of the thermal management fluid is performed to maintain a temperature of the individual cell, or cell parts, at the operating temperature. In some examples, the directing of the thermal management fluid is performed to increase or maximize efficiency and/or operating lifetime of the energy storage system. As described in greater detail elsewhere herein, the rate can depend on, for example, a temperature of the energy storage system or electrochemical cell thereof, a rate of change of the temperature of the energy storage system or electrochemical cell thereof, whether the energy storage system is charging, discharging or idle, an anticipated future operation of the energy storage system, a current or anticipated market condition, or any combination thereof.

Figure 11:
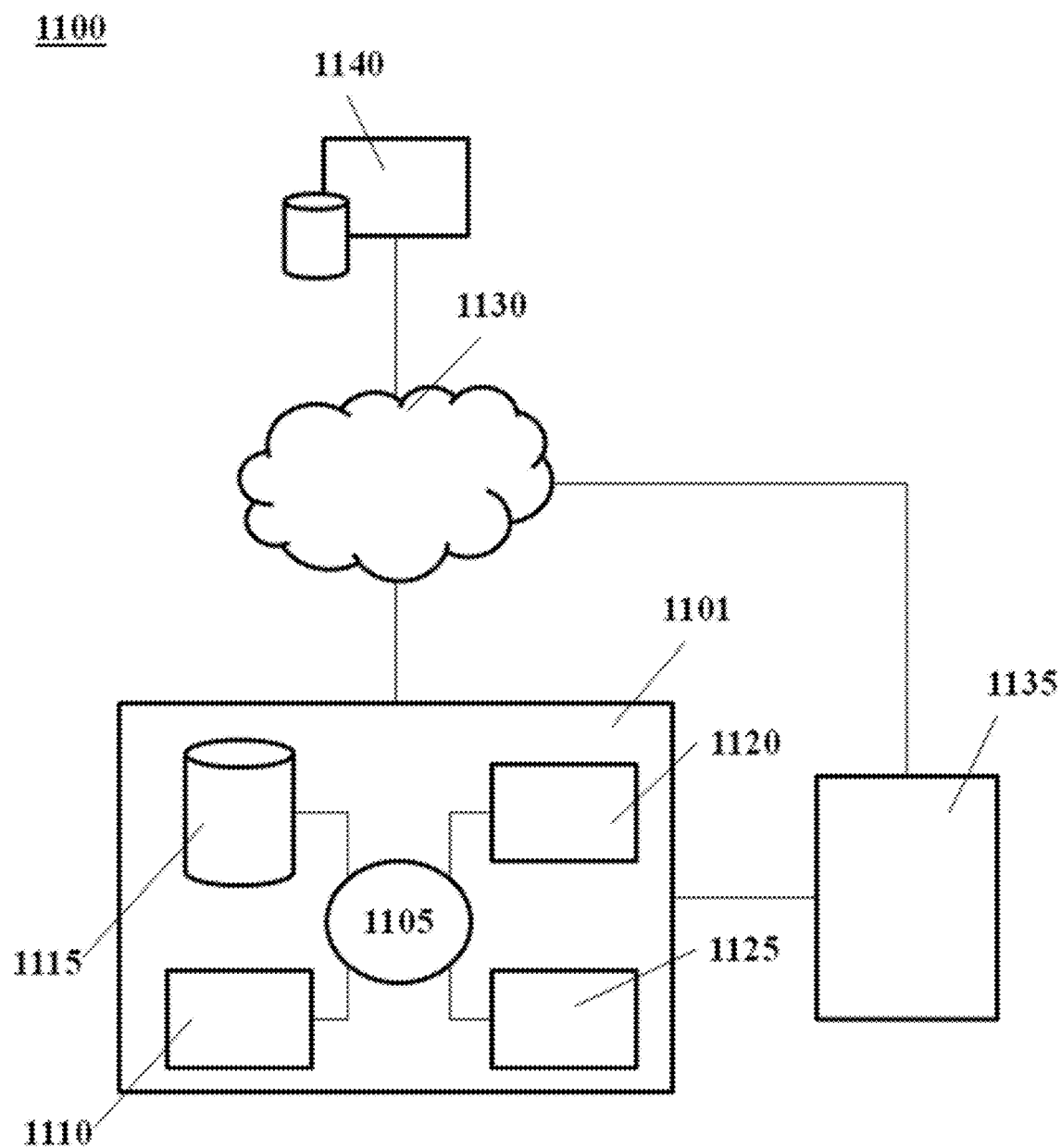
FIG. 11 shows an example of a computer system of the disclosure.

FIG. 11 shows a system 1100 programmed or otherwise configured to control or regulate one or more process parameters of an energy storage system of the present disclosure. The system 1100 includes a computer server ("server") 1101 that is programmed to implement methods disclosed herein. The server 1101 includes a central processing unit (CPU, also "processor" and "computer processor" herein) 1105, which can be a single core or multi core processor, or a plurality of processors for parallel processing. The server 1101 also includes memory 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The server 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the server 1101, can implement a peer-to-peer network, which may enable devices coupled to the server 1101 to behave as a client or a server. The server 1101 can be coupled to an energy storage system 1135 either directly or through the network 1130.

The system may comprise a management/control system board ("board"). The board can have data acquisition capabilities. For example, the board can include a data acquisition board. The board may be able to store and/or process data (e.g., the acquired data). For example, the battery management system board may be able to store and/or process the data rather than (or in addition to) converting inputs into digital signals.

The storage unit 1115 can store process parameters of the energy storage system 1135. The process parameters can include charging and discharging parameters. The server 1101 in some cases can include one or more additional data storage units that are external to the server 1101, such as located on a remote server that is in communication with the server 1101 through an intranet or the Internet.

The server 1101 can communicate with one or more remote computer systems through the network 1130. In the illustrated example, the server 1101 is in communication with a remote computer system 1140. The remote computer system 1140 can be, for example, a personal computers (e.g., portable PC), slate or tablet PC (e.g., Apple® iPad, Samsung® Galaxy Tab), telephone, Smart phone (e.g., Apple® iPhone, Android-enabled device, Blackberry®), or personal digital assistant.

In some situations, the system 1100 includes a single server 1101. In other situations, the system 1100 includes multiple servers in communication with one another through an intranet and/or the Internet.

Methods as described herein can be implemented by way of machine (or computer processor) executable code (or software) stored on an electronic storage location of the server 1101, such as, for example, on the memory 1110 or electronic storage unit 1115. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110. Alternatively, the code can be executed on the second computer system 1140. The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the server 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Various parameters of an energy storage system can be presented to a user on a user interface (UI) of an electronic device of the user. Examples of UI's include, without limitation, a graphical user interface (GUI) and web-based user interface. The UI (e.g., GUI) can be provided on a display of an electronic device of the user. The display can be a capacitive or resistive touch display. Such displays can be used with other systems and methods of the disclosure.

Devices, systems and methods of the present disclosure may be combined with or modified by other devices, systems and/or methods, such as, for example, batteries and battery components described in U.S. Pat. No. 3,663,295 ("STORAGE BATTERY ELECTROLYTE"), U.S. Pat. No. 3,775,181 ("LITHIUM STORAGE CELLS WITH A FUSED ELECTROLYTE"), U.S. Pat. No. 8,268,471 ("HIGH-AMPERAGE ENERGY STORAGE DEVICE WITH LIQUID METAL NEGATIVE ELECTRODE AND METHODS"), U.S. Patent Publication No. 2011/0014503 ("ALKALINE EARTH METAL ION BATTERY"), U.S. Patent Publication No. 2011/0014505 ("LIQUID ELECTRODE BATTERY"), U.S. Patent Publication No. 2012/0104990 ("ALKALI METAL ION BATTERY WITH BIMETALLIC ELECTRODE"), and U.S. Patent Publication No. 2014/0099522 ("LOW-TEMPERATURE LIQUID METAL BATTERIES FOR GRID-SCALED STORAGE"), each of which is entirely incorporated herein by reference.

Energy storage devices of the disclosure may be used in grid-scale settings or standalone settings. Energy storage devices of the disclosure can, in some cases, be used to power vehicles, such as scooters, motorcycles, cars, trucks, trains, helicopters, airplanes, and other mechanical devices, such as robots.

A person of skill in the art will recognize that the battery housing components may be constructed from materials other than the examples provided above. One or more of the electrically conductive battery housing components, for example, may be constructed from metals other than steel and/or from one or more electrically conductive composites. In another example, one or more of the electrically insulating components may be constructed from dielectrics other than the aforementioned glass, mica and vermiculite. The present invention therefore is not limited to any particular battery housing materials.

Any aspects of the disclosure described in relation to cathodes can equally apply to anodes at least in some configurations. Similarly, one or more battery electrodes and/or the electrolyte may not be liquid in alternative configurations. In an example, the electrolyte can be a polymer or a gel. In a further example, at least one battery electrode can be a solid or a gel. Furthermore, in some examples, the electrodes and/or electrolyte may not include metal. Aspects of the disclosure are applicable to a variety of energy storage/transformation devices without being limited to liquid metal batteries.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An electrochemical energy storage system, comprising
a thermal chamber comprising a cavity, wherein said thermal chamber is configured to thermally insulate said cavity from an environment external to said thermal chamber, and wherein said thermal chamber has a surface area-to-volume ratio of 10 $m^{-1}$;
a plurality of energy storage cells disposed in said cavity of said thermal management chamber, wherein an energy storage cell of said plurality of energy storage cells comprises a negative electrode, a positive electrode and an electrolyte disposed between said negative electrode and said positive electrode, wherein said electrolyte and at least one of said negative electrode and said positive electrode are in a liquid state at an operating temperature of said energy storage cell, wherein said energy storage cell has a surface area-to-volume ratio of less than or equal to about 100 m$^{-1}$; and a frame disposed in said cavity of said thermal chamber and configured to support said plurality of energy storage cells.

2. The electrochemical energy storage system of claim 1, further comprising a plurality of heaters disposed in said cavity of said thermal chamber and supported by said frame, wherein said plurality of heaters are configured to distribute thermal energy throughout said cavity and maintain said electrolyte and said at least one of said negative electrode and said positive electrode in a liquid state.

3. The electrochemical energy storage system of claim 2, further comprising a computer system configured to monitor and regulate a temperature of at least a portion of said electrochemical energy storage system.

4. The electrochemical energy storage system of claim 2, wherein said plurality of heaters are configured to maintain said cavity at an operating temperature from about 150° C. to 750° C.

5. The electrochemical energy storage system of claim 1, wherein said frame further comprises at least one fluid flow path for bringing a thermal management fluid in thermal communication with at least a subset of said plurality of energy storage cells.

6. The electrochemical energy storage system of claim 5, wherein said at least one fluid flow path is fluidically separated from said plurality of energy storage cells such that said thermal management fluid does not contact said plurality of energy storage cells.

7. The electrochemical energy storage system of claim 5, further comprising a fluid flow system that is configured and arranged to direct said thermal management fluid through said at least one fluid flow path of said frame.

8. The electrochemical energy storage system of claim 7, wherein said fluid flow system comprises a fan or pump.

9. The electrochemical energy storage system of claim 5, further comprising an actuator configured to direct flow of said thermal management fluid.

10. The electrochemical energy storage system of claim 1, further comprising a fluid flow system that is configured and arranged to direct a thermal management fluid through said cavity.

11. The electrochemical energy storage system of claim 1, wherein said negative electrode comprises an alkali or alkaline earth metal.

12. The electrochemical energy storage system of claim 11, wherein said alkali or alkaline earth metal is lithium, sodium, potassium, magnesium, calcium or a combination thereof.

13. The electrochemical energy storage system of claim 1, wherein said electrolyte comprises a salt of an alkali or alkaline earth metal.

14. The electrochemical energy storage system of claim 1, wherein said electrolyte is a molten halide electrolyte.

15. The electrochemical energy storage system of claim 1, wherein said positive electrode comprises tin, lead, bismuth, antimony, tellurium, selenium, or any combination thereof.

16. The electrochemical energy storage system of claim 1, wherein said energy storage cell of said plurality of energy storage cells further comprises a negative current terminal in electrical communication with the negative electrode and a cell housing in electrical communication with said positive electrode.

17. The electrochemical energy storage system of claim 16, wherein said negative current terminal is electrically isolated from said cell housing.

18. The electrochemical energy storage system of claim 17, wherein two or more individual energy storage cells of said plurality of energy storage cells are coupled in series such that said negative current terminal of said energy storage cell of said plurality of energy storage cells is in electrical communication with a cell housing of at least another energy storage cell.

19. The electrochemical energy storage system of claim 18, wherein said negative current terminal of said energy storage cell of said plurality of energy storage cells is in electrical communication with said cell housing of said at least another energy storage cell by a busbar or interconnection component.

20. The electrochemical energy storage system of claim 2, wherein said plurality of energy storage cells are configured to provide electrical energy to said plurality of heaters to operate said plurality of heaters.

* * * * *